United States Patent
Kuramasu

[11] Patent Number: 5,399,078
[45] Date of Patent: Mar. 21, 1995

[54] PLANETARY-MOTION ENGINE

[76] Inventor: Yasuo Kuramasu, 3849, Yoshiki, Yamaguchi-city, Yamaguchi-prefecture, Japan

[21] Appl. No.: 107,695
[22] PCT Filed: Feb. 20, 1992
[86] PCT No.: PCT/JP92/00175
  § 371 Date: Aug. 18, 1993
  § 102(e) Date: Aug. 18, 1993
[87] PCT Pub. No.: WO92/14909
  PCT Pub. Date: Sep. 3, 1992

[30] Foreign Application Priority Data
  Feb. 21, 1991 [JP] Japan .................. 3-229863
[51] Int. Cl.⁶ ........................................ F01C 1/063
[52] U.S. Cl. ........................ 418/61.2; 418/61.3; 418/150; 123/197.4
[58] Field of Search ............ 418/61.1, 61.2, 61.3, 418/150; 123/197.4

[56] References Cited

U.S. PATENT DOCUMENTS

| | | | |
|---|---|---|---|
| 3,226,013 | 12/1965 | Toyoda et al. | 418/61.2 |
| 3,253,580 | 5/1966 | Ederhard et al. | 418/61.2 |
| 5,067,456 | 11/1991 | Beachley et al. | 123/197.4 |

FOREIGN PATENT DOCUMENTS

| | | |
|---|---|---|
| 49-46009 | 5/1974 | Japan . |
| 51-104110 | 9/1976 | Japan . |
| 60-39361 | 3/1985 | Japan . |

Primary Examiner—Richard A. Bertsch
Assistant Examiner—Charles G. Freay
Attorney, Agent, or Firm—Christopher R. Pastel; Thomas R. Morrison

[57] ABSTRACT

In a rotary-piston engine, the contour of a normal section of the piston is either a composite trochoid or a translated composite trochoid. Each vertex of the normal section is either a generating point of the trochoid or has the form of a circular arc whose center is the generating point of the trochoid and whose radius is a fixed distance. Thus all the edges of the piston slide continuously on the inside face of engine cavity. The piston describes a planetary motion about a point at the same time as it revolves around an origin. Thus the volume of the working chambers changes. The opening and closing of connecting ducts for gas exchange are controlled. The resulting engine has only rotating moving parts, and they are in complete balance. The engine has no constrictions on the minor axis of the contour. Thus the movement of combustion gases is not impeded near top dead center. The engine has a high compression ratio. Because the displacement of the working chambers changes slowly near top dead center, combustion is completed before expansion begins. Therefore the conditions for thermal efficiency, maximum expansion, and maximum pressure prior to expansion are fulfilled. A reciprocating engine can be formed from this rotary-piston engine by installing a reciprocating piston on the generating point of a composite trochoid, putting a cylinder together with the piston, and using a crank mechanism that exploits the reciprocating motion generated by the generating point.

12 Claims, 28 Drawing Sheets a:b=2:1
b:r=2:3
c=0.85
β=0 a:b=2:1
b:r=2:3
c=0.85
d=4.1
β=0 a:b=2:1
b:r=2:3
c=0.8
d=2.8~5.2
Δd=0.2
β=0 a:b=2:1
b:r=2:3
c=0.9
d=2.4~4.4
Δd=0.2
β=0 a:b=2:1
b:r=2:3
c=1
d=2.5~3.4
Δd=0.3
β=$\frac{1}{3}\pi$ a:b=2:1
b:r=1:3
c=1
d=1.9~3.4
Δd=0.3
β=0 a:b=2:1
b:r=1:3
c=1
d=2~2.8
Δd=0.4
β=⅓π a:b=3:2
b:r=1:2
c=0.95
d=1.6~3
Δd=0.2
β=½π a:b=3:2
b:r=1:2
c=1
d=1.7~1.9
Δd=0.2
β=0 a:b=3:1
b:r=1:2
c=1
d=3~4.8
Δd=0.3
β=½π a:b=2:1
b:r=1:4
c=1
d=1.5~2.7
Δd=0.3
β=¼π a:b=2:1
b:r=3:4
c=1
d=2.7~4.8
Δd=0.3
β=¼π a:b=3:1
b:r=5:6
c=1
d=5~8
Δd=0.5
β=½π a:b=4:3
b:r=1:3
c=1
d=2.6~3.2
Δd=0.2
β=⅓π

Fig. 27
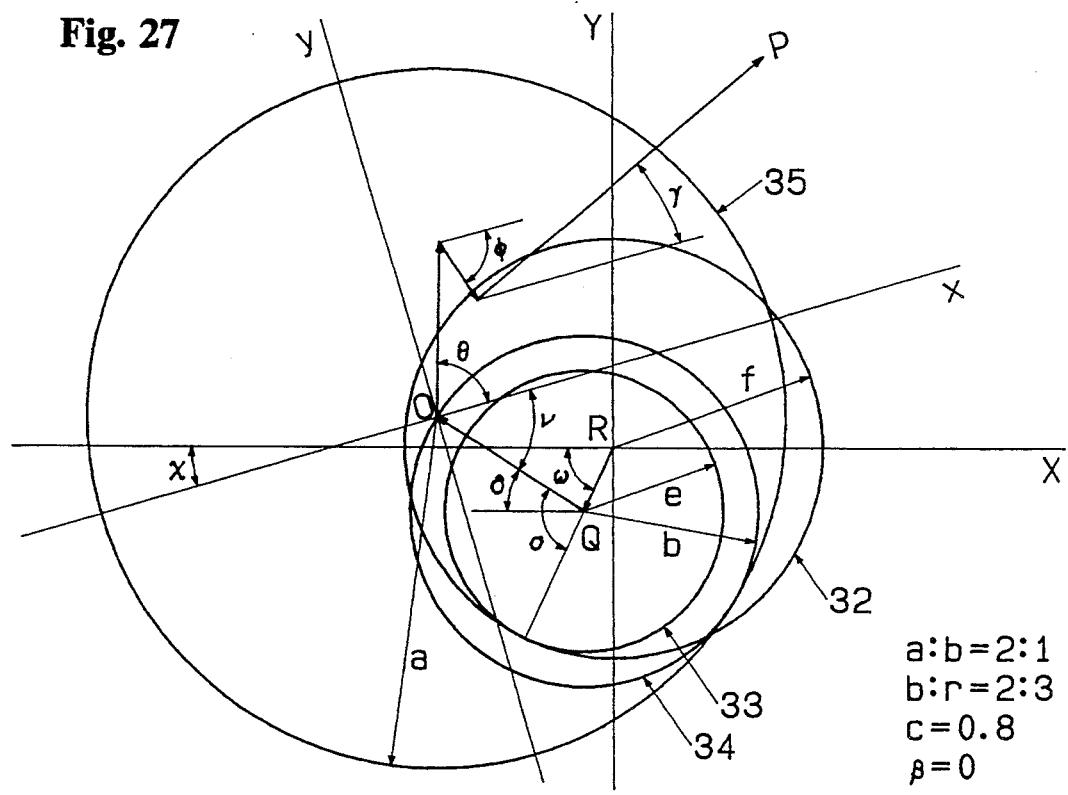
a:b=2:1
b:r=2:3
c=0.8
β=0
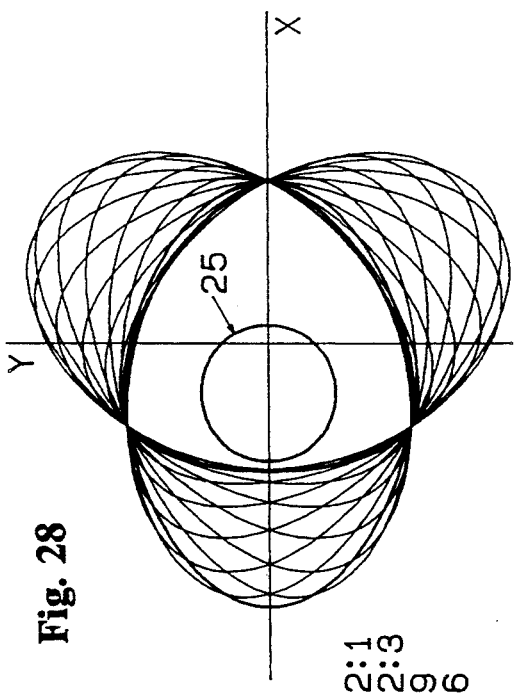
Fig. 28
a:b=2:1
b:r=2:3
c=0.9
d=3.6
β=0
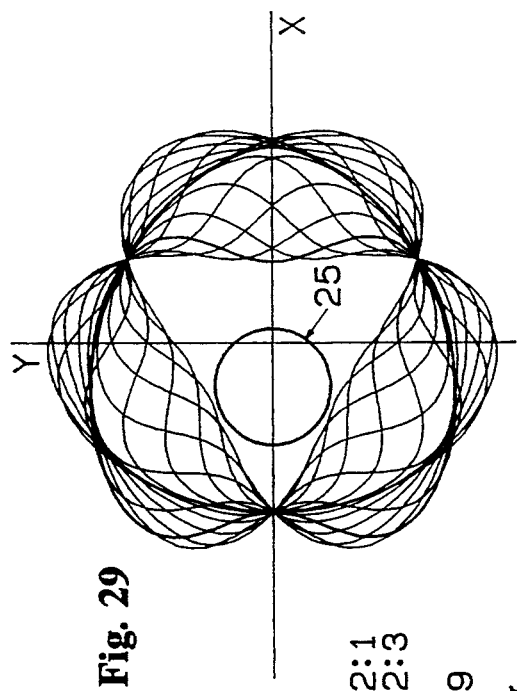
Fig. 29
a:b=2:1
b:r=2:3
c=1
d=3.9
β=$\frac{1}{3}\pi$ a:b=2:1
b:r=1:3
c=1.1
d=3.2
β=0 a:b=2:1
b:r=1:3
c=1
d=3.2
β=⅓π a:b=3:2
b:r=1:2
c=0.95
d=2.9
β=½π a:b=3:2
b:r=1:2
c=1
d=2.2
β=0 a:b=2:1
b:r=1:4
c=1
d=2.4
$\beta=\frac{1}{4}\pi$ a:b=2:1
b:r=3:4
c=1
d=3.9
$\beta=\frac{1}{4}\pi$ a:b=3:1
b:r=5:6
c=1
d=7.5
$\beta=\frac{1}{2}\pi$ a:b=4:3
b:r=1:3
c=1
d=3
$\beta=\frac{1}{3}\pi$ $a:b = 2:1$
$b:r = 2:3$
$c = 1$
$h = 2.5$
$\beta c = \frac{1}{2}\pi$
$\beta e = 0$ $a:b = 2:1$
$b:r = 1:3$
$c = 1$
$h = 4.1$
$\beta c = \frac{1}{2}\pi$
$\beta e = 0$ $a:b = 3:2$
$b:r = 1:2$
$c = 1.15$
$h = 3.3$
$\beta c = 0$
$\beta e = \frac{1}{2}\pi$ $a:b = 2:1$
$b:r = 2:3$
$c = 0.9$
$d = 3.9$
$t = 0.2a$
$\beta = 0$

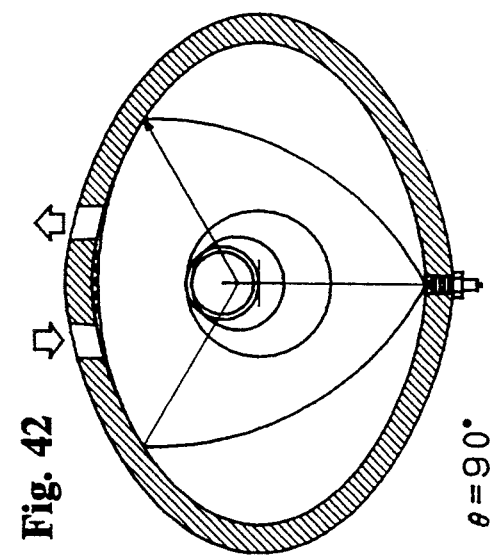
Fig. 42  θ=90°
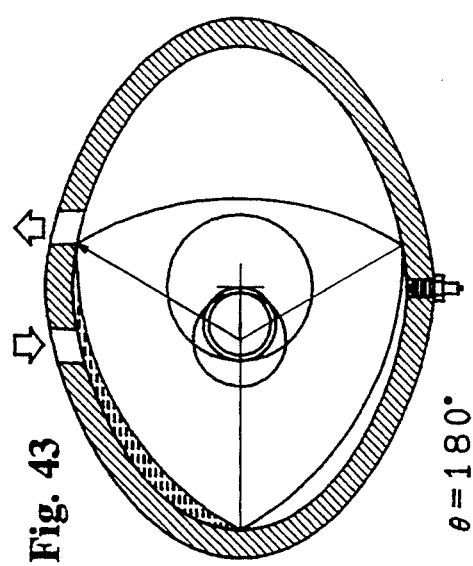
Fig. 43  θ=180°
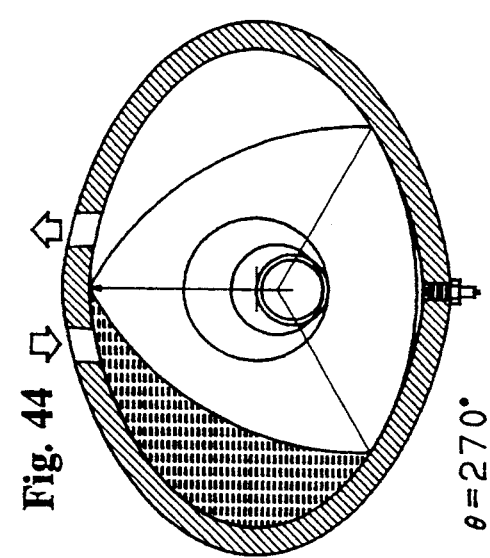
Fig. 44  θ=270°
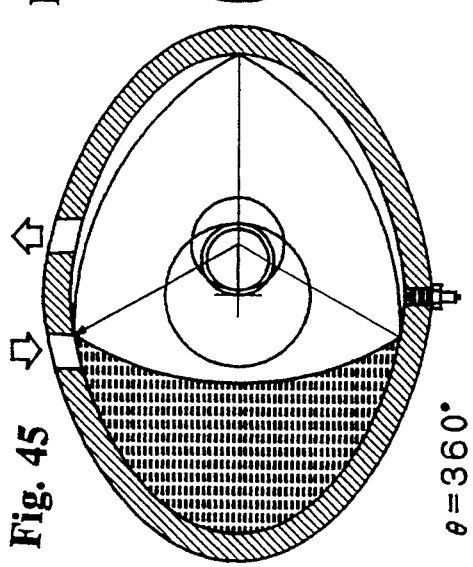
Fig. 45  θ=360°
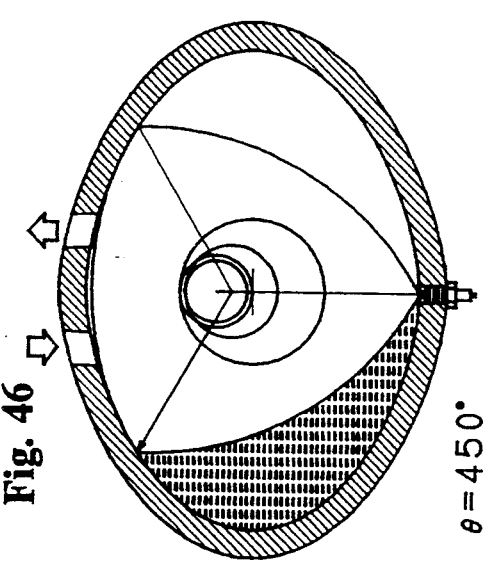
Fig. 46  θ=450°
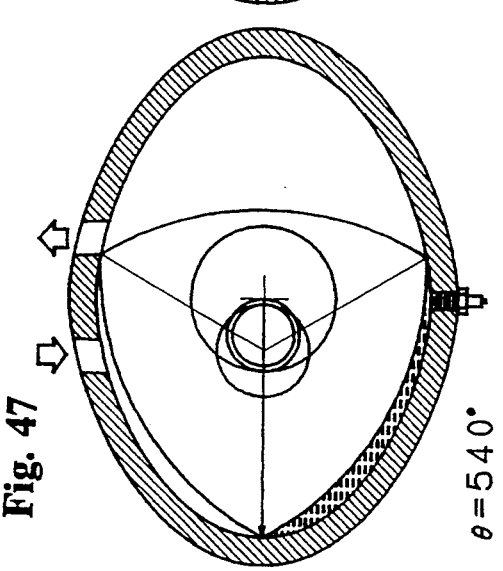
Fig. 47  θ=540°

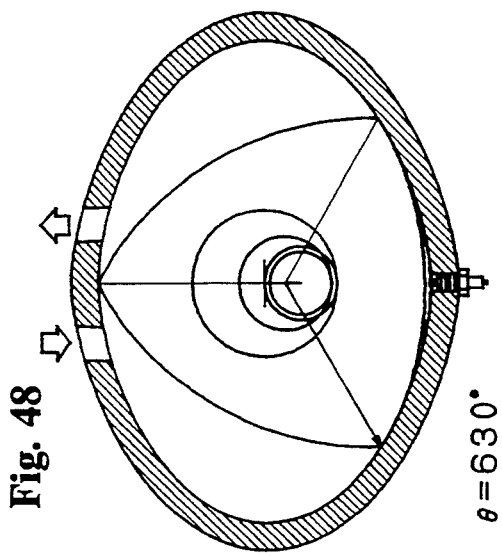
Fig. 48  θ=630°
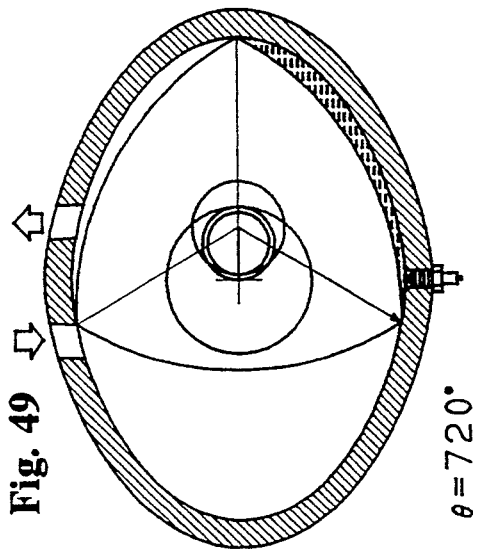
Fig. 49  θ=720°
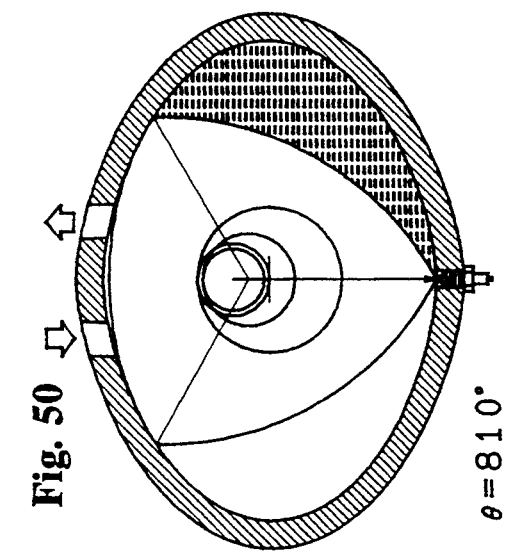
Fig. 50  θ=810°
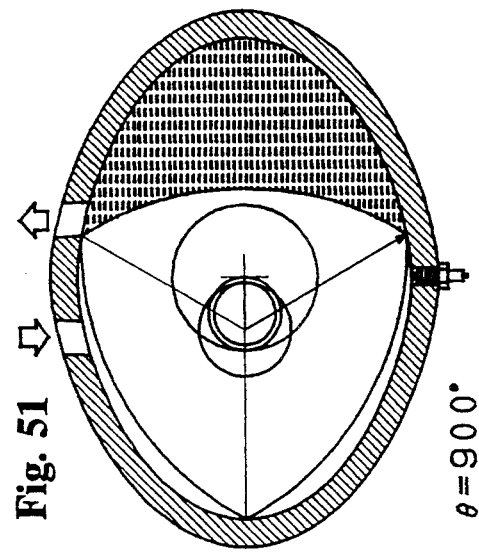
Fig. 51  θ=900°
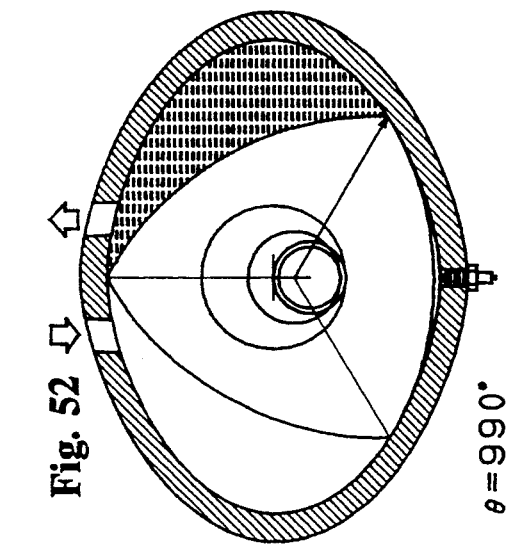
Fig. 52  θ=990°
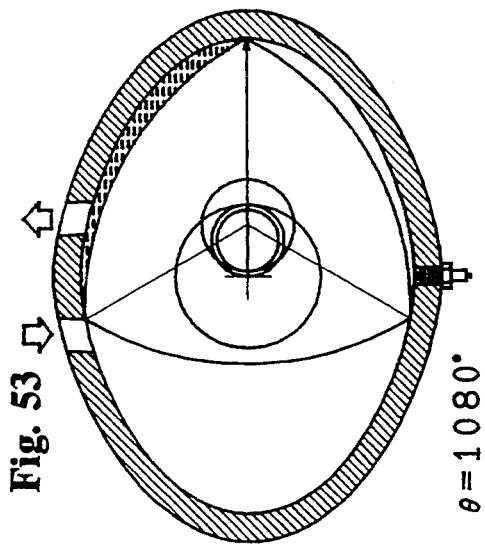
Fig. 53  θ=1080°

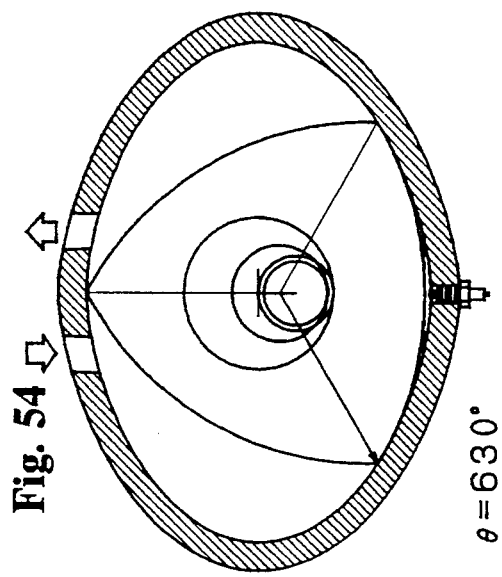
Fig. 54　θ=630°
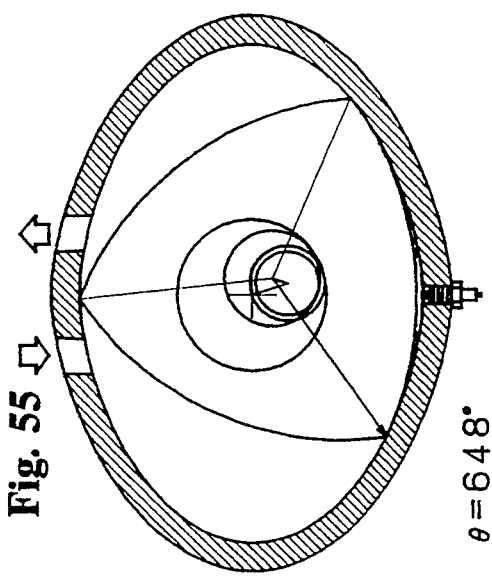
Fig. 55　θ=648°
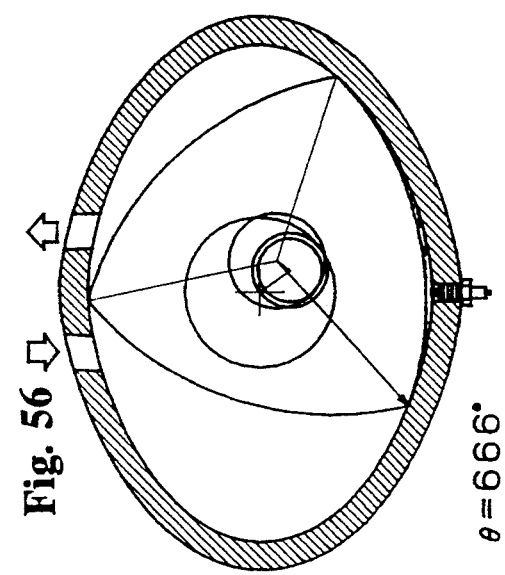
Fig. 56　θ=666°
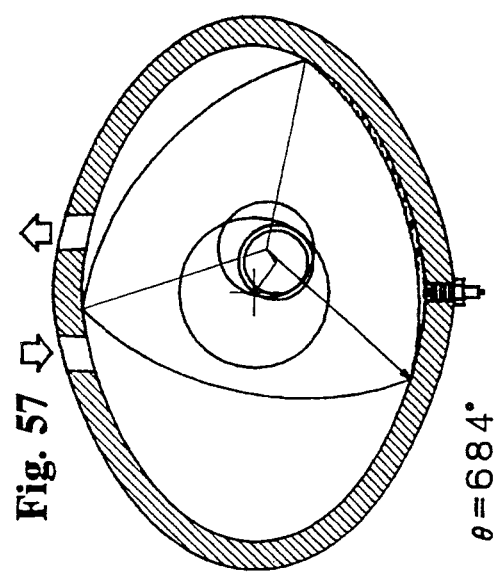
Fig. 57　θ=684°
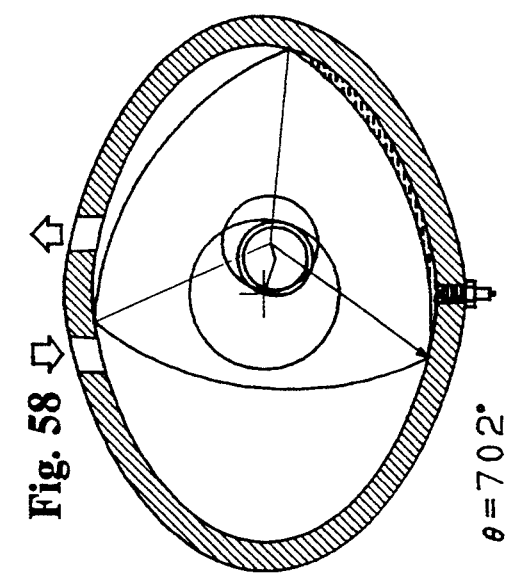
Fig. 58　θ=702°
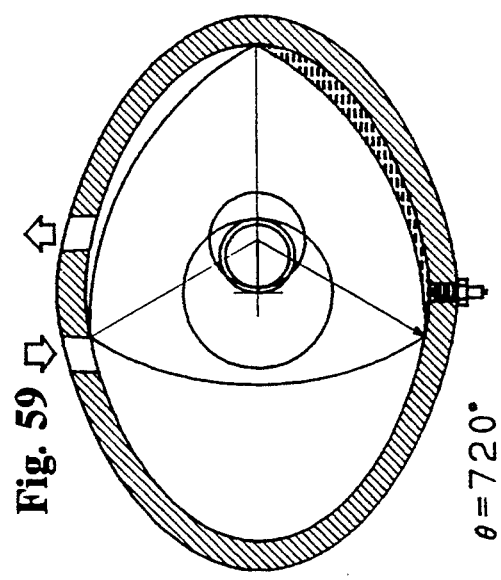
Fig. 59　θ=720°

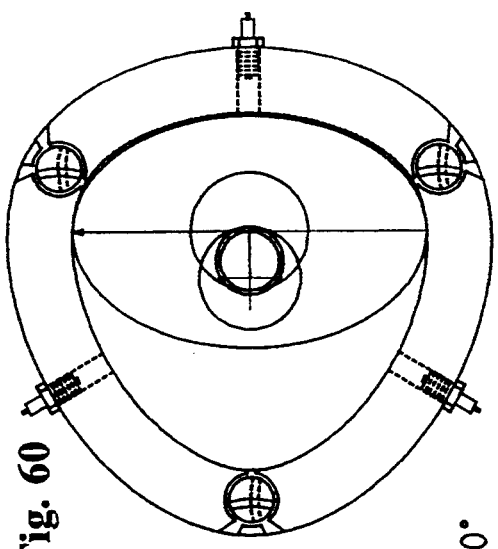
Fig. 60  θ=0°
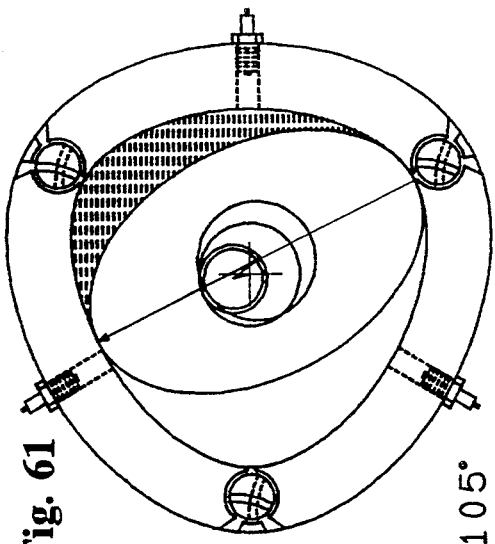
Fig. 61  θ=105°
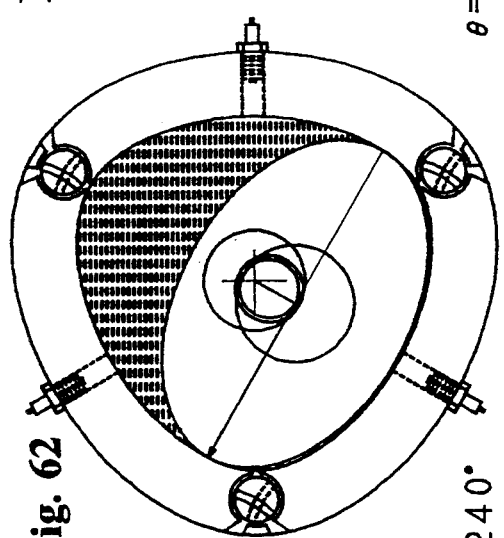
Fig. 62  θ=240°
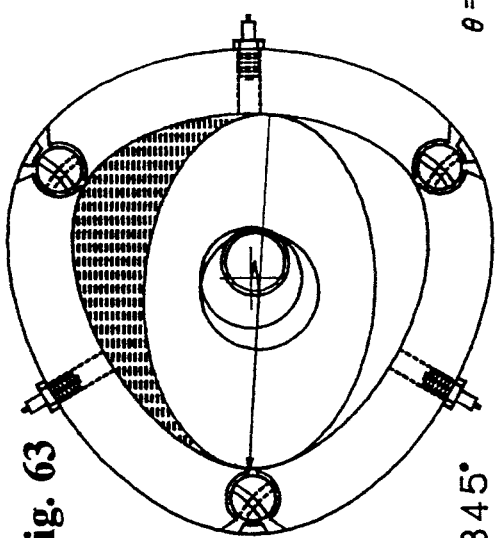
Fig. 63  θ=345°
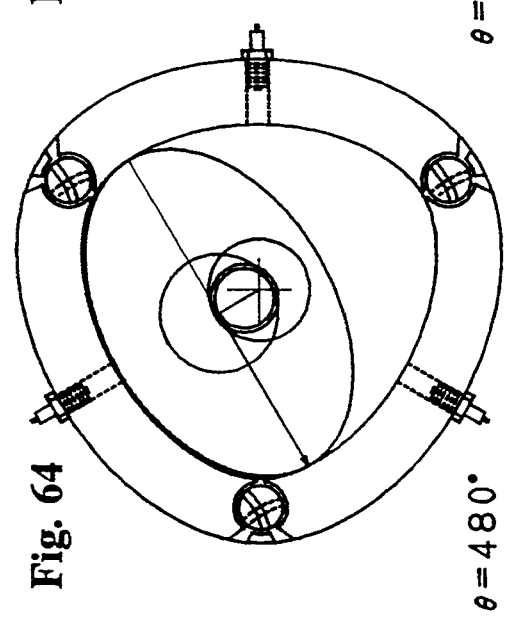
Fig. 64  θ=480°
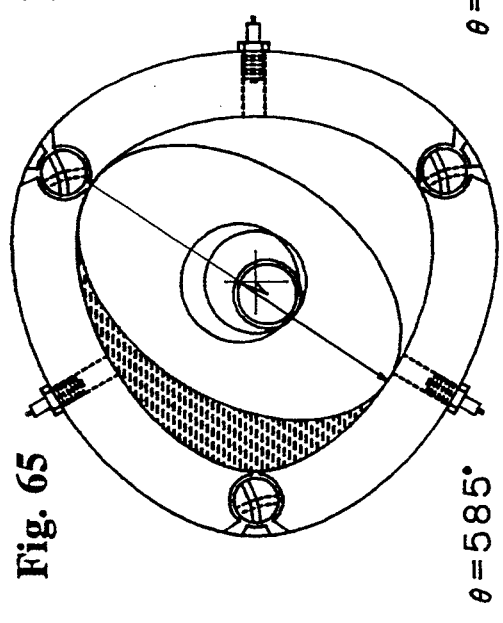
Fig. 65  θ=585°

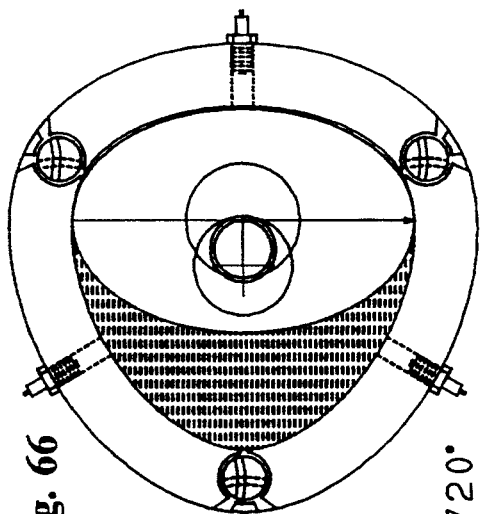
Fig. 66  θ=720°
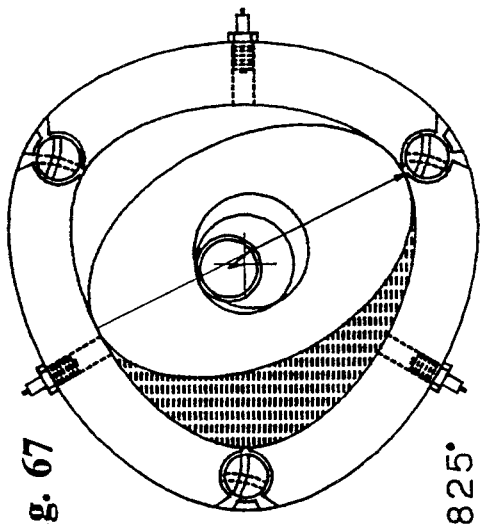
Fig. 67  θ=825°
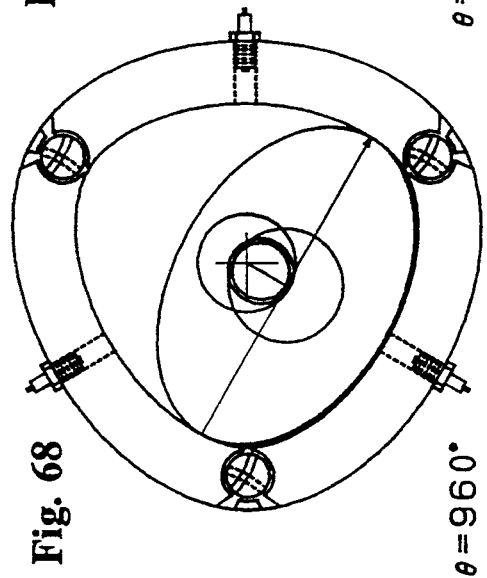
Fig. 68  θ=960°
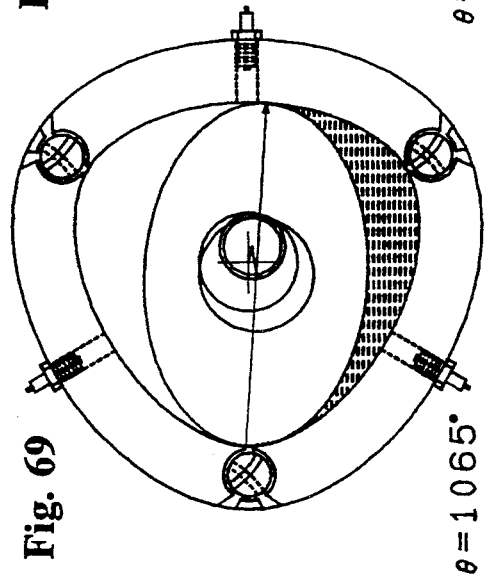
Fig. 69  θ=1065°

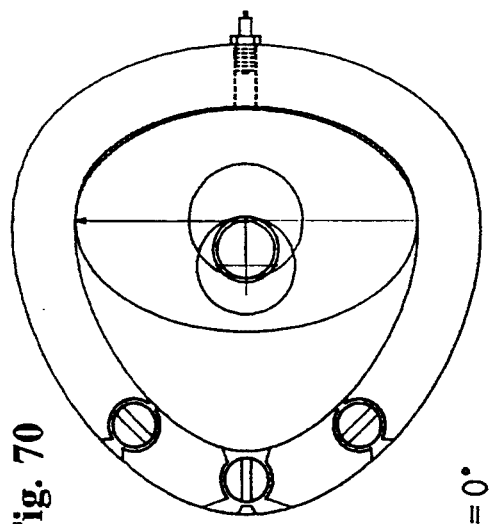
Fig. 70  θ=0°
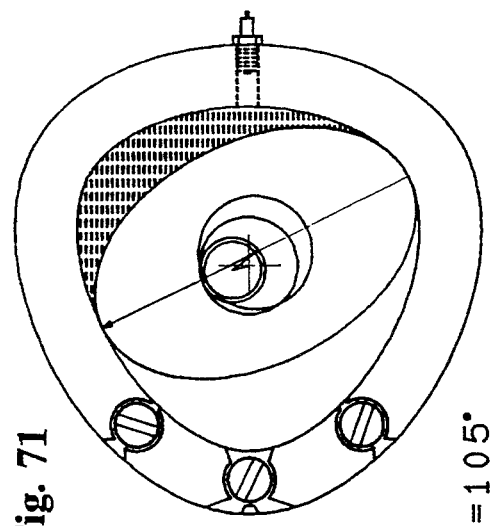
Fig. 71  θ=105°
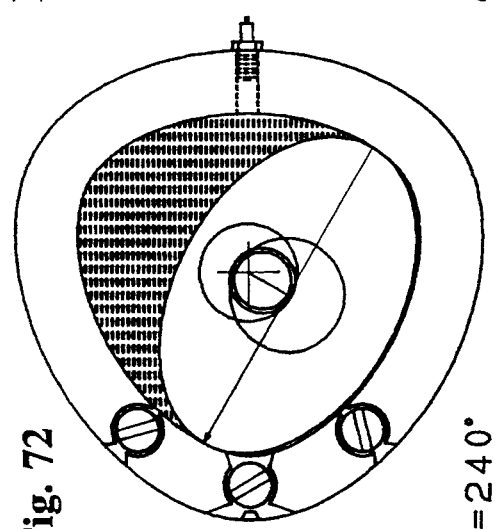
Fig. 72  θ=240°
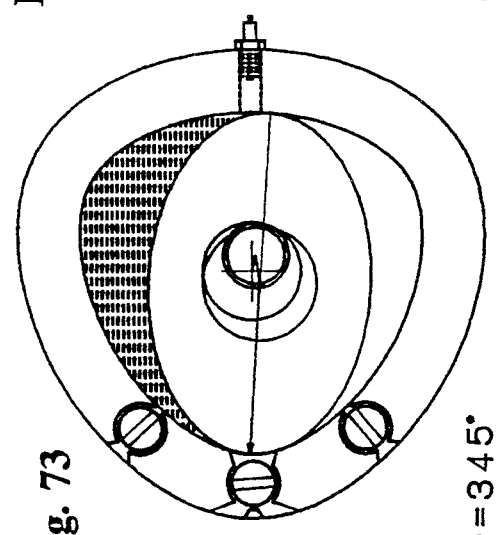
Fig. 73  θ=345°
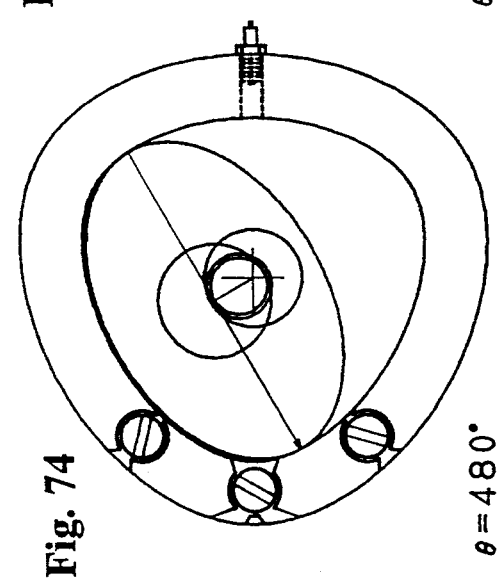
Fig. 74  θ=480°
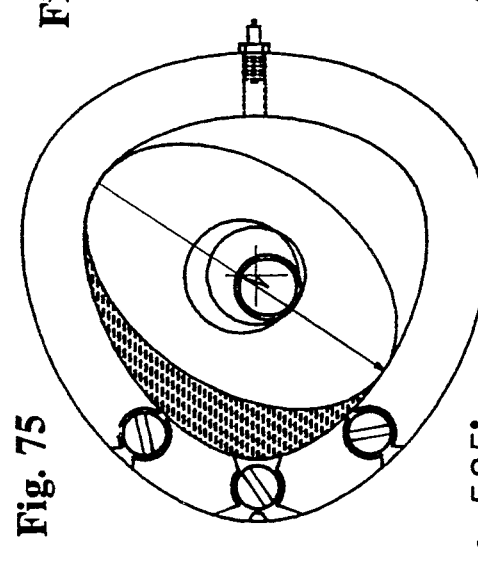
Fig. 75  θ=585°

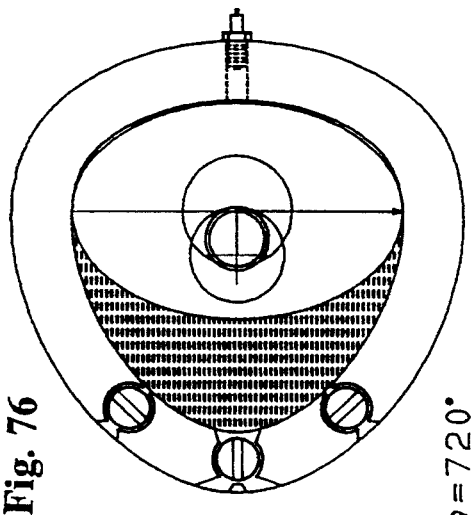
Fig. 76  θ=720°
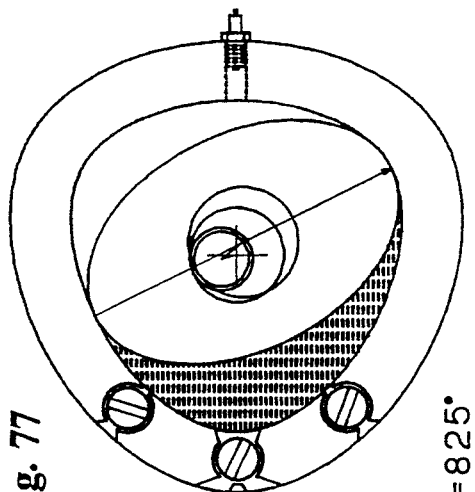
Fig. 77  θ=825°
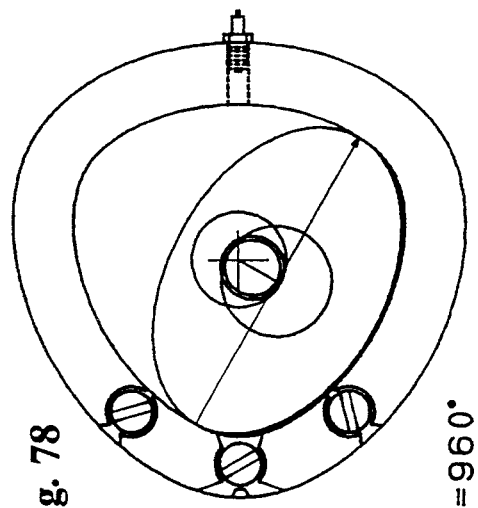
Fig. 78  θ=960°
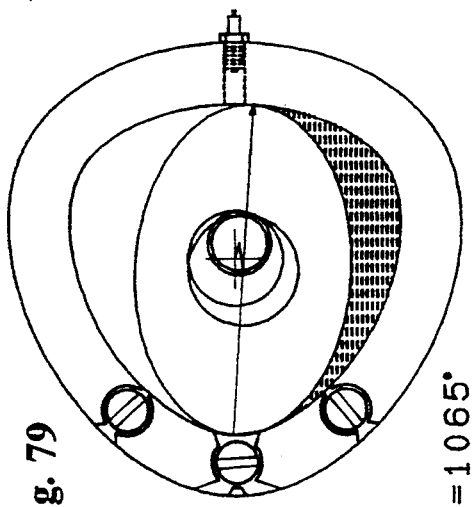
Fig. 79  θ=1065°
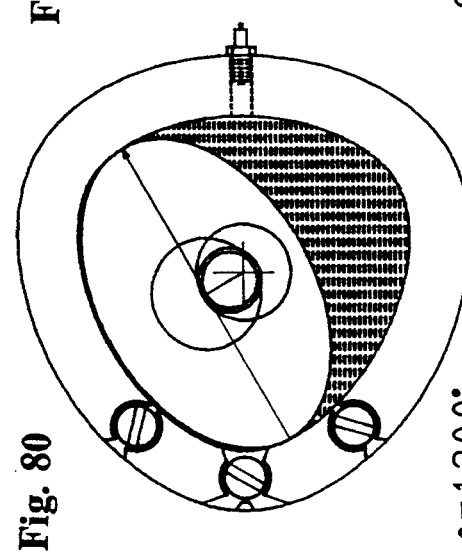
Fig. 80  θ=1200°
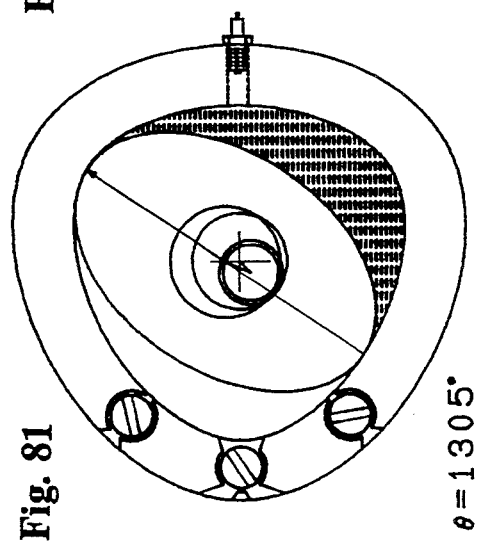
Fig. 81  θ=1305°

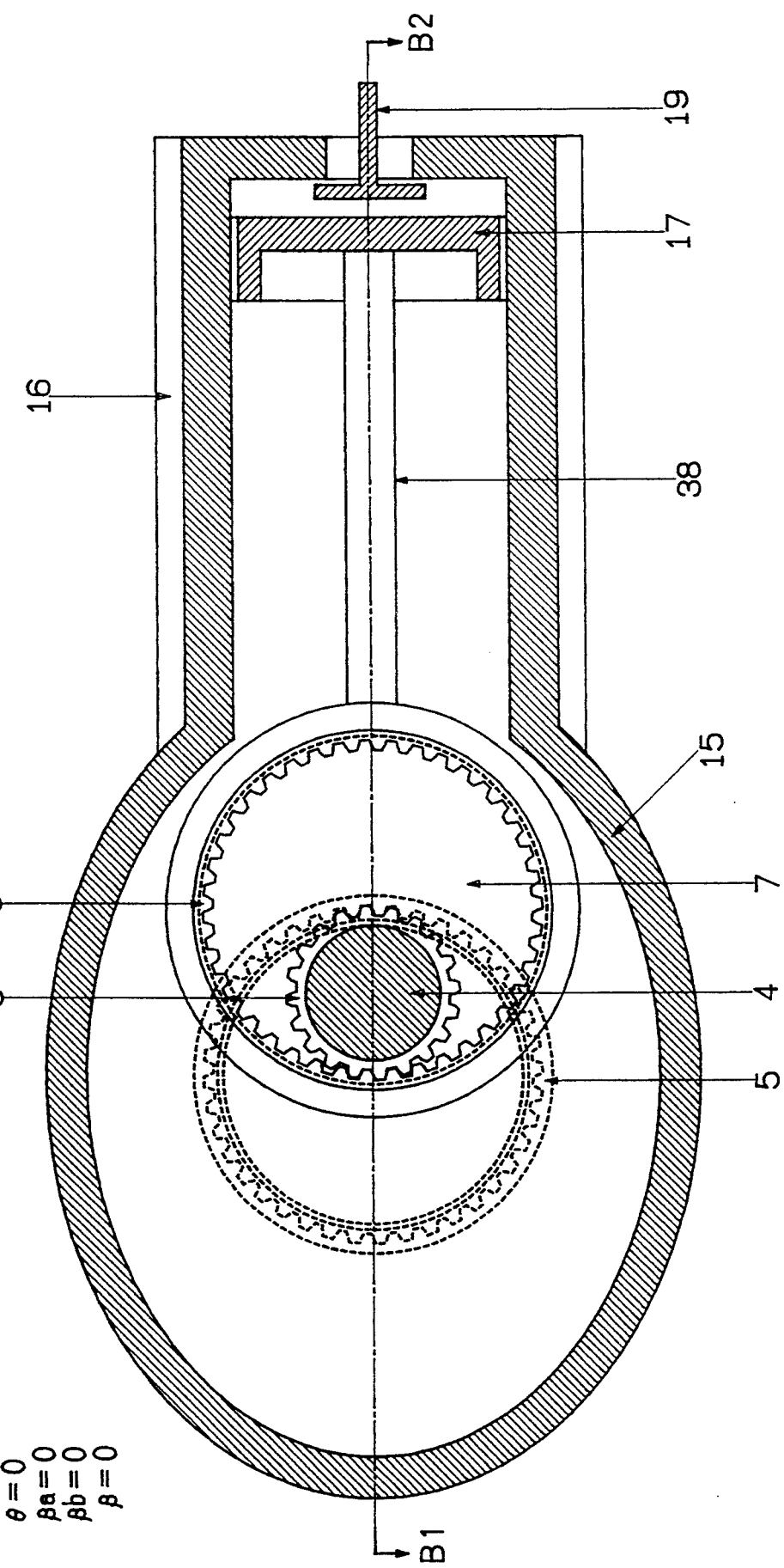

a:b=2:1
b:r=2:3
c=0.9
d=1.8
β=0 a:b=4:3
b:r=1:2
c=1
d=1.9
β=0

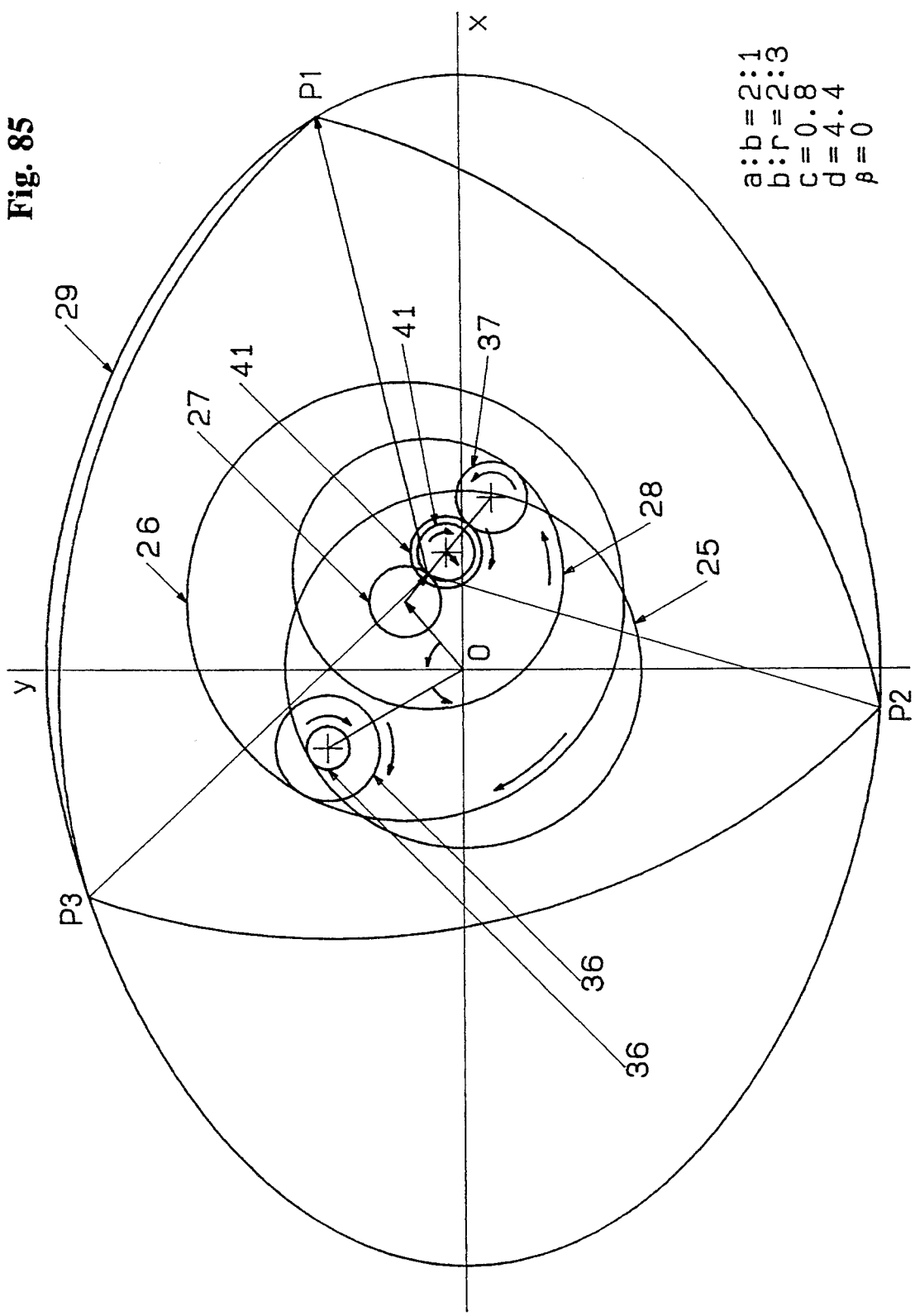

PLANETARY-MOTION ENGINE

This is a national phase filing of International Application Number PCT JP 00175 filed Feb. 20, 1992 claiming priority from Japanese patent application number 3-229863 filed Feb. 21, 1991.

BACKGROUND OF THE INVENTION

This invention relates to two embodiments of a planetary-motion engine, a rotary-piston engine and a reciprocating engine.

The internal combustion engines currently in use, in addition to the gas turbine engine, are the reciprocating engine and the Wankel rotary-piston engine.

The Wankel rotary-piston engine has many advantages, but it also has the following disadvantages. First, in the Wankel rotary-piston engine, it is impossible to raise the compression ratio high enough to sustain Diesel-engine operation. Second, the Wankel rotary-piston engine has two constrictions located on the minor axis of the contour of the normal section of the tubular cavity in the housing. These constrictions divide the working chamber along the minor axis into two parts, a trailing side and a leading side. Because of this division, when the engine cycle nears top dead center, the trailing side is compressed at the same time the leading side is expanded. This imbalance results in a loss of mechanical energy.

There is prior art that attempts to offer solutions to the abovementioned problems of the Wankel rotary-piston engine. JP, A, 49-46009 (May 2, 1974, Swiss National Patent No. 012260/72) discloses a rotary piston engine comprising: (a) a housing containing a tubular cavity, (b) parallel guide members fixed to the base of the tubular cavity, (c) an eccentric wheel with a pilot wheel installed between the parallel guide members, (d) a crankshaft in which the main shaft of the eccentric wheel is attached to the crank pin, (e) a rotating piston attached to the eccentric wheel, and (f) only one gear train including an outer gear fixed to the crank pin and an inner gear fixed to the rotating piston.

In this rotary piston engine, as the crankshaft revolves, the pilot wheel slides between the parallel guide members at the same time as it reciprocates. The pilot wheel and the eccentric wheel each rotate on their own respective axes as they revolve around the crank pin. Thus, as the crankshaft revolves, the vertex of the rotating piston describes a curve that determines the contour of the normal section of the tubular cavity.

Further, the following prior art appears in the international search report of this PCT application. JP, A, 60-39361 (March 1, 1985, John Fenton, U.S.A.) discloses a rotary-piston engine comprising: (a) a housing containing a tubular cavity, (b) an eccentric shaft which is a output shaft, (c) an eccentric ring attached to the eccentric shaft, (d) a rotating piston attached to the eccentric ring, (e) one gear pair consisting of an outer gear fixed to the eccentric shaft and an inner gear fixed to the inside of the eccentric ring, and (f) a second gear pair consisting of an outer gear fixed to the outside of the eccentric ring and an inner gear fixed to the rotating piston.

In this rotary-piston engine, no gear is fixed to the housing. As a result, the vertex of the rotating piston cannot describe the curve that determines the contour of the normal section of the tubular cavity when the rotating piston is installed in the tubular cavity.

JP, A, 51-104110 (Sep. 14, 1976, Kimiaki Kusano, Japan) discloses materials for the surface of the rotating piston of a Wankel rotary-piston engine.

In an internal combustion engine, the higher its expansion ratio, the higher its thermal efficiency. To reach a high thermal efficiency requires a high expansion ratio. In other words, the engine must complete combustion before beginning the expansion part of the cycle. However, in the case of the high-revolution internal combustion engines now in practical use, it is impossible to complete combustion either in the reciprocating engine or in the Wankel rotary-piston engine. There is simply not enough time. Thus the expansion ratio substantially decreases, and the thermal efficiency is reduced.

OBJECTS AND SUMMARY OF THE INVENTION

An object of the present invention is to make a rotary-piston engine that does not require a reciprocating mass, as such a mass reduces the power-weight ratio.

A further object of the present invention is to make a rotary-piston engine that has no constriction in the contour of the normal section of the tubular cavity in the housing, Still a further object of the present invention is to make a rotary-piston engine that has enough time to complete combustion before beginning the expansion part of the cycle.

Yet a further object of the present invention is to make a rotary-piston engine with a compression ratio high enough to permit the use of diesel fuel.

Still another object of the present invention is to make a reciprocating engine that is not impeded by a reciprocating mass.

To achieve these objects, the planetary-motion rotary-piston engine comprises a housing, a crankshaft, an eccentric shaft, a rotating piston, at least two gear units, and a plurality of connecting ducts for gas exchange.

The housing contains a tubular cavity in the shape of a fight noncircular cylinder, that is, a solid cylindrical body whose normal section, though curved, is not a perfect circle. A normal section is a section that is perpendicular to the axis of the tubular cavity. Within the tubular cavity, the flat surfaces at both ends are the bases, and the curved surface is the lateral face. Both bases and the lateral face together are the inside face.

As for the rotating piston, a normal section is a section perpendicular to the axis of rotation. Though a vertex is generally a point, in this application a corner that consists of an arc rather than a point is also referred to as a vertex.

A polyhedron is a solid body enclosed by polygons, which are the surfaces of the polyhedron. The sides of the polygons are the edges of the polyhedron, and the vertices of the polygons are the vertices of the polyhedron. If two surfaces of a polyhedron are parallel, and the polyhedron's other surfaces are parallel to a single straight line, the polyhedron is a prism. The parallel surfaces are the bases, the surfaces parallel to the single straight line are the lateral faces, and the intersection of two adjacent lateral faces is the lateral edge of the prism. Further, when the lateral edges of a prism meet its base perpendicularly, the prism is a right prism.

Each lateral face of a right prism is flat, and each of its lateral edges is a straight line. In this application a fight prism can also have cylindrical lateral faces and lateral edges. In other words, if the sides of the normal section of a right prism are curved, the solid body is still a right prism, as it is also if the vertices of the normal section of are arcs instead of points.

The curve that determines the contour of the normal section of the tubular cavity is either a composite trochoid or a translated composite trochoid in which the composite trochoid has been translated in parallel outwards a fixed distance along a line normal to the composite trochoid and the inner and outer envelopes of the family of curves of the composite trochoid have at least two points of osculation. Further, the outer envelope of the family of curves that determines the contour of the normal section of the rotating piston can also be the contour of the normal section of the tubular cavity.

The composite trochoid is the locus of the generating point of a peritrochoid in combination with a hypotrochoid, provided two conditions are met. The first condition is that the base circle of the peritrochoid be fixed to the eccentric arm of the hypotrochoid, so that the base circle of the peritrochoid and the rolling circle of the hypotrochoid are concentric. The second condition is that the eccentric arm of the peritrochoid be fixed to the generating arm of the hypotrochoid, so that the center of the rolling circle of the peritrochoid becomes the generating point of the hypotrochoid.

The crankshaft comprises a main shaft and a crank pin. The function of the crankshaft is equivalent to that of the eccentric arm of the hypotrochoid. The main shaft pierces through the two bases of the tubular cavity along its axis. When the diameter of the rolling circle of the hypotrochoid is longer than the radius of the base circle of the hypotrochoid, we can also use a crankshaft (an eccentric shaft) whose main shaft pierces through its crank pin.

The eccentric shaft comprises an eccentric main shaft and an eccentric wheel. The function of the eccentric shaft is equivalent to that of the generating arm of the hypotrochoid and the eccentric arm of the peritrochoid. The eccentric main shaft is attached to the crank pin.

The rotating piston is attached to the eccentric wheel and has the shape of a right prism whose bases slide continuously on the bases of the tubular cavity. Each vertex of the normal section of the rotating piston is either the generating point of the composite trochoid or it has the form of a circular arc whose center is the generating point of the composite trochoid and whose radius is equal to fixed distance. Further, the composite trochoid can be the contour of the normal section of the rotating piston.

A first gear unit consists essentially of a fixed gear fixed to the base of the tubular cavity and a rolling gear fixed to the eccentric main shaft. The gear unit can have at least one idle gear. The function of the fixed gear is equivalent to that of the base circle of the hypotrochoid. The function of the rolling gear is equivalent to that of the rolling circle of the hypotrochoid.

A second gear unit consists essentially of a fixed gear fixed to the crank pin and a rolling gear fixed to the rotating piston. The gear unit can have at least one idle gear. The function of the fixed gear is equivalent to that of the base circle of the peritrochoid. The function of the rolling gear is equivalent to that of the rolling circle of the peritrochoid.

The connecting ducts make openings into the working chambers formed by the inside face of the tubular cavity and the lateral faces of the rotating piston. The rotary motion of the rotating piston controls the opening and closing of the connecting ducts for gas exchange.

From the above planetary-motion rotary-piston engine, we can derive other planetary-motion engines.

One such engine comprises a composite trochoid in which the ratio between the radii of the hypotrochoid's base circle and rolling circle is 2:1 and the ratio between the radii of the peritrochoid's base circle and rolling circle is 2:3.

Another such engine comprises a composite trochoid in which the ratio between the radii of the hypotrochoid's base circle and rolling circle is 3:2 and the ratio between the radii of the peritrochoid's base circle and rolling circle is 1:2.

Finally, the above-mentioned planetary-motion reciprocating engine is characterized by installing a reciprocating piston on the generating point of a composite trochoid or a translated composite trochoid, in which the composite trochoid has been translated in parallel a fixed distance along a line normal to the composite trochoid; by putting a cylinder together with the reciprocating piston; and by using a crank mechanism that exploits the reciprocating motion generated by the generating point of the composite trochoid or of the translated composite trochoid. In this composite trochoid, the ratio between the radius of the hypotrochoid's base circle and the radius of its rolling circle is 2:1, the ratio between the radius of the peritrochoid's base circle and the radius of its rolling circle is 1:2, and the radius of the base circle of the peritrochoid is equal to the radius of the rolling circle of the hypotrochoid.

The above crank mechanism comprises a crank case, a crankshaft, an eccentric shaft, a connecting member, and two gear units.

The crankshaft comprises a crank main shaft and a crank pin, and the function of the crankshaft is equivalent to the function of the eccentric arm of the hypotrochoid.

The eccentric shaft comprises an eccentric wheel and an eccentric main shaft attached to the crank pin. The function of the eccentric shaft is equivalent to the function of the generating arm of the hypotrochoid and of the eccentric arm of the peritrochoid.

The connecting member connects the reciprocating piston to the eccentric wheel, and the big end of the connecting member is attached to the eccentric wheel so that the connecting member may revolve therearound. The axis of the revolution of the connecting member is the center of the big end of the connecting member. The center of the small end of the connecting member is the generating point of either the composite trochoid or the translated composite trochoid, and the function of the connecting member is equivalent to that of the generating arm of the peritrochoid. The reciprocating piston is fixed to the small end of the connecting member.

One of the two gear units consists of a fixed gear attached to the crank case and a rolling gear attached to the eccentric main shaft, or of a fixed gear attached to the crank case, a rolling gear attached to the eccentric main shaft, and at least one idle gear. The function of these fixed gears is equivalent to the function of the base circle of the hypotrochoid. The function of these rolling gears is equivalent to the function of the rolling circle of the hypotrochoid.

The other of the two gear units consists of a fixed gear attached to the crank pin and a rolling gear attached to the big end of the connecting member, or of a fixed gear attached to the crank pin, a rolling gear attached to the big end of the connecting member, and at least one idle gear. The function of these fixed gears is equivalent to the function of the base circle of the peritrochoid. The function of these rolling gears is equivalent to the function of the rolling circle of the peritrochoid.

Briefly stated, in a rotary-piston engine, the contour of a normal section of the piston is either a composite trochoid or a translated composite trochoid. Each vertex of the normal section is either a generating point of the trochoid or has the form of a circular arc whose center is the generating point of the trochoid and whose radius is a fixed distance. Thus all the edges of the piston slide continuously on the inside face of engine cavity. The piston describes a planetary motion about a point at the same time as it revolves around an origin. Thus the volume of the working chambers changes. The opening and closing of connecting ducts for gas exchange are controlled. The resulting engine has only rotating moving parts, and they are in complete balance. The engine has no constrictions on the minor axis of the contour. Thus the movement of combustion gases is not impeded near top dead center. The engine has a high compression ratio. Because the displacement of the working chambers changes slowly near top dead center, combustion is completed before expansion begins. Therefore the conditions for thermal efficiency, maximum expansion, and maximum pressure prior to expansion are fulfilled. A reciprocating engine can be formed from this rotary-piston engine by installing a reciprocating piston on the generating point of a composite trochoid, putting a cylinder together with the piston, and using a crank mechanism that exploits the reciprocating motion generated by the generating point.

According to an embodiment of the invention, a planetary-motion rotary-piston engine comprises: a housing containing a tubular cavity shaped as a right noncircular cylinder, in which a curve that determines a contour of a normal section of the tubular cavity is a composite trochoid composed of a hypotrochoid and a peritrochoid; the composite trochoid having a family of curves; the family of curves having an inner envelope and an outer envelope with at least two points of osculation; a crankshaft, pierced through bases of the tubular cavity along its axis, the crankshaft being functionally equivalent to an eccentric arm of the hypotrochoid; an eccentric shaft, attached to a crank pin of the crank shaft, the eccentric shaft being functionally equivalent to a generating arm of the hypotrochoid and to an eccentric arm of the peritrochoid; a rotating piston, attached to an eccentric wheel of the eccentric shaft, shaped as a right prism whose bases slide continuously on the bases of the tubular cavity; each vertex of a normal section of the rotating piston being a generating point of the composite trochoid; a first gear unit comprising a first fixed gear fixed to the base of the tubular cavity, the first fixed gear being functionally equivalent to a base circle of the hypotrochoid; and a first rolling gear fixed to a main shaft of the eccentric shaft, the first rolling gear being functionally equivalent to a rolling circle of the hypotrochoid; a second gear unit comprising a second fixed gear fixed to the crank pin, the second fixed gear being functionally equivalent to a base circle of the peritrochoid; and a second rolling gear fixed to the rotating piston, the second fixed gear being functionally equivalent to a rolling circle of the peritrochoid; and connecting ducts for gas exchange whose opening and closing are controlled by the rotating piston.

According to a feature of the invention, a planetary-motion reciprocating engine comprises: a reciprocating piston installed at a generating point of a composite trochoid composed of a hypotrochoid and a peritrochoid; the hypotrochoid having a ratio between radii of a base circle and a rolling circle of 2:1; the peritrochoid having a ratio between radii of a base circle and a rolling circle of 1:2; a radius of the rolling circle of the hypotrochoid being equal to a radius of the base circle of the peritrochoid; a crank mechanism effective for exploiting a reciprocating motion generated by the generating point of the composite trochoid, the crank mechanism comprising a crankshaft functionally equivalent to an eccentric arm of the hypotrochoid; an eccentric shaft attached to a crank pin of the crank shaft, the eccentric shaft being functionally equivalent to a generating arm of the hypotrochoid and to an eccentric arm of the peritrochoid; a connecting member connecting the reciprocating piston to an eccentric wheel of the eccentric shaft, the connecting member being functionally equivalent to a generating arm of the peritrochoid; a first gear unit comprising a first fixed gear coaxial with a main shaft of the crank shaft, the first fixed gear being functionally equivalent to the base circle of the hypotrochoid; and a first rolling gear fixed to a main shaft of the eccentric shaft, the first rolling gear being functionally equivalent to the rolling circle of the hypotrochoid; a second gear unit comprising a second fixed gear fixed to the crank pin, the second fixed gear being functionally equivalent to the base circle of the peritrochoid; and a second rolling gear fixed to a end of the connecting member, the second rolling gear being functionally equivalent to the rolling circle of the peritrochoid; and a cylinder within which the reciprocating piston moves back and forth.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 27 shows the elementary geometric structure of the family of curves of the composite trochoid.

FIGS. 28–37 show families of curves of the composite trochoid for different values of a, b, r, c, d, and $\beta$.

FIGS. 42–59 show the cycle of operations of the first embodiment.

FIG. 42 shows the intake stroke at T.D.C. (top dead center).

FIG. 43 shows the intake stroke at 90° after T.D.C.

FIG. 44 shows the intake stroke at 180° after T.D.C.

FIG. 45 shows the intake stroke at B.D.C. (bottom dead center).

FIG. 46 shows the compression stroke at 180° before T.D.C.

FIG. 47 shows the compression stroke at 90° before T.D.C.

FIG. 48 shows the compression stroke at T.D.C.

FIG. 49 shows the expansion stroke at 90° after T.D.C.

FIG. 50 shows the expansion stroke at 180° after T.D.C.

FIG. 51 shows the expansion stroke at B.D.C.

FIG. 52 shows the exhaust stroke at 180° before T.D.C.

FIG. 53 shows the exhaust stroke at 90° before T.D.C.

FIG. 54 shows the expansion stroke at T.D.C.

FIG. 55 shows the expansion stroke at 18° after T.D.C.

FIG. 56 shows the expansion stroke at 36° after T.D.C.

FIG. 57 shows the expansion stroke at 54° after T.D.C.

FIG. 58 shows the expansion stroke at 72° after T.D.C.

FIG. 59 shows the expansion stroke at 90° after T.D.C.

FIGS. 60–69 show the cycle of operations of the second embodiment.

FIG. 60 shows the intake stroke at T.D.C.

FIG. 61 shows the intake stroke at 105° after T.D.C.

FIG. 62 shows the intake stroke at B.D.C.

FIG. 63 shows the compression stroke at 105° after B.D.C.

FIG. 64 shows the compression stroke at T.D.C.

FIG. 65 shows the expansion stroke at 105° after T.D.C.

FIG. 66 shows the expansion stroke at B.D.C.

FIG. 67 shows the exhaust stroke at 105° after B.D.C.

FIG. 68 shows the exhaust stroke at T.D.C.

FIG. 69 shows the intake stroke at 105° after T.D.C.

FIGS. 70–81 show the cycle of operations of the third embodiment.

FIG. 70 shows the compression stroke at T.D.C.

FIG. 71 shows the expansion stroke at 105° after T.D.C.

FIG. 72 shows the expansion stroke at B.D.C.

FIG. 73 shows the exhaust stroke at 105° after B.D.C.

FIG. 74 shows the exhaust stroke at T.D.C.

FIG. 75 shows the scavenging stroke at 105° after T.D.C.

FIG. 76 shows the scavenging stroke at B.D.C.

FIG. 77 shows the scavenging stroke at 105° after B.D.C.

FIG. 78 shows the scavenging stroke at T.D.C.

FIG. 79 shows the intake stroke at 105° after T.D.C.

FIG. 80 shows the intake stroke at B.D.C.

FIG. 81 shows the compression stroke at 105° after B.D.C.

FIG. 82 shows the fourth embodiment in a sectional view taken along the lines C1–C2 of FIG. 8.

FIG. 85 shows an example of the elementary geometric structure of a quasi-composite trochoid.

DETAILED DESCRIPTION OF THE PREFERRED EMBODIMENTS

Figure 1:
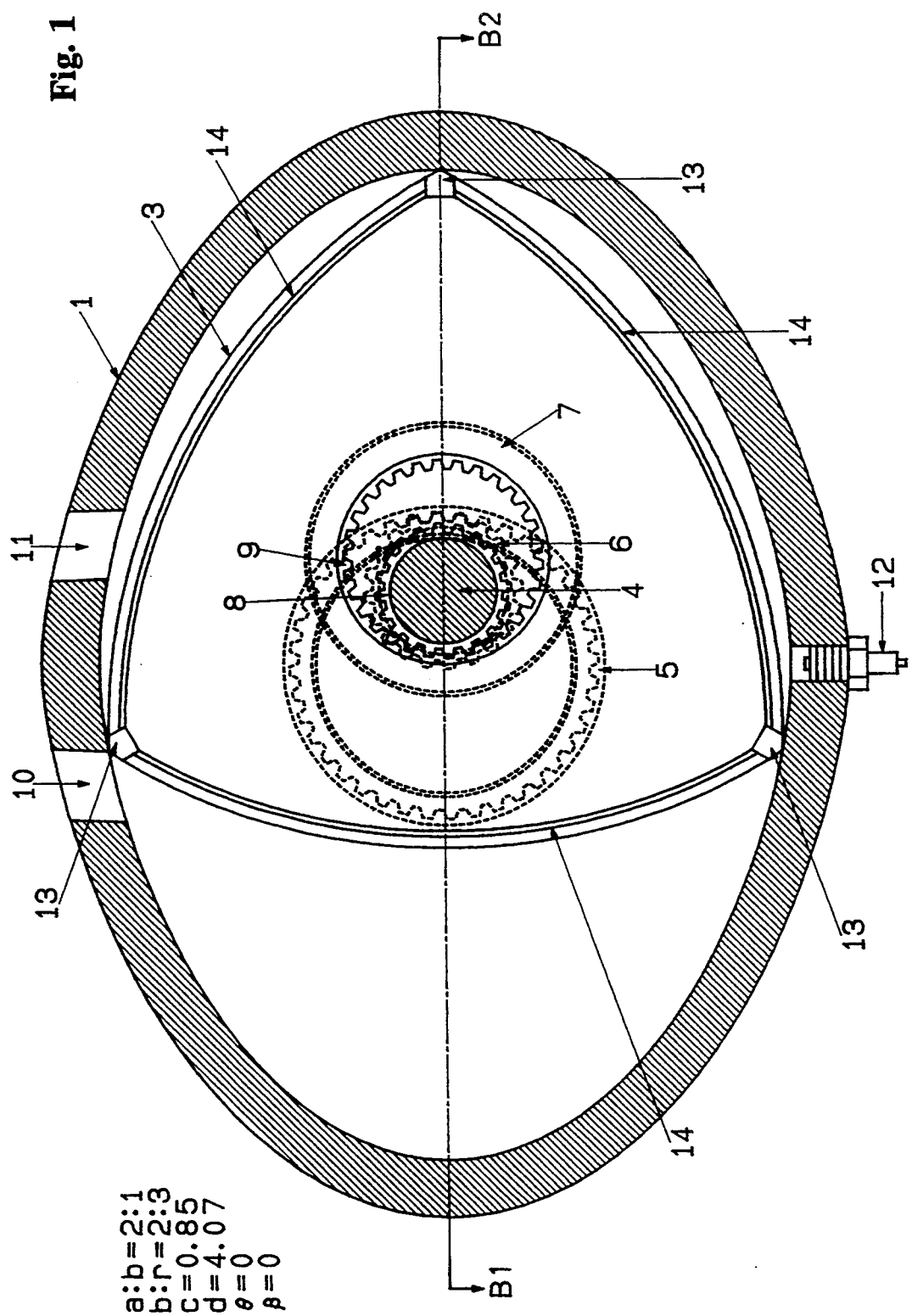
FIG. 1 is a perspective view of a first embodiment of the present invention taken along the lines C1–C2 of FIG. 2.
Figure 2:
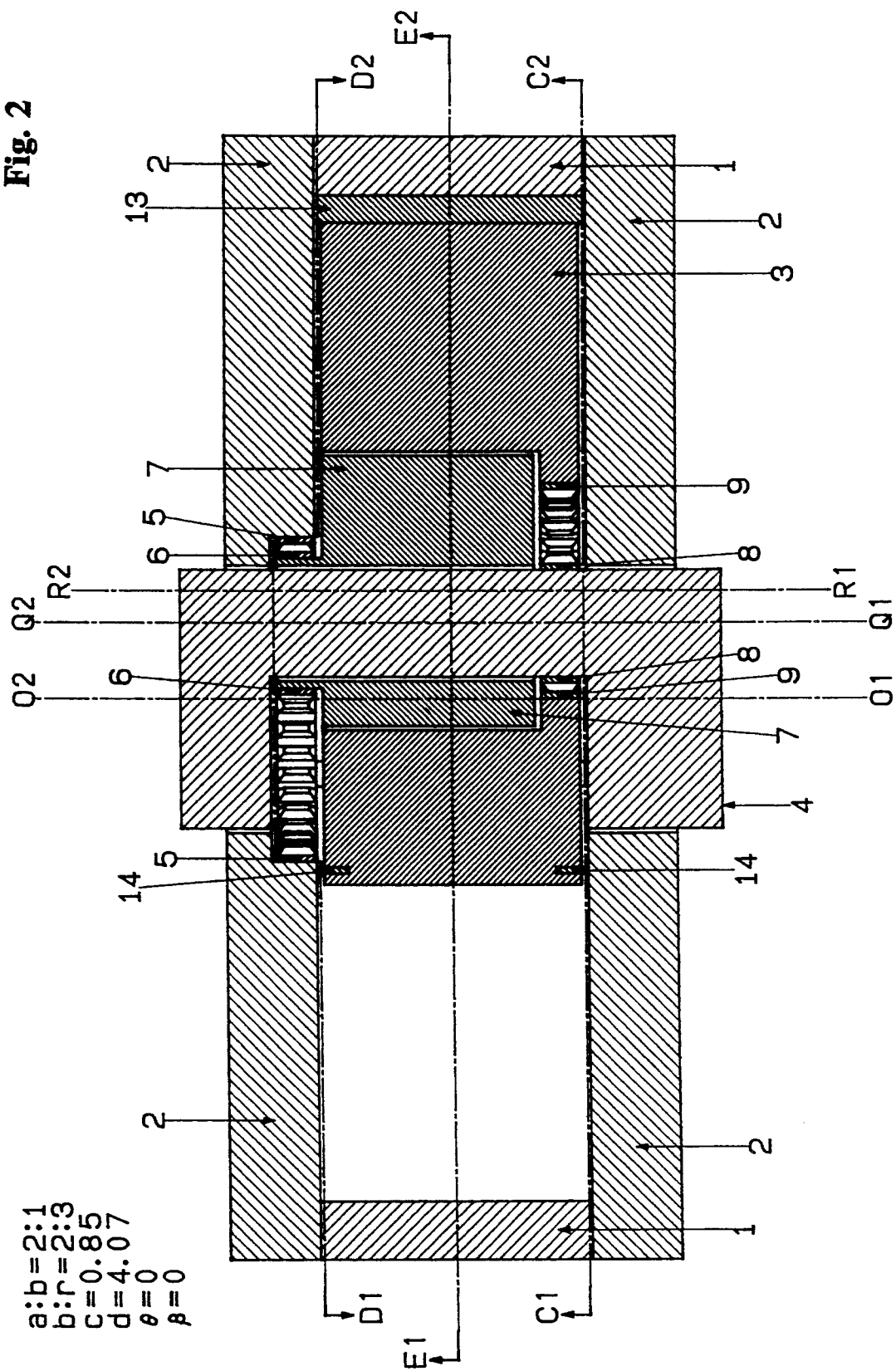
FIG. 2 is a sectional view of a first embodiment of the present invention taken along the lines B1–B2 of FIG. 1.
Figure 3:
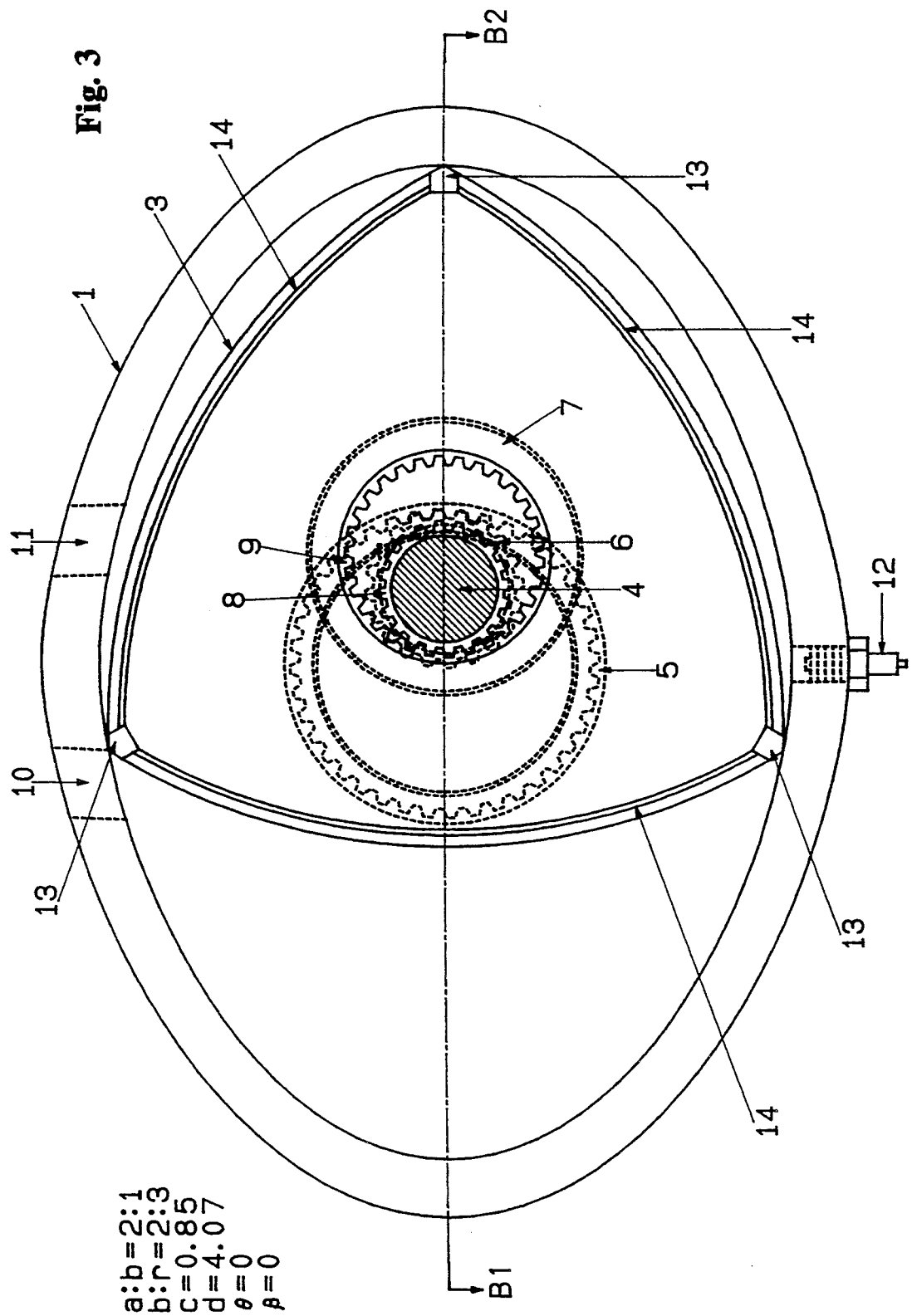
FIG. 3 is a sectional view of a first embodiment of the present invention taken along the lines C1–C2 of FIG. 2.
Figure 4:
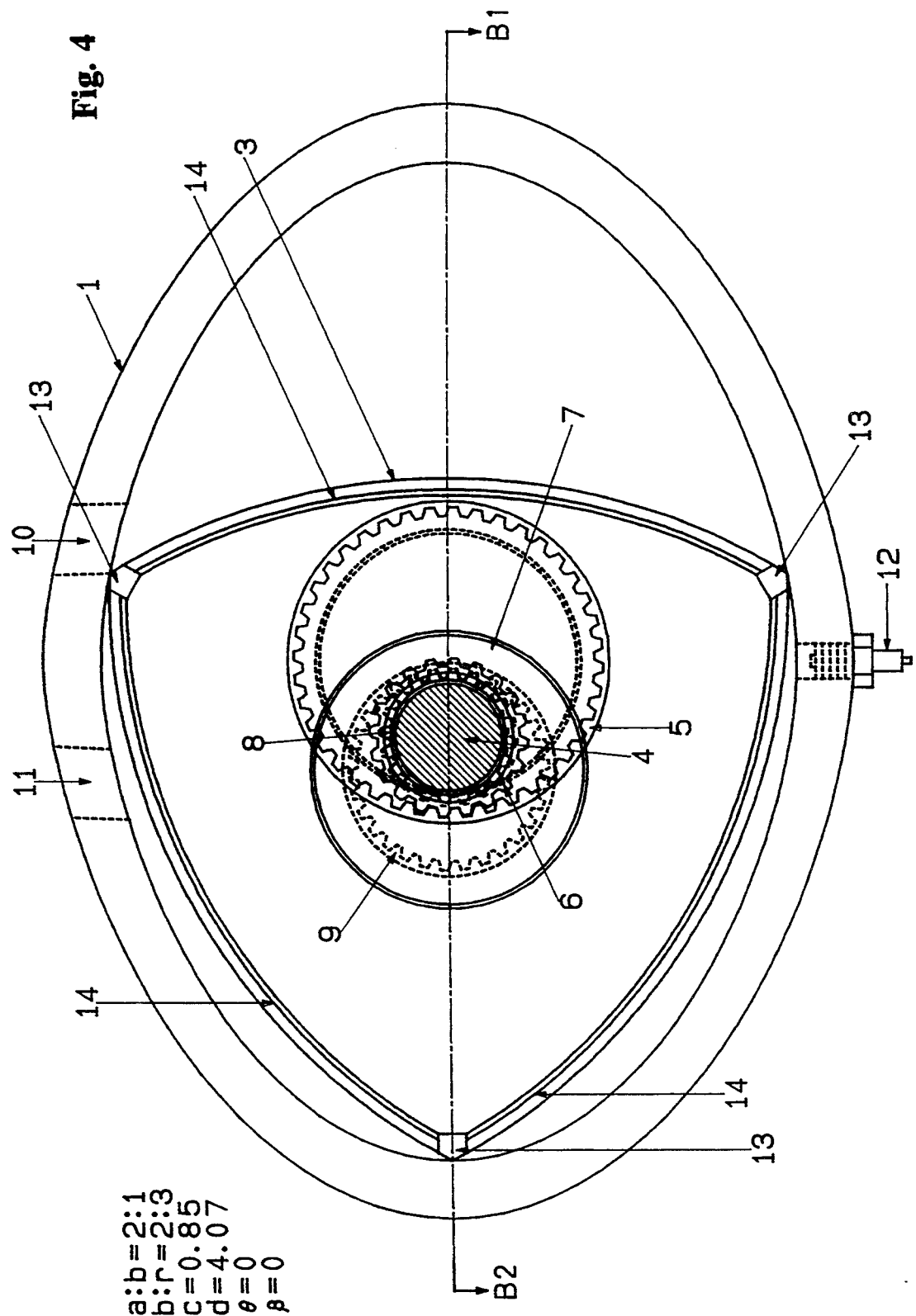
FIG. 4 is a sectional view of a first embodiment of the present invention taken along the lines D2–D1 of FIG. 2.
Figure 5:
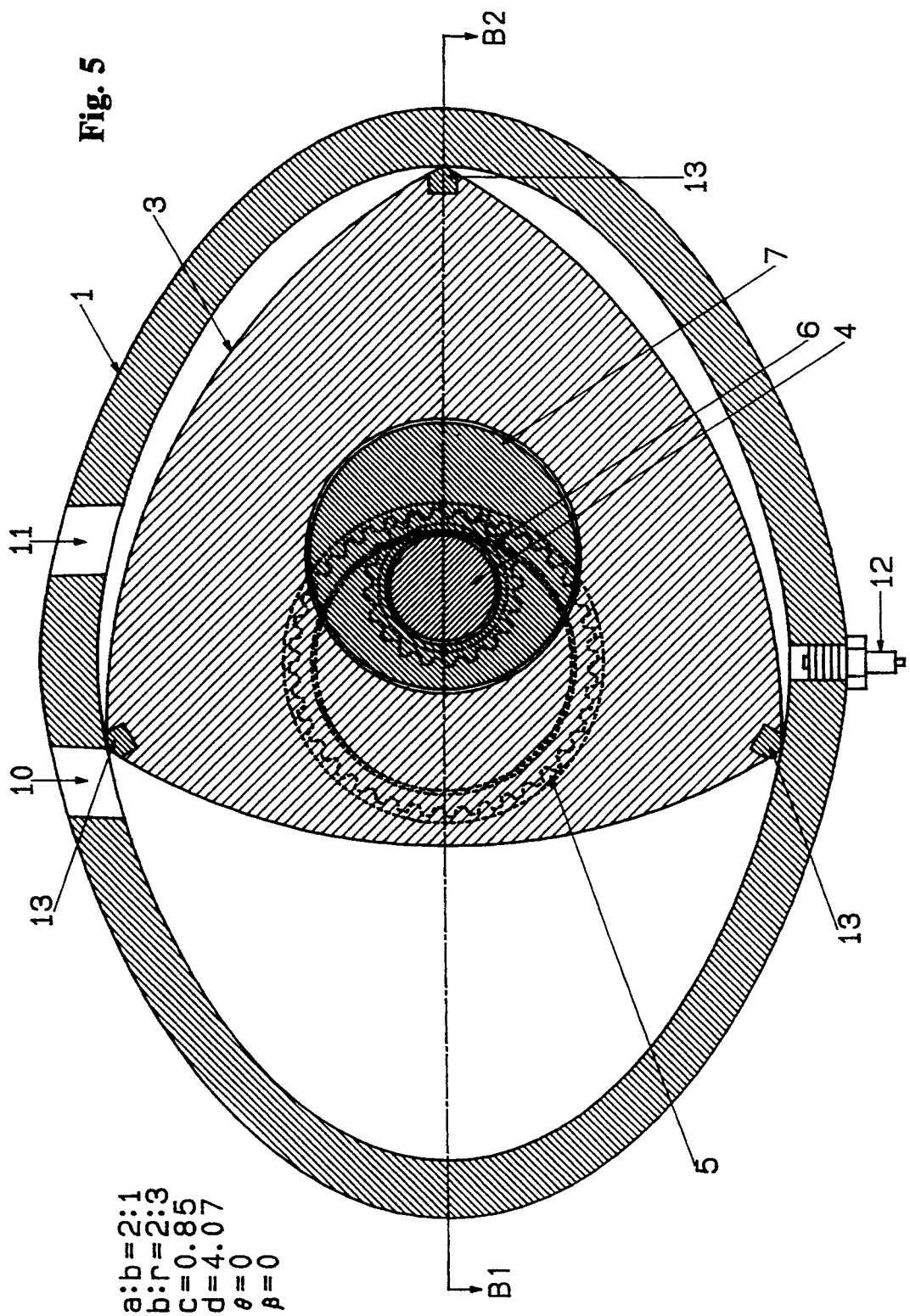
FIG. 5 is a sectional view of a first embodiment of the present invention taken along the lines E1–E2 of FIG. 2.

For brevity, hereinafter the planetary-motion rotary-piston engine is "the rotary-piston engine" and the planetary-motion reciprocating engine is "the reciprocating engine".

Referring to FIGS. 9–12, a composite trochoid determines the contour of the normal section of the tubular cavity in the housing. The composite trochoid is comprised of a hypotrochoid and a peritrochoid. A base circle 25 with a radius a and a rolling circle 26 with a radius b generate the hypotrochoid. A base circle 27 with a radius e and a rolling circle 28 with a radius f generate the peritrochoid.

For the hypotrochoid, a fixed point R on the prolongation of radius b of rolling circle 26 is the generating point of the hypotrochoid. A distance OQ is the eccentric quantity of the hypotrochoid. A distance QR is the generating radius of the hypotrochoid. A segment OQ is the eccentric arm of the hypotrochoid. A segment QR is the generating arm of the hypotrochoid.

For the peritrochoid, a fixed point P on the prolongation of radius f of rolling circle 28 is the generating point of the peritrochoid. A distance QR is the eccentric quantity of the peritrochoid, and a distance RP is the generating radius of the peritrochoid. A segment QR is the eccentric arm of the peritrochoid, and a segment RP is the generating arm of the peritrochoid.

Since base circle 27 and rolling circle 26 have a common center in point Q on eccentric arm OQ of the hypotrochoid, base circle 27 and rolling circle 26 are concentric. Rolling circle 26 is not fixed to point Q on eccentric arm OQ of the hypotrochoid. However, base circle 27 is fixed to point Q. Thus rolling circle 26 can rotate about Q on eccentric arm OQ of the hypotrochoid and base circle 27 cannot.

According to the properties of a hypotrochoid, rolling circle 26 rotates on point Q on eccentric arm OQ at the same time as it revolves around the origin O. Thus point Q on eccentric arm OQ of the hypotrochoid also revolves around the origin 0. As rolling circle 26 rotates on its own axis, base circle 27, fixed to point Q, revolves around origin 0 but does not rotate on its own axis. Here base circle 27 and rolling circle 26 are concentric. As rolling circle 26 rotates on its own axis, generating point R of the hypotrochoid revolves around base circle 27.

Eccentric arm QR of the peritrochoid is fixed to generating arm QR of the hypotrochoid so that the center of rolling circle 28 becomes generating point R of the hypotrochoid. Thus, as rolling circle 26 rotates on its own axis, center R of rolling circle 28 also revolves around base circle 27. Further, because base circle 27 and rolling circle 28 generate the peritrochoid, rolling circle 28 rolls (rather than slides) along an external circumference of base circle 27, inscribing it, as rolling circle 26 rotates on its own axis. In a coordinate system with point Q as origin, point P therefore generates the peritrochoid as rolling circle 26 rotates about its own axis.

Center R of rolling circle 28 is the generating point of the hypotrochoid. In a coordinate system whose origin is point O, center R of rolling circle 28 generates the hypotrochoid as rolling circle 26 rotates about its own axis. Eccentric arm QR of the peritrochoid has segment QR in common with generating arm QR of the hypotrochoid. Consequently a locus 29 of point P is comprised of the hypotrochoid and the peritrochoid. Locus 29 is thus a composite trochoid whose generating point is point P.

Thus the composite trochoid is the locus of generating point P of the peritrochoid in combination with the hypotrochoid, subject to the following conditions. First, base circle 27 of the peritrochoid must be fixed to eccentric arm OQ of the hypotrochoid so that base circle 27 of the peritrochoid and rolling circle 26 of the hypotrochoid be concentric. Second, eccentric arm QR of the peritrochoid must be fixed to generating arm QR of the hypotrochoid so that the center of rolling circle 28 of the peritrochoid becomes generating point R of the hypotrochoid.

Consequently, rolling circle 28 describes a planetary motion about point Q at the same time as it revolves around origin O. Because each of the vertices of the normal section of the rotating piston is generating point P on the prolongation of the radius of rolling circle 28, the rotating piston describes a planetary motion about point Q at the same time as it revolves around origin O.

If distance RP be k, the coordinates of generating point P(x,y) of the composite trochoid can be expressed as follows, provided $\beta$, the phase angle of generating point P, is a constant.

$$x=(a-b)\cos\Theta+(f-e)\cos\Phi+k\cos(\gamma+\beta)$$

$$y=(a-b)\sin\Theta+(f-e)\sin\Phi+k\sin(\gamma+\beta)$$

From these equations, $$\Phi=\Theta+\lambda,$$

where $$\lambda=-a\Theta/b,$$

or $$\Phi=(1-a/b)\Theta.$$

Also from these equations, $$\gamma=\Theta+\lambda+\tau.$$

Since $$\tau=-e\lambda/f$$

and $$\lambda=-a\Theta/b$$

$$\tau=ea\Theta/fb,$$

and $$\gamma=(1-a/b+ea/fb)\Theta.$$

Therefore the coordinates of generating point P(x,y) become $$x=(a-b)\cos\Theta+(f-e)\cos(1-a/b)\Theta+k\cos\{(1-a/b+ea/fb)\Theta+\beta\}$$
$$y=(a-b)\sin\Theta+(f-e)\sin(1-a/b)\Theta+k\sin\{(1-a/b+ea/fb)\Theta+\beta\}.$$

If the ratio between a radius e of base circle 27 and a radius b of rolling circle 26 be c, then $e=cb$. If the ratio between a radius f of rolling circle 28 and radius e of base circle 27 be n, then $f=ne$. Further, when the radius of base circle 27 is equal to the radius of rolling circle 26, if the radius of the rolling circle 28 be r, then $r=nb$.

Substituting, $f=cr$, or, $f-e=cr-cb$, and $1-a/b+ea/fb=1-a/b+a/r$.

If the ratio between k and radius f of rolling circle 28 be d, then $k=df$, or $k=dcr$.

Substituting, the coordinates of the generating point P(x,y) of the composite trochoid can be expressed as $$x=(a-b)\cos\Theta+c(r-b)\cos(1-a/b)\Theta+dcr\cos\{(1-a/b+a/r)\Theta+\beta\} \quad (1)$$

$$y=(a-b)\sin\Theta+c(r-b)\sin(1-a/b)\Theta+dcr\sin\{(1-a/b+a/r)\Theta+\beta\} \quad (2)$$

If the phase angle of point Q be $\beta a$ and the phase angle of point R be $\beta b$, then equations (1) and (2) become, if $\beta a$ and $\beta b$ are constants:

$$x=(a-b)\cos(\Theta+\beta b)+c(r-b)\cos\{(1-a/b)\Theta+\beta b\}+dcr\cos\{(1-a/b+a/r)\Theta+\beta\} \quad (3)$$

$$y=(a-b)\sin(\Theta+\beta a)+c(r-b)\sin\{(1-a/b)\Theta+\beta b\}+dcr\sin\{(1-a/b+a/r)\Theta+\beta\} \quad (4)$$

Equations (1) and (2) describe, with reference to a, b, c, d, r, and $\beta$, different composite trochoids, representative examples of which are shown in FIGS. 15-26.

Where the translated composite trochoid is the contour of the normal section of the tubular cavity in the housing, the coordinates of generating point Ps(xs,ys), which was translated in parallel outwards the fixed distance t along a line normal to the composite trochoid, can be expressed as follows, if the angle between the x-axis and the normal line at the generating point P(x,v) is $v$.

$$xs=(a-b)\cos\Theta+c(r-b)\cos(1-a/b)\Theta+dcr\cos\{(1-a/b+a/r)\Theta+\beta\}+t\cos\nu$$

$$ys=(a-b)\sin\Theta+c(r-b)\sin(1-a/b)\Theta+dcr\sin\{(1-a/b+a/r)\Theta+\beta\}+t\sin\nu$$

where $\tan\nu=-(dx/d\Theta)/(dy/d\Theta)$. In this case, the shape of the vertex of the normal section of the rotating piston becomes a circular arc whose center is generating point P of the composite trochoid and whose radius is equal to fixed distance t. Consequently, the shape of the lateral edges of the rotating piston becomes cylindrical. Thus, as the rotating piston revolves, the line of contact between the cylindrical lateral edge of the rotating piston and the lateral face of the tubular cavity moves continuously on the surface of the cylindrical lateral edge of the rotating piston. Therefore this line of contact is not continually in the same position on the cylindrical lateral edge of the rotating piston. These techniques are used in the Wankel rotary-piston engine.

There are no restrictions on the curves linking the vertices of the normal section of the rotating piston so long as the lateral faces of the rotating piston do not collide with the lateral face of the tubular cavity.

The volume of the working chamber becomes the smallest possible when the inner envelope of the family of curves that determines the contour of the normal section of the tubular cavity is the contour of the normal section of the rotating piston. Under these conditions the compression ratio increases, which is favorable. Thus we generally use the inner envelope of the family of curves that determines the contour of the normal section of the tubular cavity for the contour of the normal section of the rotating piston. Therefore the curve determining the contour of the normal section of the rotating piston becomes the inner envelope of the family of curves of either the composite trochoid or of the translated composite trochoid.

Referring to FIG. 27, to examine the structure of the family of curves of the composite trochoid, let the center of a circle 32 be the origin R of an XY-coordinate system. Further, let circle 32 be a base circle and a circle 33 be a rolling circle. Rolling circle 33 and base circle 32 generate a hypotrochoid in the XY-coordinate system.

In the XY-coordinate system, let the center of a circle 34 be point Q on eccentric arm RQ of the hypotrochoid so that circle 34 and circle 33 can be concentric. Let circle 34 be a base circle. So that a circle 35 may rotate about generating point O of the hypotrochoid, we place the center of circle 35 on generating point O of the hypotrochoid and let it be a rolling circle. Rolling circle 35 and base circle 34 generate a peritrochoid.

So that the origin of an xy-coordinate system may become generic point O of the hypotrochoid in the XY-coordinate system, we fix the xy-coordinate system to rolling circle 35 of the peritrochoid in the XY-coordinate system. Then the origin of the xy-coordinate system is translated in parallel to generating point O of the hypotrochoid in the XY-coordinate system. The xy-coordinate system rotates about generic point O following the rotation of rolling circle 35 of the peritrochoid in the XY-coordinate system. The family of curves of the composite trochoid can be described with reference to the xy-coordinate system.

Let the coordinates of generating point 0 of the hypotrochoid in the XY-coordinate system be (Xo, Yo). Let the rotating angle of rolling circle 35 of the peritrochoid in the XY-coordinate system be $\chi$. Let the coordinates of the generating point of the composite trochoid in the xy-coordinate system be (x,y). Then the coordinates (X,Y) of the family of curves of the composite trochoid can be expressed as:

$$X=Xo+x\cos\chi-y\sin\chi$$

$$Y=Yo+x\sin\chi+y\cos\chi,$$

where $$Xo=(f-e)\cos(\omega+\pi)+(a-b)\cos(\delta+\pi)$$

$$Yo=(f-e)\sin(\omega+\pi)+(a-b)\sin(\delta+\pi).$$

In the composite trochoid, the value of $\delta$ becomes $$\delta=\omega+\sigma.$$

Since $\sigma=-f\omega/e$, we get $$\delta=(1-f/e)\omega$$

The value of $\chi$ becomes $$\chi=\omega+\sigma+\nu$$

Since $\nu=-b\sigma/a$, and $\sigma=-f\omega/e$, we get
$\nu=bf\omega/ae$, and
$\chi=(1-f/e+bf/ae)\omega$.
Since $e=cb$ and $f=cr$,
$f-e=cr-cb$,
$\delta=(1-r/b)\omega$, and
$\chi=(1-r/b+r/a)\omega$.

Therefore the coordinates (X,Y) of the family of curves of the composite trochoid can be expressed as:

$$X=Xo+x\cos(1-r/b+r/a)\omega-y\sin(1-r/b+r/a)\omega \quad (5)$$

$$Y=Yo+x\sin(1-r/b+r/a)\omega+y\cos(1-r/b+r/a)\omega \quad (6)$$

where
$Xo=-c(r-b)\cos\omega-(a-b)\cos(1-r/b)\omega$
$Yo=-c(r-b)\sin\omega-(a-b)\sin(1-r/b)\omega$
$x=(a-b)\cos\Theta+c(r-b)\cos(1-a/b)\Theta+dcr\cos\{(1-a/b+a/r)\Theta+\beta\}$
$y=(a-b)\sin\Theta+c(r-b)\sin(1-a/b)\Theta+dcr\sin\{(1-a/b+a/r)\Theta+\beta\}$ FIGS. 28–37 show representative families of curves of the composite trochoid. The composite trochoid itself is shown with a thick line.

Figure 83:
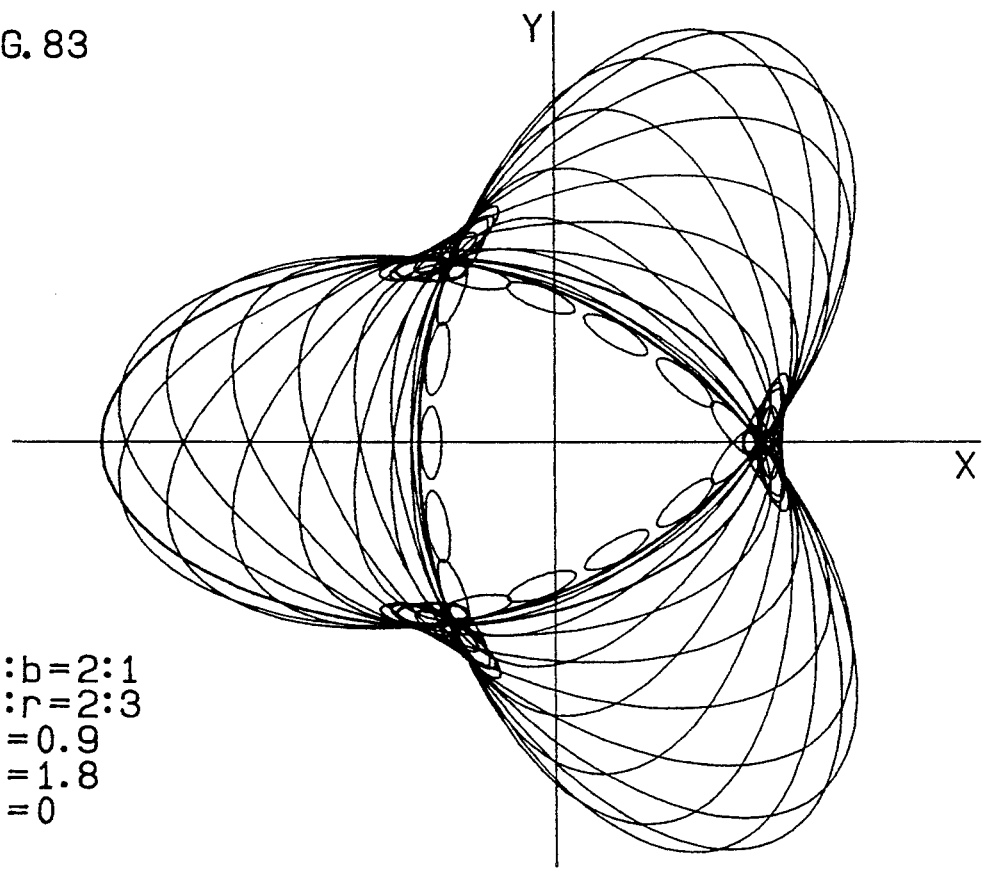
FIG. 83 shows the family of curves of a composite trochoid having two loops on its minor axis.
Figure 84:
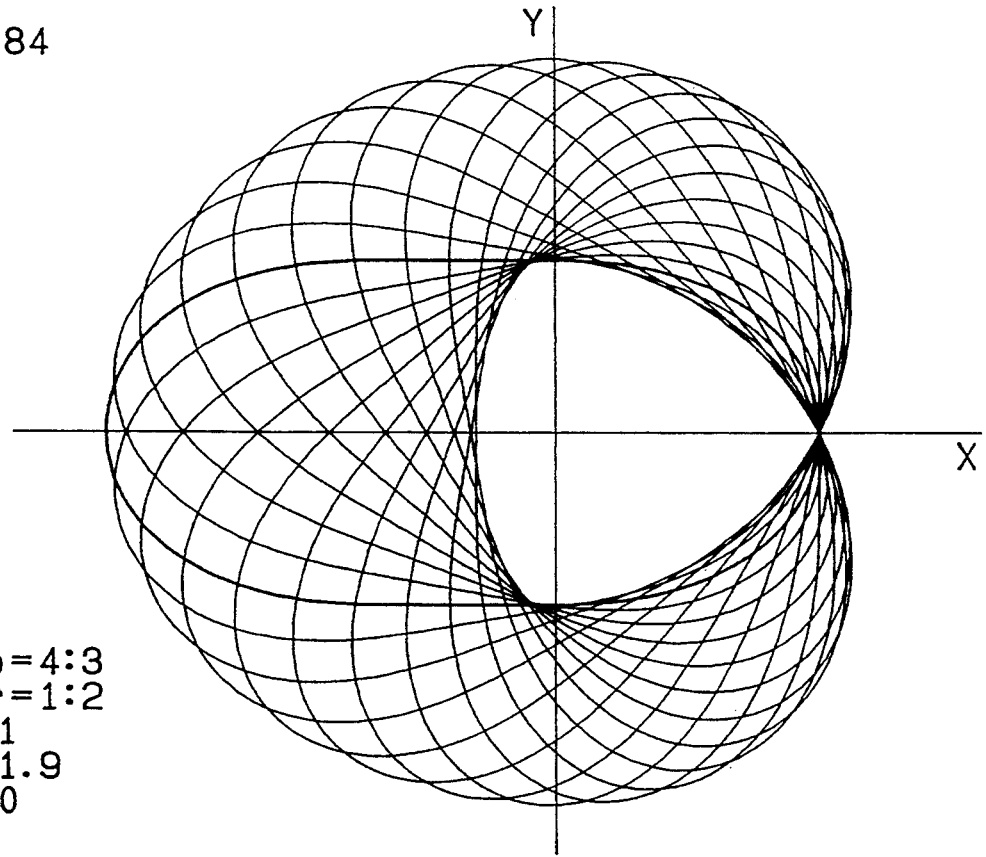
FIG. 84 shows the family of curves of a composite trochoid that has a point of osculation between its outer envelope and its inner envelope.

For the rotary-piston engine of the present invention to have working chambers of variable volume, the rotating piston must have at least two lateral edges that continually slide along the lateral face of the tubular cavity. Therefore the outer envelope and the inner envelope of the family of curves of the composite trochoid must have at least two points of osculation, as shown in FIGS. 28–37. Thus all the composite trochoids shown in FIGS. 15–26 can be used as the contour of the normal section of the tubular cavity. When there are loops on the minor axis of a composite trochoid, the outer envelope and the inner envelope of the family of curves of this composite trochoid have no point of osculation, as shown in FIG. 83. When the outer envelope and the inner envelope of the family of curves of a composite trochoid have only one point of osculation, as shown in FIG. 84, the rotary-piston engine of the present invention cannot function.

Further, the family of curves (Xs,Ys) of the translated composite trochoid also have envelopes. They can be expressed as:

$$Xs = Xo + xs \cos(1 - r/b + r/a)\omega - ys \sin(1 - r/b + r/a)\omega \quad (5)$$

$$Ys = Yo + xs \sin(1 - r/b + r/a)\omega + ys \cos(1 - r/b + r/a)\omega$$

where $$xs = (a-b)\cos\Theta + c(r-b)\cos(1-a/b)\Theta + dcr \cos\{(1-a/b+a/r)\Theta + \beta\} + t \cos v,$$

$$ys = (a-b)\sin\Theta + c(r-b)\sin(1-a/b)\Theta + dcr \sin\{(1-a/b+a/r)\Theta + \beta\} + t \sin v,$$

and $$\tan v = -(dx/d\Theta)/(dy/d\Theta).$$

Install an idle circle between a trochoid's base circle and its rolling circle. The fixed point on the prolongation of the radius of the rolling circle generates a locus as the idle circle rolls, not slides, along the circumference of the base circle. Hereinafter a "quasi-composite trochoid" is a composite trochoid having at least one idle circle installed between the base circle and the rolling circle.

Referring to FIG. 85, to obtain a composite trochoid in which the ratio between the radii of the base circle and the rolling circle of the hypotrochoid is 2:1 and the ratio between the radii of the base circle and the rolling circle of the peritrochoid is 2:3, a concentric idle circle 36 is installed between base circle 25 and rolling circle 26 and both concentric idle circle 41 and an idle circle 37 are installed between base circle 27 and rolling circle 28.

Figure 10:
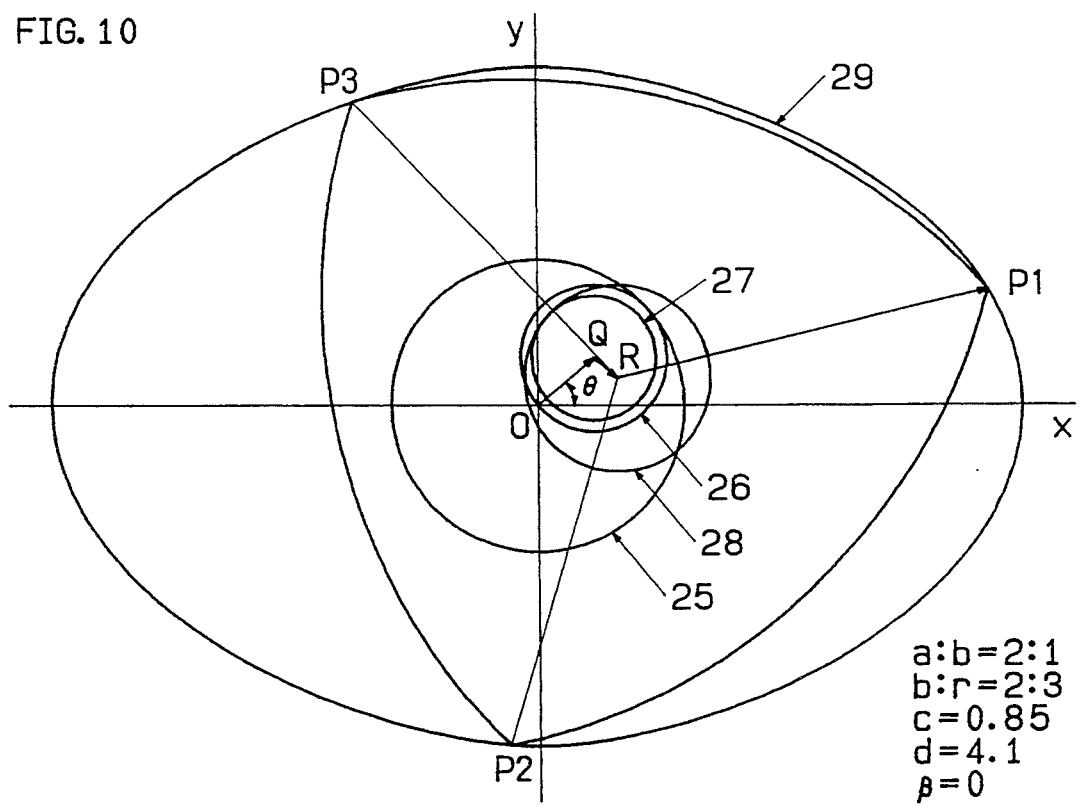
FIG. 10 shows the geometric relation between the composite trochoid and the rotating piston in the first embodiment.
Figure 32:
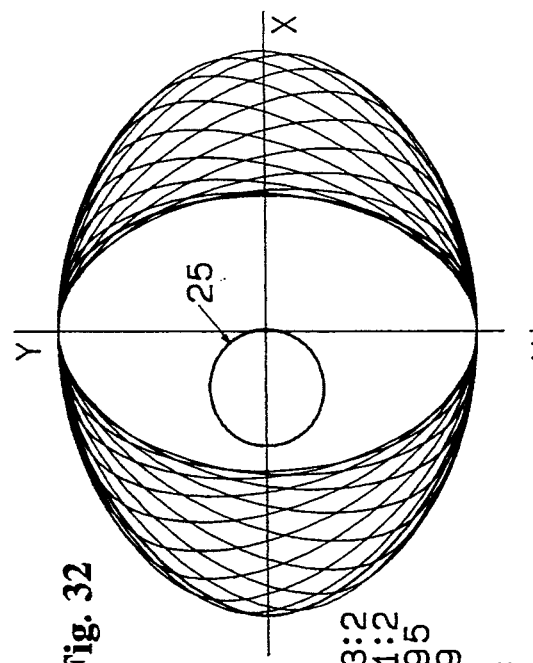
Figure 33:
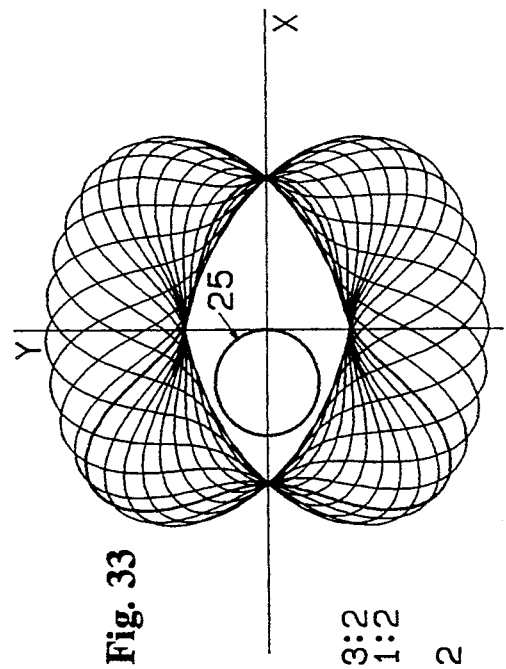
Figure 34:
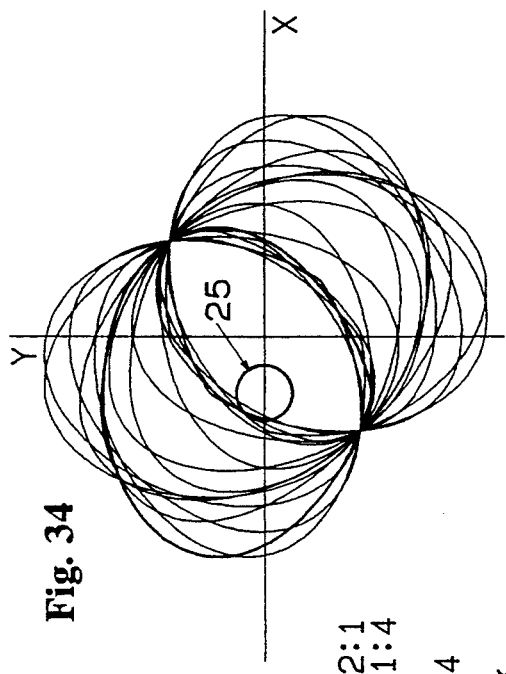
Figure 35:
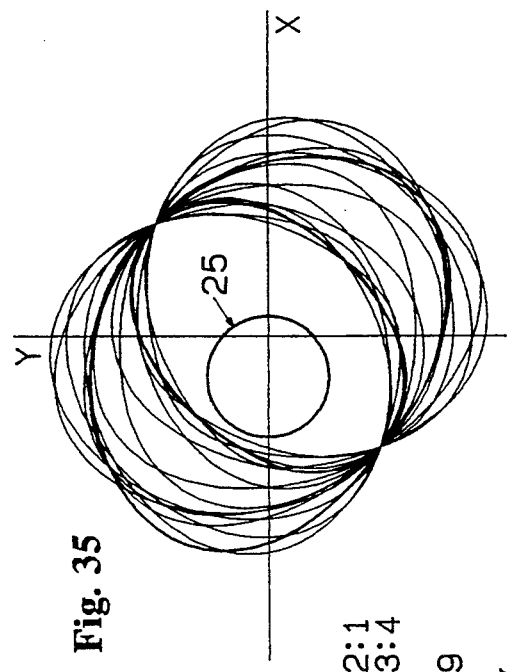
Figure 36:
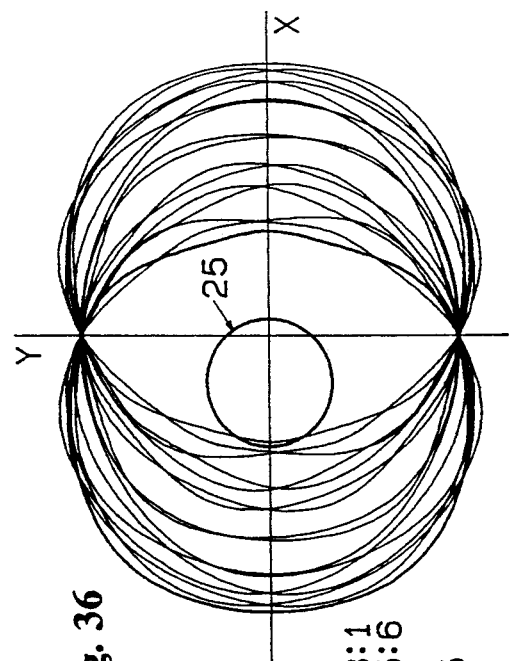
Figure 37:
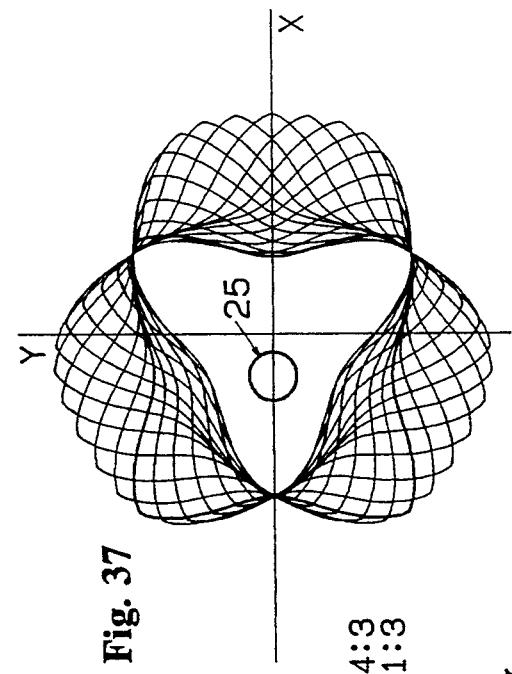

Referring to FIGS. 10 and 32, when the curve that determines the contour of the normal section of the rotating piston is a composite trochoid, the outer envelope of the family of curves that determines the contour of the normal section of the rotating piston can be the contour of the normal section of the tubular cavity.

Referring to FIG. 27, let circle 32 be a base circle and circle 33 be a rolling circle. Rolling circle 33 and base circle 32 generate a hypotrochoid. To make a circle 34 concentric with circle 33, let circle 34 be a base circle whose center is point Q on eccentric arm RQ of the hypotrochoid. To make circle 35 rotate about generating point O of the hypotrochoid, let circle 35 be a rolling circle whose center is generating point O of the hypotrochoid. Rolling circle 35 and base circle 34 generate a peritrochoid. Further, let the ratio of the generating radius of the peritrochoid and radius a of rolling circle 35 be h. Then the generating radius of the peritrochoid is ha.

Therefore the coordinates of the generating point (v,w) of a composite trochoid with the above structure can be expressed as follows, provided $\beta c$, the phase angle of generating point (v,w), is a constant:

$$v = (f-e)\cos(\omega+\pi) + (a-b)\cos(\delta+\pi) + ha \cos(\chi+\beta c+\pi)$$

$$w = (f-e)\sin(\omega+\pi) + (a-b)\sin(\delta+\pi) + ha \sin(\chi+\beta c+\pi).$$

Similarly to the family of curves of the composite trochoid, $$v = -c(r-b)\cos\omega - (a-b)\cos(1-r/b)\omega - ha \cos\{(1-r/b+r/a)\omega + \beta c\}$$

$$w = -c(r-b)\sin\omega - (a-b)\sin(1-r/b)\omega - ha \sin\{(1-r/b+r/a)\omega + \beta c\}.$$

When we describe the composite trochoid generated by the generating point (v,w) in the plane fixed to rolling circle 28 of the composite trochoid described by equations (1) and (2), we get the family of curves (x,y) of the above composite trochoid. Then this family of curves (x,y) can be expressed, provided $\beta e$, the phase angle of the above composite trochoid, is a constant, as:

$$x = (a-b)\cos\Theta + c(r-b)\cos(1-a/b)\Theta + \theta \cos\gamma - w \sin\gamma \quad (7)$$

$$y = (a-b)\sin\Theta + c(r-b)\sin(1-a/b)\Theta + v \sin\gamma + w \cos\gamma \quad (8)$$

where $$\gamma = (1-a/b+a/r)\Theta + \beta e.$$

Figure 38:
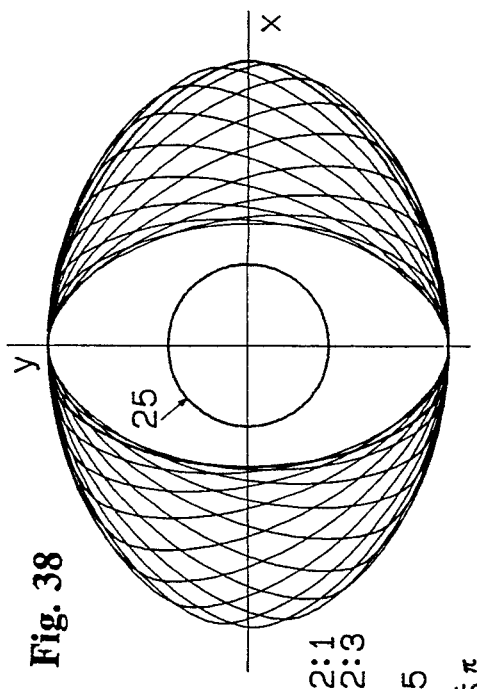
FIGS. 38–40 show families of curves determining the contour of the normal section of the rotating piston of the rotary-piston engine of the present invention.
Figure 39:
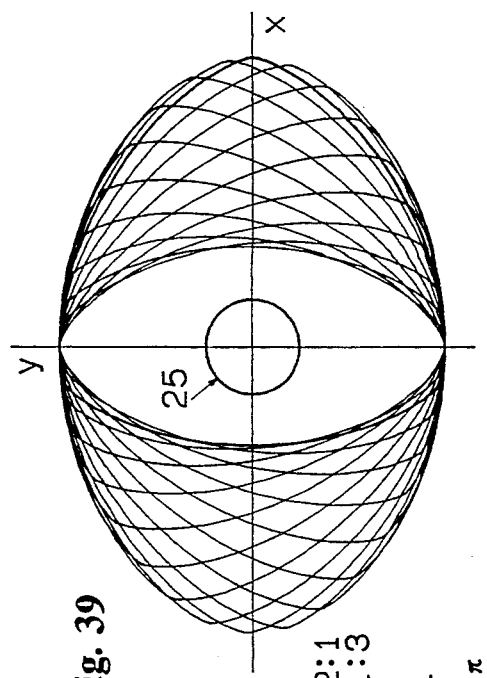
Figure 40:
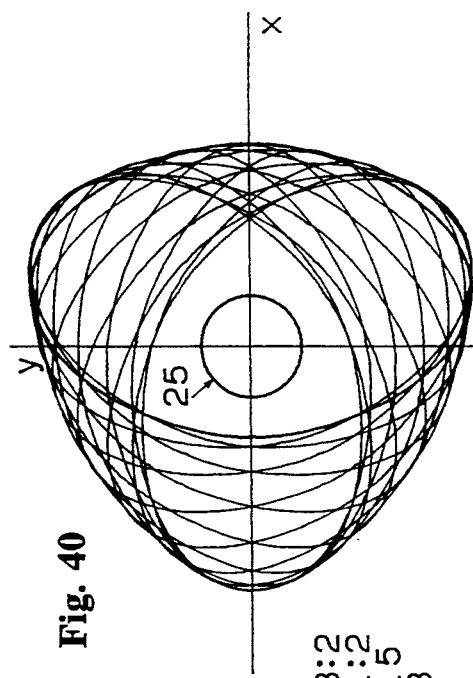

FIGS. 38–40 show representative families of curves expressed by equations (7) and (8). The composite trochoid generated by the generating point (v,w) is shown by a thick line.

The composite trochoid generated by the generating point (v,w) can be the contour of the normal section of the rotating piston, and the outer envelope of the family of curves of this composite trochoid can be the contour of the normal section of the tubular cavity.

When the shape of the vertex of the normal section of the rotating piston is a circular arc, in equations (7) and (8), when $v = dcr$ and $w = 0$, equations (7) and (8) express the coordinates of generating point P of the composite trochoid expressed by equations (1) and (2). Referring to FIG. 10, when $\beta e$, equations (7) and (8) express the coordinates of generating point P1; when $\beta e = -2\pi/3$, the coordinates of the generating point P2; and, when $\beta e = -4\pi/3$, the coordinates of the generating point P3.

Figure 41:
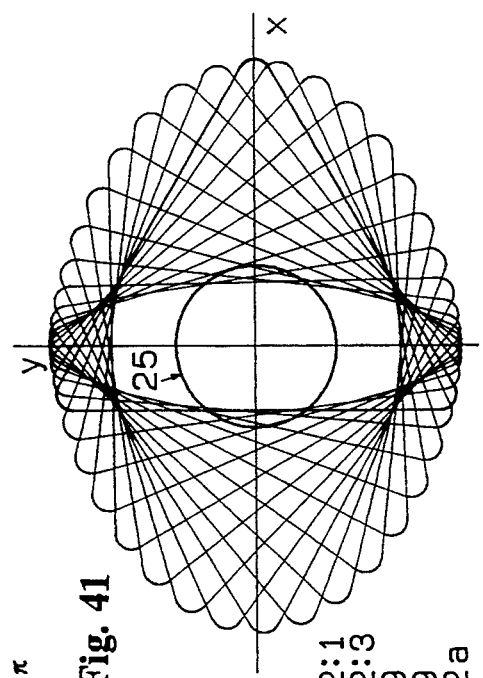
FIG. 41 shows the family of curves determining the contour (the circular-arc-shaped vertices and the straight lines connecting them) of the normal section of the rotating piston of the rotary-piston engine of the present invention.

Therefore the vertex of the normal section of the rotating piston can have the shape of a circular arc whose center is generating point P of the composite trochoid expressed by equations (1) and (2). The outer envelope of the family of curves that determines the circular-arc-shaped vertices of the normal section of the rotating piston can be the contour of the normal section of the tubular cavity. If the curves that link the circular-arc-shaped vertices do not interfere with the outer envelope of the family of curves that determine the circular-arc-shaped vertices, there is no restriction on the curves linking the circular-arc-shaped vertices. FIG. 41 shows the family of curves that determine the contour, that is, the circular-arc-shaped vertices (whose radii are equal to t) and the straight lines connecting them, of the normal section of the rotating piston.

Referring to FIGS. 1–5, 9, and 10, the first embodiment of the present invention is a rotary-piston engine with a housing that contains a tubular cavity. The curve that determines the contour of the normal section of the tubular cavity is either a composite trochoid or a translated composite trochoid. If the latter, the composite trochoid has been translated outwards in parallel a fixed distance. A rotating piston 3 is inserted into the tubular cavity. All the edges of rotating piston 3 slide continuously on the inside face of the tubular cavity. The lateral faces of rotating piston 3 and the inside face of the tubular cavity form three working chambers. Each chamber's volume changes with time. Connecting ducts for gas exchange consist of an intake duct 10 and an exhaust duct 11.

In the composite trochoid, the ratio between the radii of base circle 25 and rolling circle 26 is 2:1. The ratio between the radii of base circle 27 and rolling circle 28 is 2:3. Therefore the curve that determines the contour of the normal section of the tubular cavity can be expressed in the following parametric equations:

$$x=(a-b)\cos\Theta+c(r-b)\cos(-\Theta)+dcr\cos(\Theta/3+\beta)$$

$$y=(a-b)\sin\Theta+c(r-b)\sin(-\Theta)+dcr\sin(\Theta/3+\beta)$$

Figure 15:
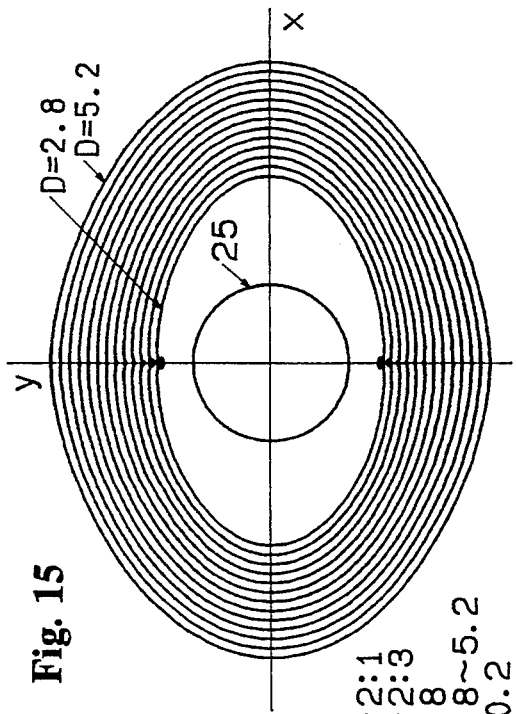
FIGS. 15–26 show composite trochoids for different values of a, b, r, c, d, and $\beta$.
Figure 16:
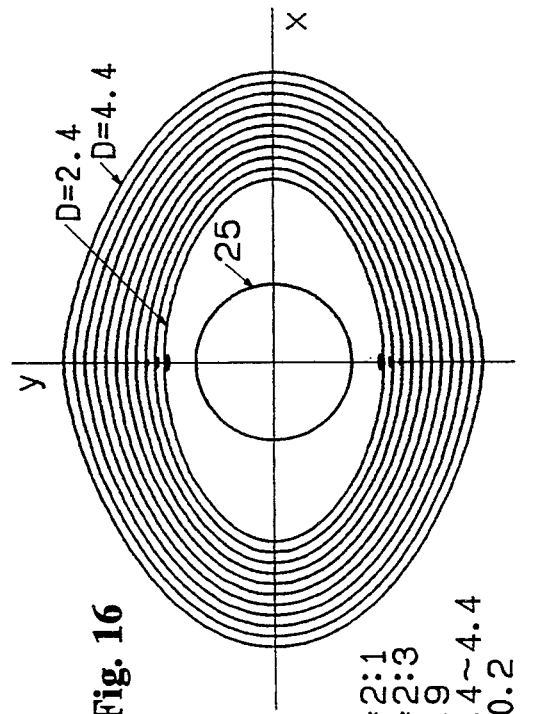
Figure 17:
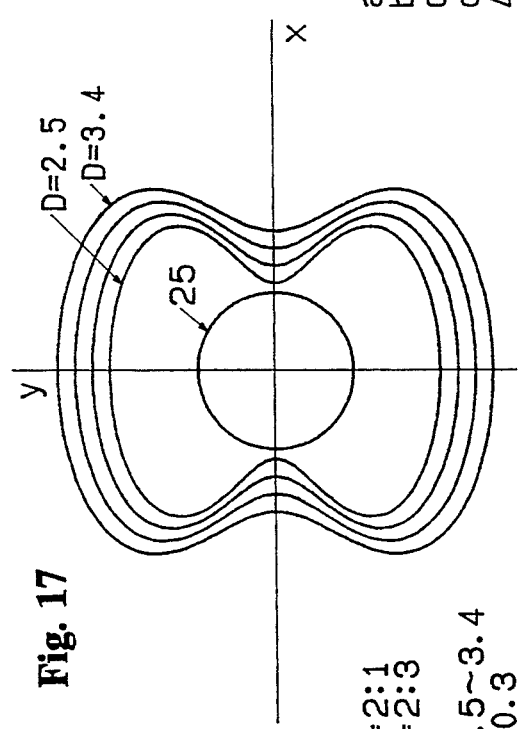
Figure 18:
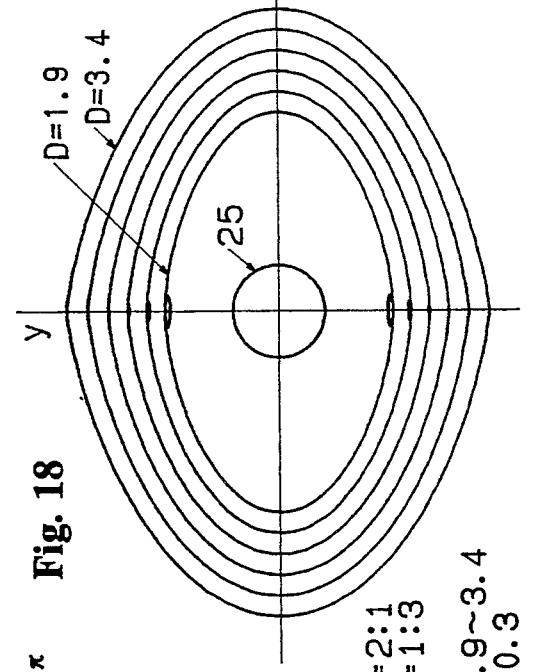
Figure 19:
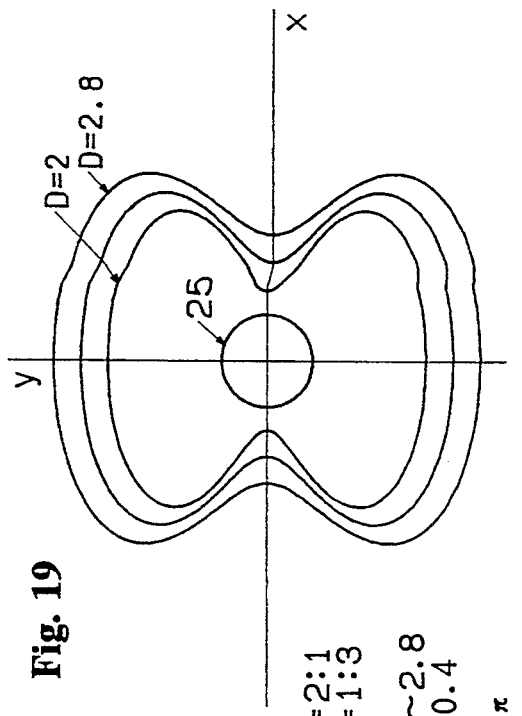

Though the rotary piston engine of the present invention can be constructed for any value of $\beta$, the favorable values are $\beta=n\pi/3$, where n is an arbitrary integer. The most favorable value is $\beta=2n\pi/3$. FIGS. 15 and 16 show the composite trochoids for $\beta=0$; FIG. 17, for $\beta=\pi/3$.

Referring to FIGS. 15 and 16, constrictions appear on the minor axis of the composite trochoid when the value of d decreases. Values of d that do not lead to constrictions on the minor axis of the composite trochoid depend on the value of c. When $c>1$, the resulting composite trochoid is unsuitable for the rotary-piston engine of the present invention. A value of c that is too small leads to problems with mechanical strength. Conditions for constructing the rotary-piston engine of the present invention are most favorable when $1.0>c>0.6$.

Referring to FIG. 15, for $c=0.8$, conditions are favorable when $d>4.4$. Referring to FIG. 16, for $c=0.9$, conditions are favorable when $d>3.6$. However, since high values of d are disadvantageous for constructing the rotary-piston engine of the present invention, d must be selected to have low values that are within the limits that eliminate constrictions on the minor axis of the composite trochoid. Also, d should be chosen so that the inner envelope of the family of curves of the composite trochoid does not interfere with base circle 25 of the composite trochoid.

Referring to FIGS. 1-7, the lateral face of the tubular cavity in the housing is a rotor housing 1 containing a tubular cavity with both ends open. Each of the two bases of the tubular cavity in the housing is a flat side housing 2. Rotating piston 3 fits into the tubular cavity of rotor housing 1. Side housings 2 are attached to both ends of the tubular cavity of rotor housing 1.

For the contour of the normal section of rotating piston 3 we generally use the inner envelope of the family of curves determining the contour of the normal section of the tubular cavity of rotor housing 1. Thus rotating piston 3 has the shape of a right prism with a quasi-trigonal normal section. Each of the three vertices of the quasi-trigonal normal section of rotating piston 3 is either a generating point (one of P1, P2, or P3 in FIG. 10) of the composite trochoid or it has the form of a circular arc whose center is the generating point of the composite trochoid and whose radius is equal to the fixed distance. The angles between each two of the three vertices of the quasi-trigonal normal section and the center of the quasi-trigonal normal section are all 120°. FIG. 28 shows the family of curves of the composite trochoid for $\beta=0$.

Consequently all three lateral edges of rotating piston 3 slide continuously on the lateral face of the tubular cavity of rotor housing 1, and all the edges of the two bases of rotating piston 3 slide continuously on the inside face of side housings 2. The lateral face of the tubular cavity of rotor housing 1, the inside face of side housings 2, and the lateral faces of rotating piston 3 form the three working chambers, whose volume changes with time.

To keep the working chambers airtight, there are apex seals 13 attached to the three lateral edges of rotating piston 3 and side seals 14 attached to the edges of the two bases of rotating piston 3. Intake duct 10 and exhaust duct 11 make openings through rotor housing 1 into the working chamber. Further, an ignition plug 12 is installed in rotor housing 1. Both intake duct 10 and exhaust duct 11 can be installed in side housing 2.

A crankshaft 4, consisting of a crank main shaft and a crank pin, is an output shaft. The axis of rotation of crankshaft 4 is the axis of the crank main shaft. The crank main shaft pierces through side housings 2 to be coaxial with the tubular cavity. The distance between the axis (origin O) of the crank main shaft and the axis (point Q) of the crank pin is equal to the eccentric quantity OQ of the hypotrochoid. The function of crankshaft 4 is equivalent to the function of eccentric arm OQ of the hypotrochoid.

A fixed gear 5 is fixed to side housing 2 to be coaxial with the tubular cavity. Fixed gear 5, an internal gear, is also coaxial with the crank main shaft.

A rolling gear 6, attached to the crank pin, can rotate on the latter's axis, with the axis of rolling gear 6 as the axis of rotation. Rolling gear 6, an external gear, is engaged with fixed gear 5. The geometric relation between fixed gear 5 and rolling gear 6 is the same as the relation between the hypotrochoid's base circle 25 and its rolling circle 26. As crankshaft 4 revolves, rolling gear 6 rotates on the axis of the crank pin at the same time as it revolves around the axis of the crank main shaft.

An eccentric shaft 7 consists of an eccentric main shaft and an eccentric wheel. The eccentric main shaft is attached to the crank pin and can rotate on the latter's axis, with the axis of the eccentric main shaft as the axis of rotation. The eccentric main shaft is fixed to rolling gear 6 to be coaxial therewith. Therefore the axis of the eccentric wheel is the fixed point on the prolongation of the radius of rolling gear 6 and the generating point (point R) of the hypotrochoid.

Here the distance between the axis (point Q) of the eccentric main shaft and the axis (point R) of the eccentric wheel is equal to the eccentric quantity QR of the peritrochoid and to the generating radius QR of the hypotrochoid. The function of eccentric shaft 7 is equivalent to the function of eccentric arm QR of the peritrochoid and to the function of generating arm QR of the hypotrochoid.

A fixed gear 8 is fixed to the crank pin to be coaxial therewith. Fixed gear 8, an external gear, is coaxial with rolling gear 6.

A rolling gear 9 is attached to the eccentric wheel and can rotate on the latter's axis, with the axis of rolling gear 9 as the axis of rotation. Rolling gear 9, an internal gear, is engaged with fixed gear 8. The geometric relation between fixed gear 8 and rolling gear 9 is the same as that between the peritrochoid's base circle 27 and its rolling circle 28.

Rotating piston 3 is fixed to rolling gear 9 to be coaxial therewith. Accordingly, each of the three vertices of the quasi-trigonal normal section of rotating piston 3 is a fixed point on the prolongation of the radius of rolling gear 9 and generating point P of the composite trochoid.

Therefore rotating piston 3 describes a planetary motion on the axis (point Q) of the crank pin at the same time as it revolves around the axis (origin O) of the crank main shaft. This double motion changes the volume of the working chambers and causes apex seal 13 to open and close intake duct 10 and exhaust duct 11, thereby exchanging combustion gas in the working chamber. Thus the operating cycle has four strokes: an intake stroke shown in FIGS. 42–45, a compression stroke shown in FIGS. 46–48, a combustion/expansion stroke shown in FIGS. 49–51, and an exhaust stroke shown in FIGS. 52–53. The expansion pressure of combustion is converted into the rotary motion of crankshaft 4. Here the angular velocity of rotating piston 3 is ⅓ the angular velocity of crankshaft 4 and directed in the same direction.

FIGS. 42–53 show the operation of this embodiment after separate changes, each of 90°, in the angle of crankshaft 4. FIG. 48 shows the engine after completion of the compression stroke. In this position we have ignition and combustion. FIGS. 54–59 show the engine in the expansion stroke after separate 18° changes in the angle of crankshaft 4. Referring to FIGS. 54–59, the change in the volume of the working chamber near top dead center is very slow.

Since the center of gravity of rotating piston 3 is at point R (see FIG. 10), we install a counter weight symmetrically around point Q to cancel the mass of rotating piston 3. Further, we install a new counter weight symmetrically around origin O to cancel the sum of the masses of the above counter weight and rotating piston 3. These counter weights bring the moving parts of the engine into complete balance.

Figure 6:
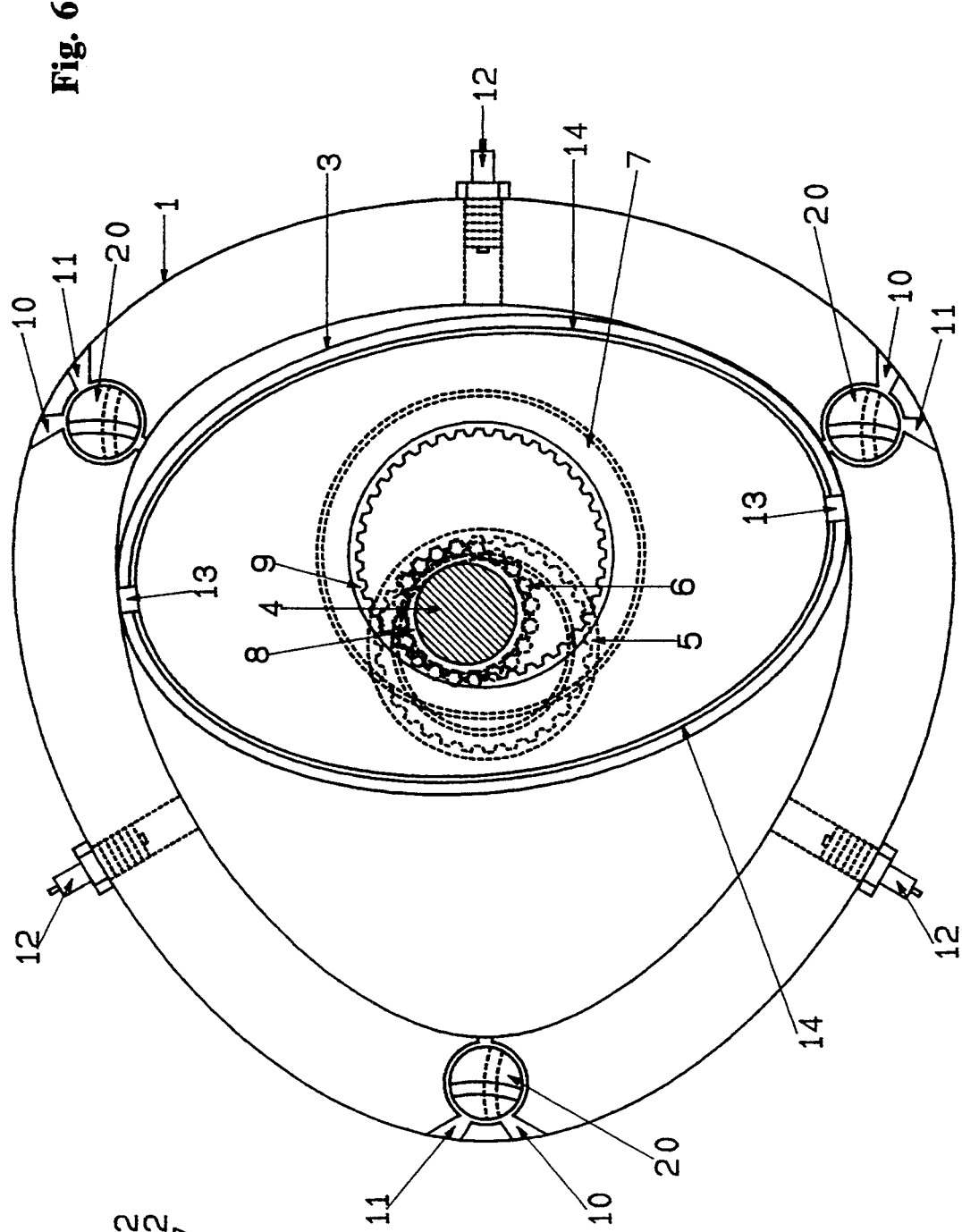
FIG. 6 is a sectional view showing a second embodiment of the present invention.
Figure 11:
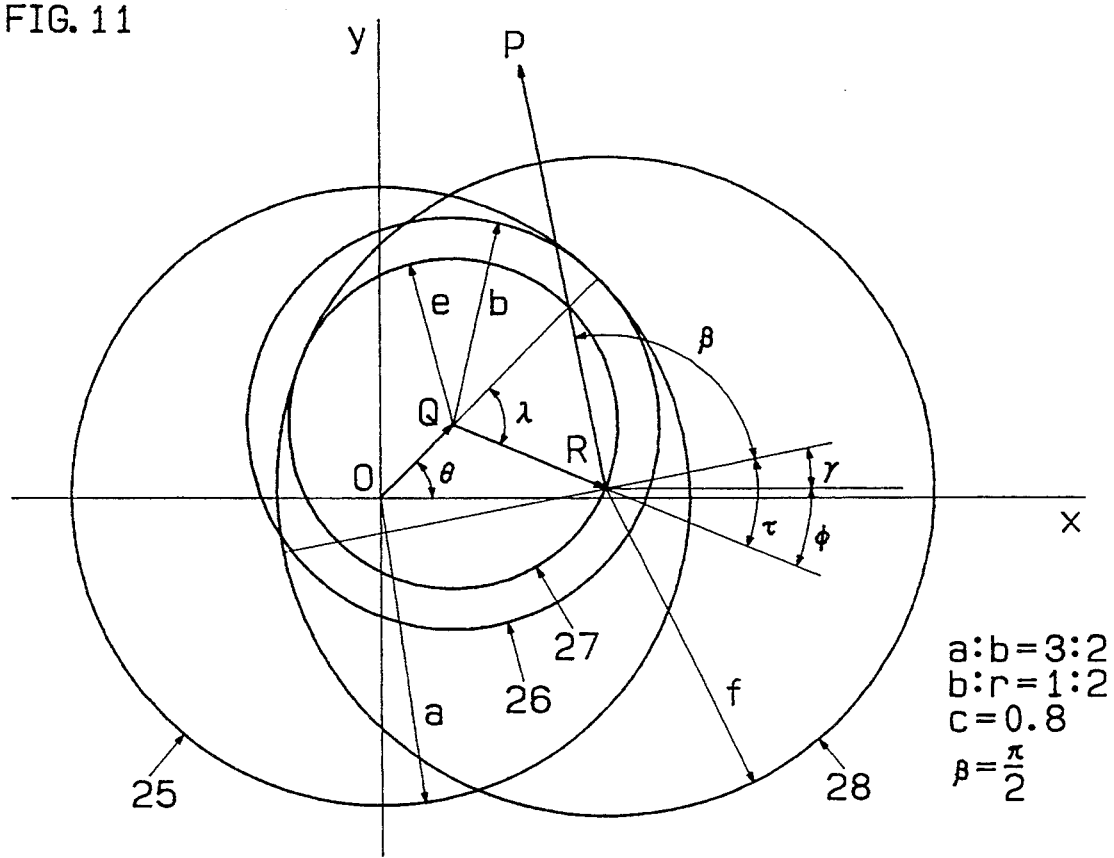
FIG. 11 shows the elementary geometric structure of the composite trochoid in the second and third embodiments.
Figure 12:
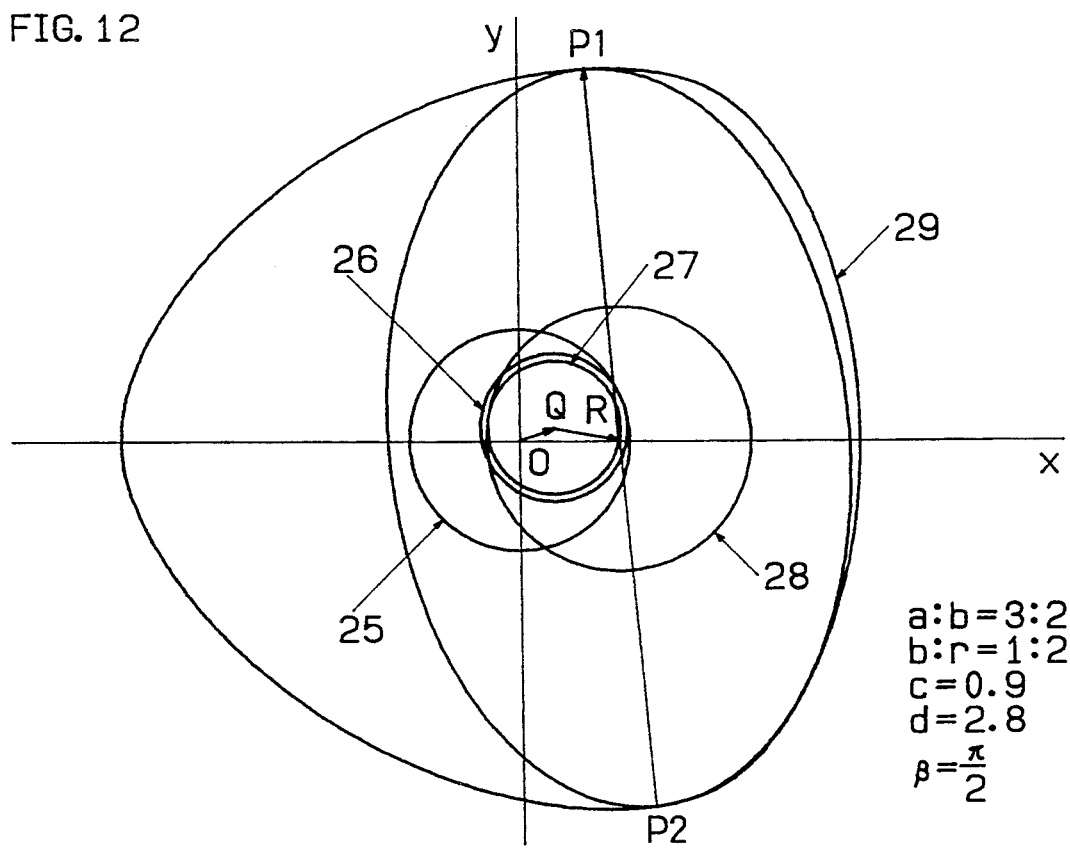
FIG. 12 shows the geometric relation between the composite trochoid and the rotating piston in the second and third embodiments.

Referring to FIGS. 6, 11, and 12, the rotary-piston engine of the second embodiment of the present invention differs from the first embodiment in that the curve determining the contour of the normal section of the tubular cavity of rotor housing 1 is a composite trochoid in which the ratio between the radii of base circle 25 and rolling circle 26 is 3:2, and the ratio between the radii of base circle 27 and rolling circle 28 is 1:2.

These ratios imply that the parametric equations of the curve determining the contour of the normal section of the tubular cavity can be expressed as $$x=(a-b)\cos\Theta+c(r-b)\cos(-\Theta/2)+dcr\cos(\Theta/4+\beta)$$

$$y=(a-b)\sin\Theta+c(r-b)\sin(-\Theta/2)+dcr\sin(\Theta/4+\beta)$$

Figure 20:
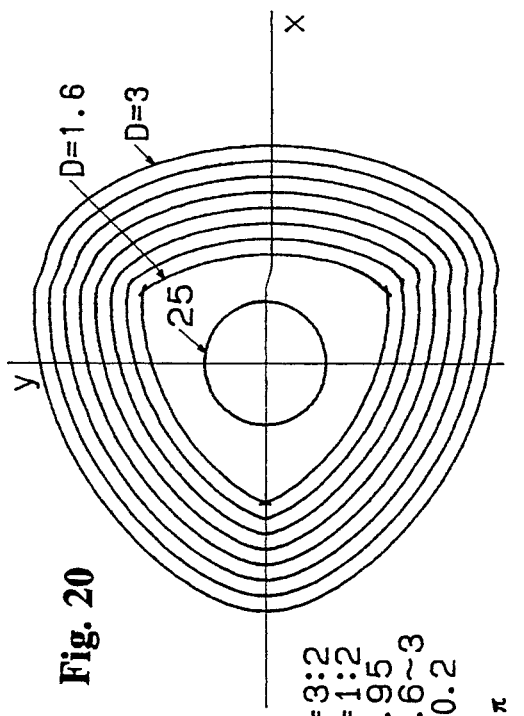
Figure 21:
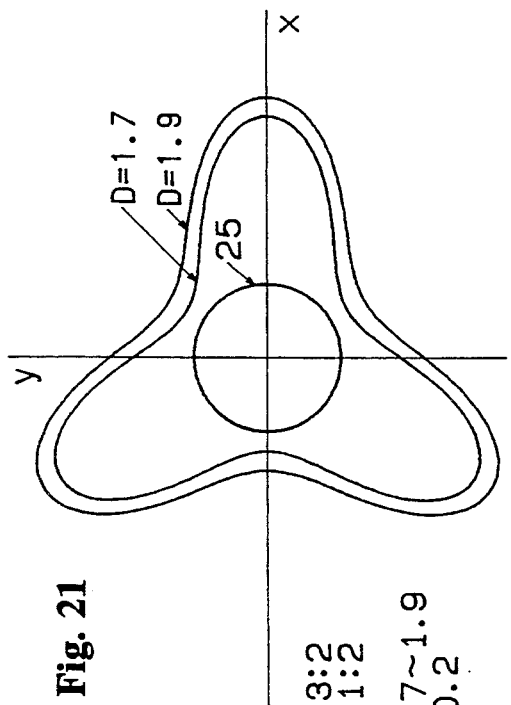
Figure 22:
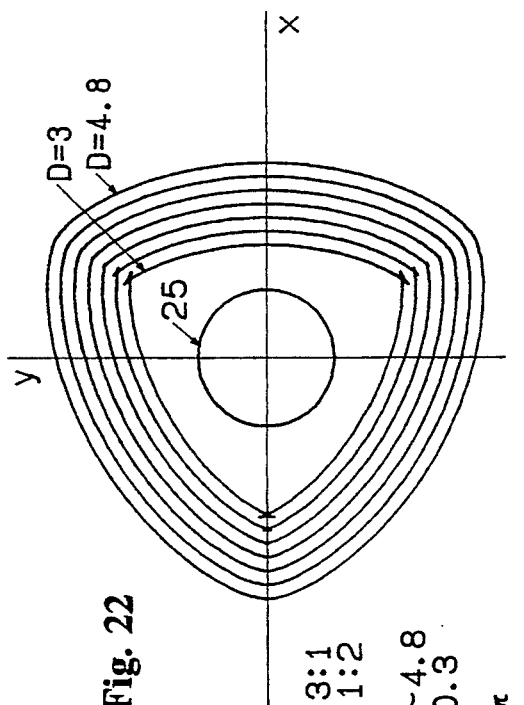
Figure 23:
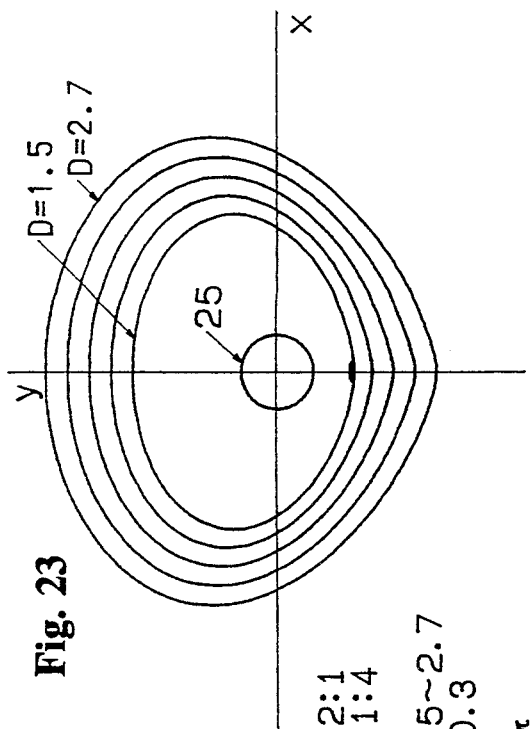
Figure 24:
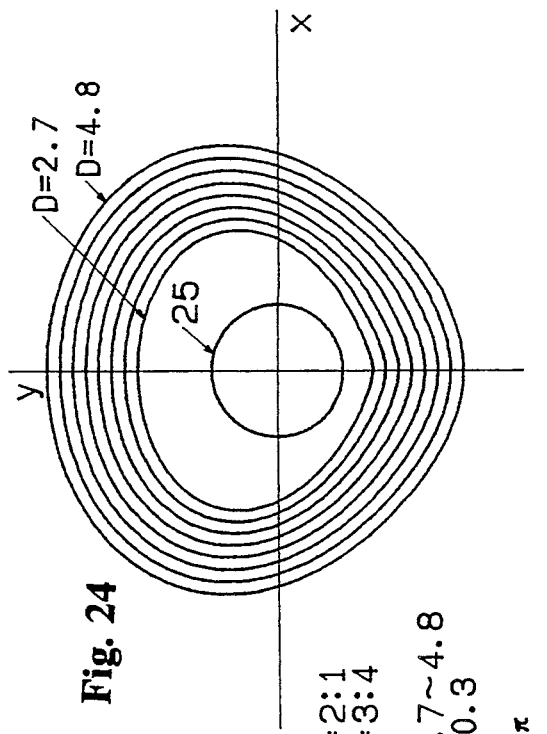
Figure 25:
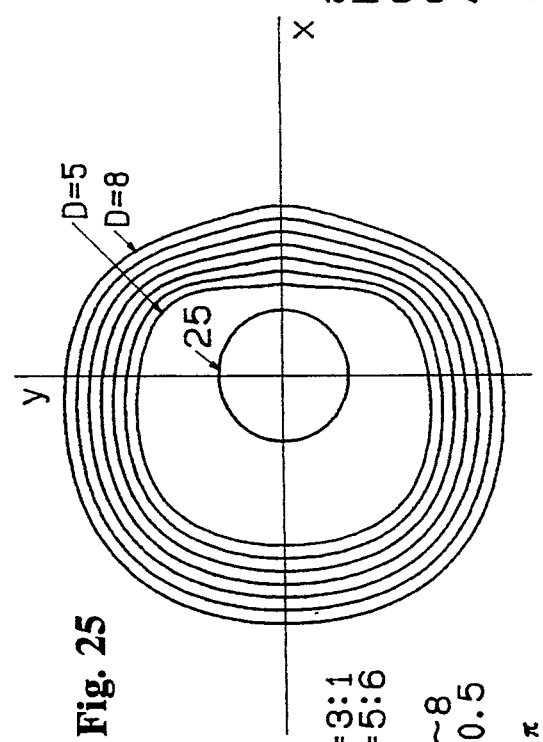
Figure 26:
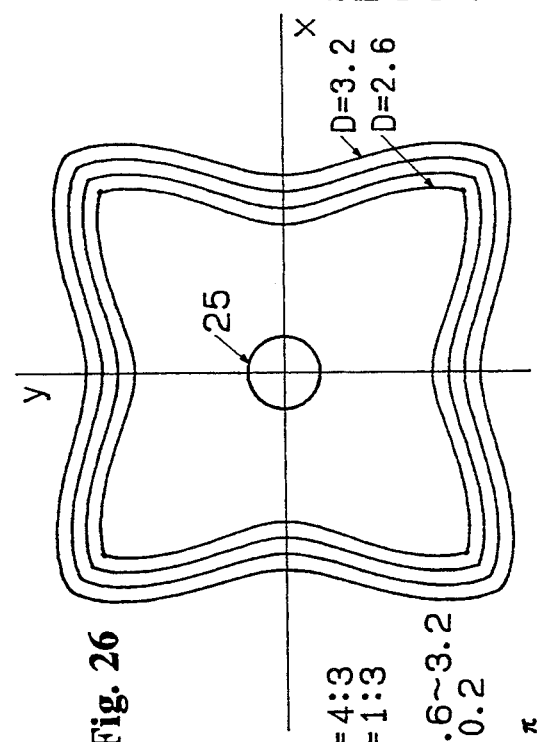
Figure 30:
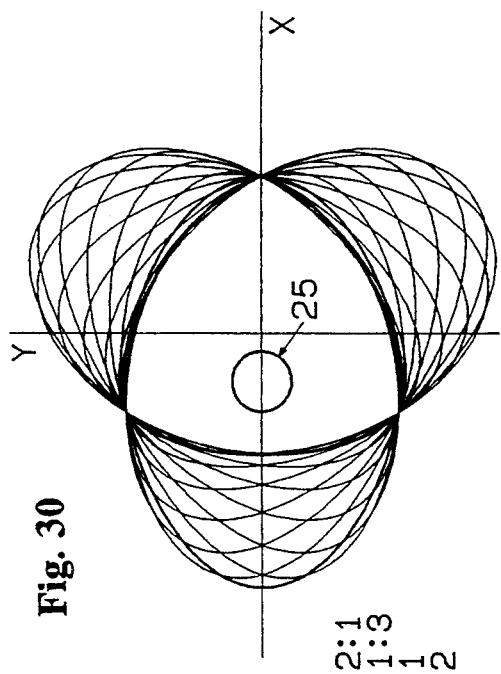
Figure 31:
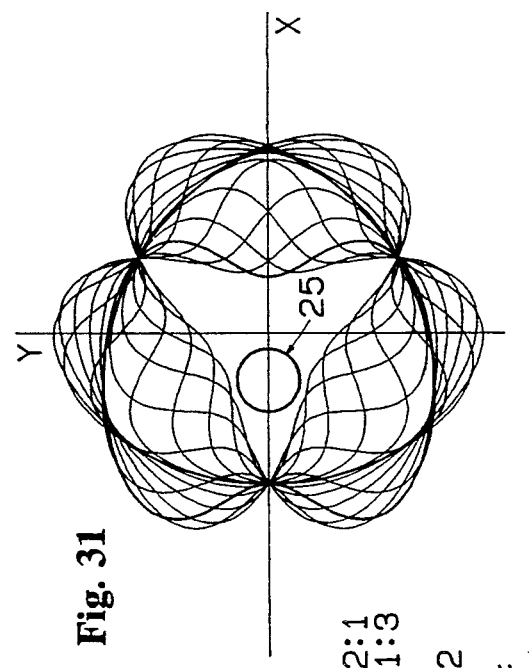

This second embodiment of the rotary-piston engine of the present invention can be made for all values of $\beta$. When $\beta=n\pi/2$, the conditions for making this embodiment are favorable, provided that n is an arbitrary integer. When $\beta=(2n+1)\pi/2$, the conditions for making this embodiment are the most favorable. FIG. 20 shows the composite trochoid for $\beta=\pi/2$; FIG. 21, the composite trochoid for $\beta=0$.

Referring to FIG. 20, apices appear on the corners of the composite trochoid when the value of d decreases. Values of d that do not give rise to such apices on the corners of the composite trochoid depend on the value of c. When c is too small, we have problems with mechanical strength. Therefore the most favorable conditions for making this embodiment of the rotary-piston engine of the present invention are when $1.0>c>0.7$.

Referring again to FIG. 20, for $c=0.95$, conditions are favorable when $d>2.1$. However, since conditions are disadvantageous for making this embodiment when d takes on high values, d should have low values within certain limits. These limits are that appendices not appear on the corners of the composite trochoid and that the inner envelope of the family of curves of the composite trochoid does not interfere with base circle 25 of the composite trochoid.

Referring to FIG. 32, in the second embodiment, rotating piston 3 has the shape of a right prism with an oval normal section having two vertices. Accordingly, the lateral face of the tubular cavity of rotor housing 1, the inside face of side housings 2, and the lateral faces of rotating piston 3 form two working chambers whose volume changes with time. Here the angles between the two vertices of the oval normal section and the center of the oval normal section are both 180°. The angular velocity of rotation of rotating piston 3 is one-fourth the angular velocity of rotation of crankshaft 4, which rotates in the same direction as rotating piston 3.

Referring again to FIG. 6, intake ducts 10 and exhaust ducts 11 make openings through rotor housing 1 into the working chambers. A rotary intake/exhaust valve 20 is installed in both intake duct 10 and exhaust duct 11. Opening and closing of both intake duct 10 and exhaust duct 11 are controlled by rotary intake/exhaust valve 20. Further, rotary intake/exhaust valve 20 is controlled by the rotating motion of rotating piston 3.

The angular velocity of rotation of rotary intake/exhaust valve 20 is one-eighth the angular velocity of rotation of crankshaft 4, which rotates in the opposite direction from rotary intake/exhaust valve 20. We can also use other types of valves, such as poppet valves, etc., instead of rotary valves.

Except for the differences mentioned above, the structure of the rotary-piston engine of the second embodiment is identical to the structure of the rotary-piston engine of the first embodiment.

Because rotating piston 3 describes a planetary motion on the axis of the crank pin at the same time as it revolves around the axis of the crank main shaft, the volume of the working chambers changes. Further rotary intake/exhaust valves 20 open and close both intake ducts 10 and exhaust ducts 11, thereby exchanging the combustion gas in the working chamber. Thus the operating cycle has four strokes: an intake stroke shown in FIGS. 60–62, a compression stroke shown in FIGS. 63–64, a combustion/expansion stroke shown in FIGS. 65–66, and an exhaust stroke shown in FIGS. 67–68. The expansion pressure of combustion is converted into the rotary motion of crankshaft 4. FIGS. 60–69 show the cycle of operations after separate 105° changes in the angle of crankshaft 4. FIG. 64 shows the cycle of operation after completion of the compression stroke. In this position we have both ignition and combustion.

When we use the same balancing techniques as in the first embodiment, the moving parts are in complete balance.

Figure 7:
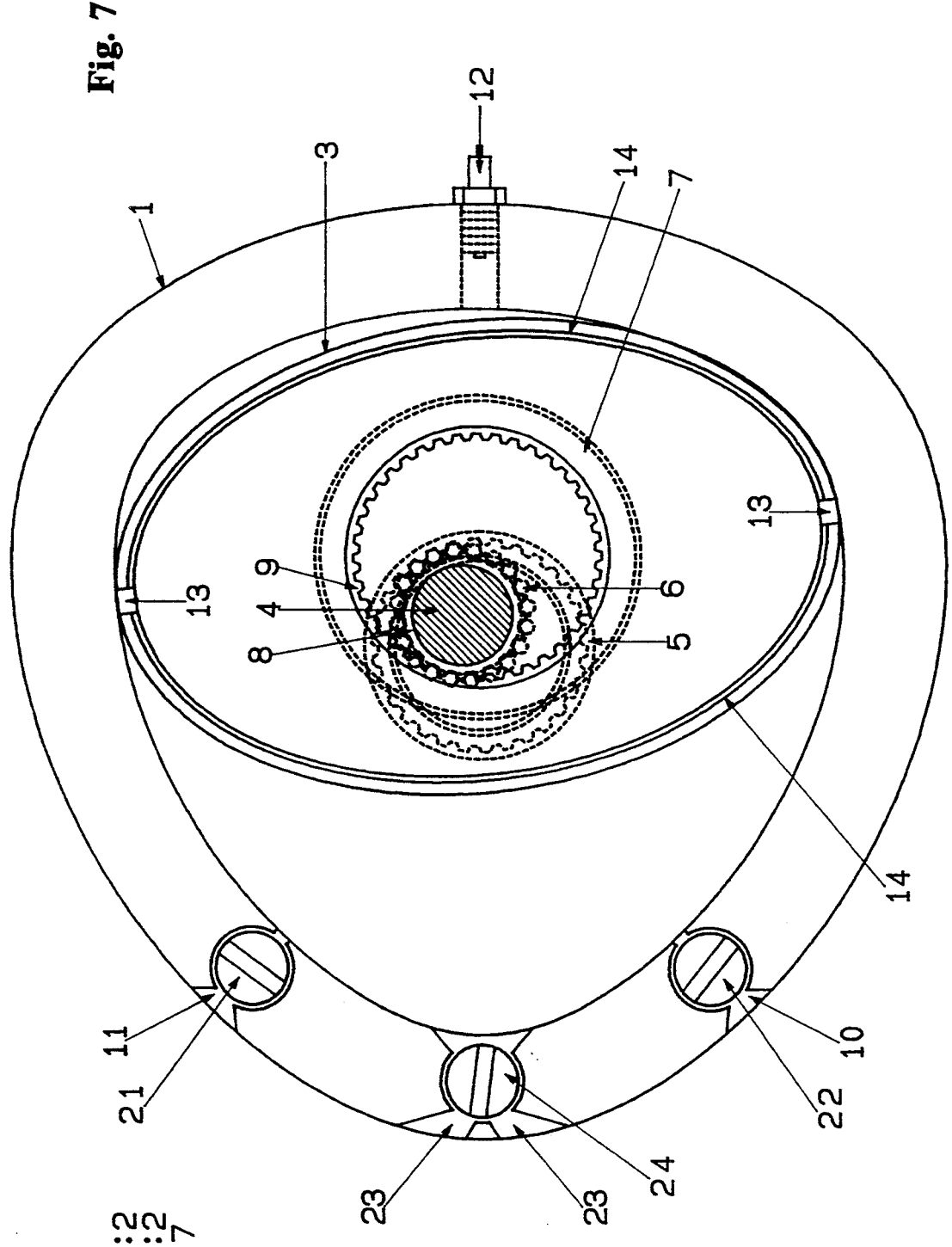
FIG. 7 is a sectional view showing a third embodiment of the present invention.

Referring to FIG. 7, the third embodiment differs from the rotary-piston engine of the second embodiment in that scavenging ducts 23 are opened through rotor housing 1 into the working chamber.

Intake duct 10, exhaust duct 11, and scavenging ducts 23 make openings through rotor housing 1 into the working chambers. A rotary intake valve 22 is installed in intake duct 10; a rotary exhaust valve 21, in exhaust duct 11; and a rotary scavenging vane 24, in scavenging duct 23. Opening and closing of intake duct 10 is controlled by rotary intake valve 22; opening and closing of exhaust duct 11, by rotary exhaust valve 21; and opening and closing of scavenging duct 23, by rotary scavenging valve 24. Rotary intake valve 22, rotary exhaust valve 21, and rotary scavenging valve 24 are controlled by the rotation of rotating piston 3.

The angular velocity of rotation of rotary scavenging valve 24 is one-quarter the angular velocity of rotation of crankshaft 4, which rotates in the opposite direction from rotary scavenging valve 24. The angular velocity of rotation of both rotary intake valve 22 and rotary exhaust valve 21 is one-quarter the angular velocity of rotation of crankshaft 4, which rotates in the same direction as both rotary intake valve 22 and rotary exhaust valve 21.

Except for the above-mentioned differences, the structure of the rotary-piston engine of the third embodiment is identical to the structure of the rotary-piston engine of the second embodiment.

Because rotating piston 3 describes a planetary motion on the axis of the crank pin at the same time as it revolves around the axis of the crank main shaft, the volume of the working chambers changes. Rotary intake valve 22 opens and closes intake duct 10, rotary exhaust valve 21 opens and closes exhaust duct 11, and rotary scavenging valve 24 opens and closes scavenging ducts 23. These openings and closings exchange the combustion gas in the working chamber. Thus the operating cycle has five strokes: a combustion/expansion stroke shown in FIGS. 71–72, an exhaust stroke shown in FIGS. 73–74, a scavenging stroke shown in FIGS. 75–78, an intake stroke shown in FIGS. 79–80, and a compression stroke shown in FIGS. 81 and 70. The expansion pressure of combustion is converted into the rotary motion of crankshaft 4. FIGS. 70–81 show the cycle of operations after separate 105° changes in the angle of crankshaft 4. FIG. 70 shows the cycle of operation after completion of the compression stroke. In this position we have ignition and combustion.

Referring to FIGS. 8, 13, 14, and 82, the fourth embodiment is a reciprocating engine with a crank mechanism that exploits the reciprocating motion generated by the generating point of a composite trochoid and eschews the crank mechanism of the reciprocating engines in current use.

Figure 8:
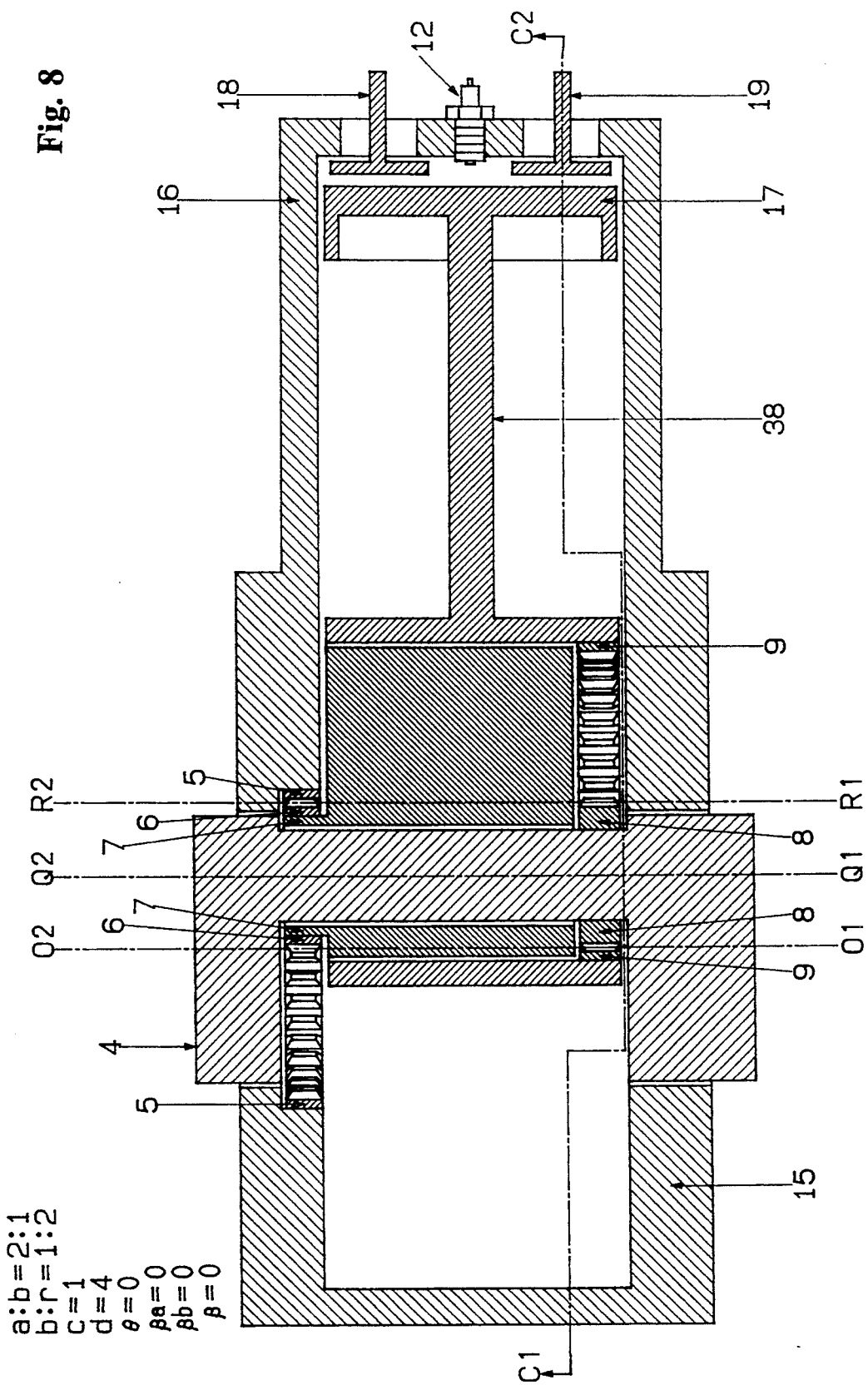
FIG. 8 is a sectional view, taken along B1–B2 of FIG. 82, of a fourth embodiment of the present invention.
Figure 9:
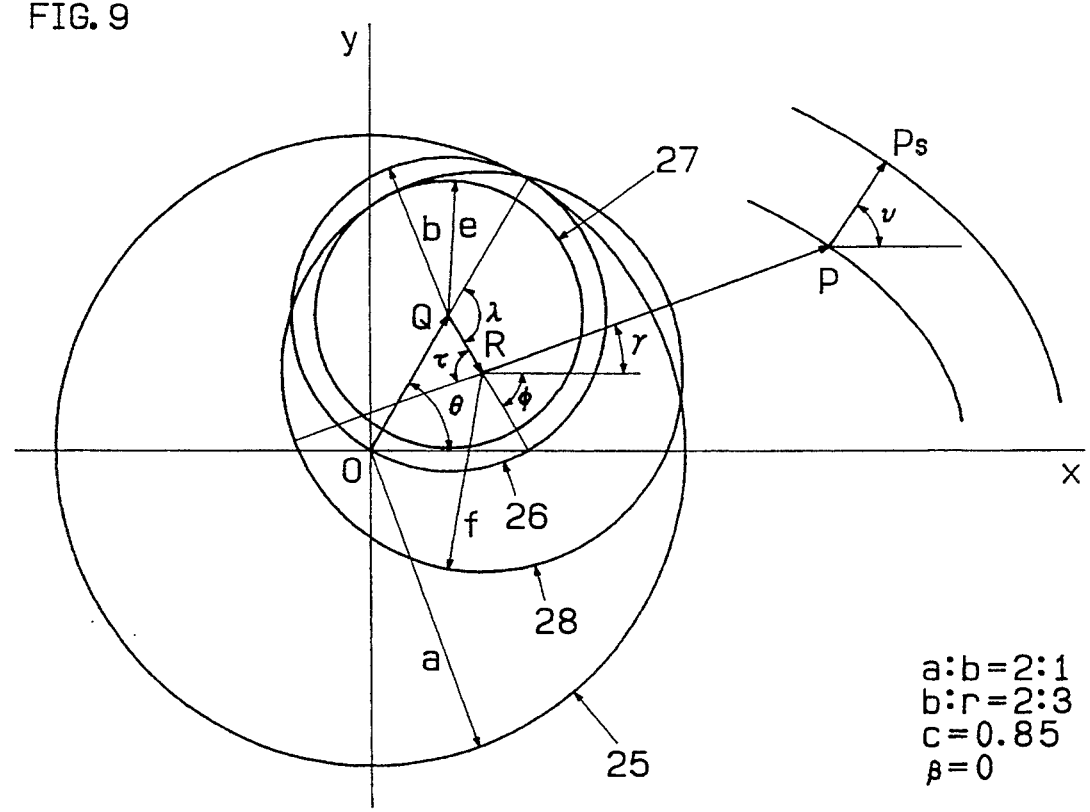
FIG. 9 shows the elementary geometric structure of the composite trochoid in the first embodiment.
Figure 13:
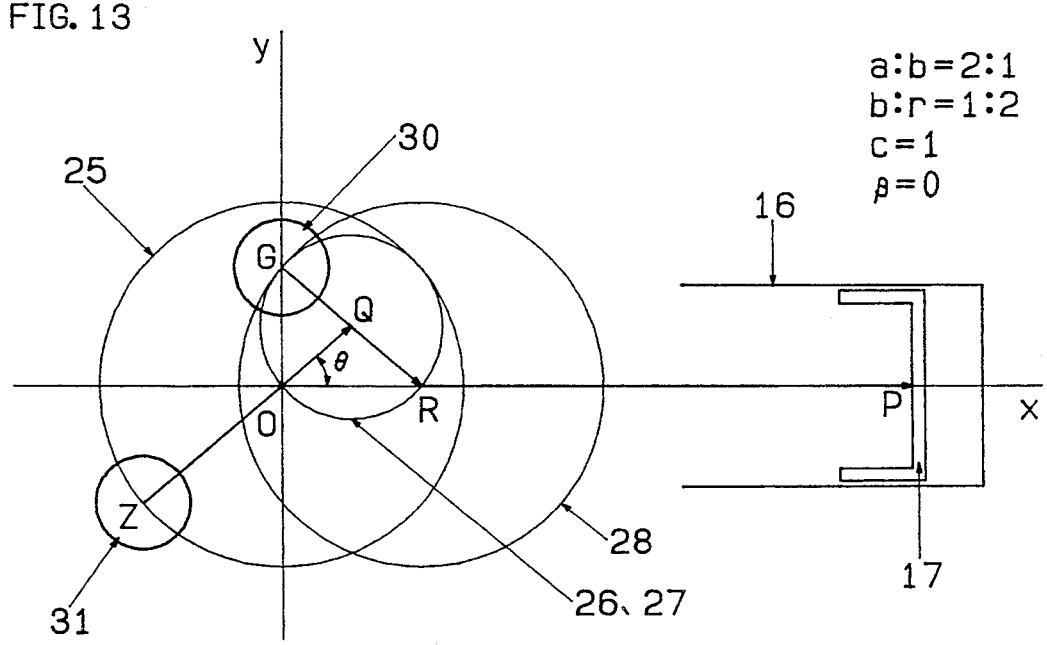
FIG. 13 and 14 show the elementary geometric structure of the fourth embodiment and the geometric relation between a counter weight and a reciprocating piston.

Referring to FIGS. 8 and 82, we make a reciprocating working chamber by installing a reciprocating piston 17 on the generating point of a composite trochoid and putting a cylinder 16 together with it. Then we install a crankcase 15 and a connecting member 38. We also install a poppet intake valve 18, a poppet exhaust valve 19, and an ignition plug 12 in the top of cylinder 16. This structure differs from that of the reciprocating engines in current use by its crank mechanism. Its cycle of operations is identical with current reciprocating engines. In FIGS. 8 and 82 the counter weights of FIG. 13 are omitted.

The fourth embodiment is a planetary-motion reciprocating engine using a crank mechanism that exploits the reciprocating motion generated by the generating point of a composite trochoid, instead of the crank mechanism of the reciprocating engines in use to-day.

The structure of the crank mechanism of this embodiment of the planetary-motion reciprocating engine of the present invention is essentially identical with the structure consisting of rotating piston 3, eccentric shaft 7, crankshaft 4, and the two gear units in the first embodiment, except for the following characteristics.

(a) The ratio between the radius of the pitch circles of fixed gear 5 and rolling gear 6 is 2:1. The ratio between the radius of the pitch circles of fixed gear 8 and rolling gear 9 is 1:2. The radius of the pitch circle of rolling gear 6 is equal to the radius of the pitch circle of fixed gear 8.

(b) Fixed gear 5 is fixed to crank case 15. The crank main shaft of crankshaft 4 is pierced through crank case 15 to make the crank main shaft and fixed gear 5 coaxial.

(c) Connecting member 38 connects reciprocating piston 17 to the eccentric wheel of eccentric shaft 7. The big end of connecting member 38 is attached to the eccentric wheel so that connecting member 38 may revolve therearound. Reciprocating piston 17 is fixed to the small end of connecting member 38. The center of the small end of connecting member 38 is the generating point of either the composite trochoid or the translated composite trochoid. The function of connecting member 38 is equivalent to the function of generating arm RP of the peritrochoid shown in FIG. 13.

(d) Rolling gear 9 is not fixed to rotating piston 3. Rather rolling gear 9 is fixed to the big end of connecting member 38.

We now explain the reciprocating motion generated by the generating point of a translated composite trochoid in which a composite trochoid has been translated in parallel a fixed distance t along a line normal to the composite trochoid.

In the above composite trochoid we let the ratio between the radii of base circle 25 and rolling circle 26 be 2:1 and the ratio between the radii of base circle 27 and rolling circle 28 be 1:2. Further, let $c=1$, $\beta a=0$, and $\beta=\beta b/2$. Then the coordinates of the generating point of the above composite trochoid can be expressed, using equations (3) and (4), as:

$$x = b\cos\Theta + b\cos(-\Theta+\beta b) + dr\cos(\beta b/2)$$

$$y = b\sin\Theta + b\sin(-\Theta+\beta b) + dr\sin(\beta b/4)$$

$$\text{As } \cos A + \cos B = 2\cos\{(A+B)/2\}\cos\{(A-B)/2\}$$

and $$\sin A + \sin B = 2\sin\{(A+B)/2\}\cos\{(A-B)/2\},$$

the above equations become $$x = 2c\cos(\beta b/2)\cos\{(2\Theta-\beta b)/2\} + dr\cos(\beta b/2),$$

and $$y = 2b\sin(\beta b/2)\cos\{(2\Theta-\beta b)/2\} + dr\sin(\beta b/2),$$

or $$x = \cos(\beta b/2)\{2b\cos(\Theta-\beta b/2) + dr\} \quad (9)$$

$$y = \sin(\beta b/2)\{2b\cos(\Theta-\beta b/2) + dr\} \quad (10)$$

Therefore the coordinates of the generating point of the translated composite trochoid can be expressed as $$xs = \cos(\beta b/2)\{2b \cos(\Theta - \beta b/2) + dr\} + t \cos \nu$$
$$ys = \sin(\beta b/2)\{2b \cos(\Theta - \beta b/2) + dr\} + t \sin \nu,$$
where $\tan \nu = -(dx/d\Theta)/(dy/d\Theta)$.
Here $$dx/d\Theta = -2b \cos(\beta b/2)\sin(\Theta - \beta b/2) \text{ and}$$
$$dy/d\Theta = -2b \sin(\beta b/2)\sin(\Theta - \beta b/2), \text{ or}$$
$$-(dx/d\Theta)/(dy/d\Theta) = -\cos(\beta b/2)/\sin(\beta b/2)$$
$$= -\cot(\beta b/2)$$
$$= \tan(\beta b/2 + \pi/2).$$
Accordingly,
$\tan \nu = \tan(\beta b/2 + \pi/2)$ and
$\nu = \beta b/2 + \pi/2$.

Therefore the coordinates of the generating point of the translated composite trochoid can be expressed as $$xs = \cos(\beta b/2)\{2b \cos(\Theta - \beta b/2) + dr\} + t \cos(\beta b/2 + \pi/2)$$
$$= \cos(\beta b/2)\{2b \cos(\Theta - \beta b/2) + dr\} - t \sin(\beta b/2).$$
$$ys = \sin(\beta b/2)\{2b \cos(\Theta - \beta b/2) + dr\} + t \sin(\beta b/2 + \pi/2)$$
$$= \sin(\beta b/2)\{2b \cos(\Theta - \beta b/2) + dr\} + t \cos(\beta b/2), \text{ or}$$

$$\begin{pmatrix} xs \\ ys \end{pmatrix} = \begin{pmatrix} \cos(\beta b/2) & -\sin(\beta b/2) \\ \sin(\beta b/2) & \cos(\beta b/2) \end{pmatrix} \begin{pmatrix} 2b \cos(\Theta - \beta b/2) + dr \\ t \end{pmatrix}$$

In other words, the coordinates of the generating point of the translated composite trochoid can be expressed basically as $$xs = 2b \cos(\Theta - \beta b/2) + dr$$
$$ys = t,$$

and the angle formed by the prolongation of the translated composite trochoid and the x-axis becomes $\beta b/2$.

Consequently the generating point of the translated composite trochoid generates a reciprocating motion whose tilt is $\beta b/2$, and the translated composite trochoid becomes parallel to a straight line that passes through the origin O and has a tilt of $\beta b/2$. The interval between this straight line and the translated composite trochoid becomes t. The displacement of the translated composite trochoid becomes a cosine function of the variable $\Theta$ with amplitude 2b. When the generating point of the translated composite trochoid generates the reciprocating motion, the point Q (the axis of the crank pin) accordingly revolves around the origin 0 (the axis of the crank main shaft). Because of this, we can use the reciprocating motion generated by the generating point of the translated composite trochoid for the crank mechanism of the reciprocating engines in use today.

If we let t=0, we get a composite trochoid whose generating point generates a reciprocating motion. The prolongation of the composite trochoid passes through the origin O, the angle formed by the prolongation of the composite trochoid and the x-axis becomes $\beta b/2$, and the displacement of the composite trochoid becomes a cosine function of the variable $\Theta$ with amplitude 2b.

When the generating point of the composite trochoid generates the reciprocating motion, the point Q (the axis of the crank pin) revolves around the origin O (the axis of the crank main shaft). Thus the reciprocating motion generated by the generating point of the composite trochoid may be substituted for the crank mechanism of the reciprocating engines in use today. The conditions for making this invented planetary-motion reciprocating engine are most favorable when t=0.

Referring to FIG. 13, when we make this reciprocating working chamber of the present invention by installing reciprocating piston 17 on generating point P of the composite trochoid and by putting cylinder 16 together with it, reciprocating piston 17 moves back and forth in cylinder 16. This displacement of the working chamber becomes a cosine function of the crank angle $\Theta$ with stroke amplitude 2a. Here dr becomes the length of the connecting rod of the reciprocating engines in use today. When t≠0, reciprocating piston 17 reciprocates on a straight line parallel to the x-axis.

Referring again to FIG. 13, let the mass of reciprocating piston 17 be M1 and its particle be generating point P. Let the mass of a counter weight 30 be M2 and its particle be a point G. Let the mass of a counter weight 31 be M3 and its particle be a point Z. Point G and point R are symmetric about point Q. Point Z is on the circumference of base circle 25, and the phase angle between point Z and point Q is $\pi$.

Here we let the angular velocity of point Q be $\alpha$ and the time be t. Then $\Theta = \alpha t$. Since $\beta b = 0$, the coordinates of the particle of reciprocating piston 17 can be expressed from equations (9) and (10) as $$x1 = 2b \cos \alpha t + dr$$

$$y1 = 0.$$

Since dr=0 and $\beta b = \pi$, the coordinates of the particle of counter weight 30 can be expressed from equations (9) and (10) as x2=0
y2=2b sin $\alpha$t.

The coordinates of the particle of counter weight 31 can be expressed as x3= —a cos $\alpha$t
y3= —a sin $\alpha$t.

The total sum Ix of the inertial forces of the moving parts on the x-axis can be expressed as $$Ix = -M1 \, d(dx1/dt)/dt - M2 \, d(dx2/dt)/dt - M3 \, d(dx3/dt)/dt$$
$$= (2b \, M1 - a \, M3)\alpha \, \alpha \cos \alpha t.$$

The total sum Iy of the inertial forces of the moving parts on the y-axis can be expressed as $$Iy = -M1 \, d(dy1/dt)/dt - M2 \, d(dy2/dt)/dt - M3 \, d(dy3/dt)/dt$$
$$= (2b \, M2 - a \, M3)\alpha \, \alpha \sin \alpha t.$$

To get the moving parts into complete balance, the total sums Ix and Iy must equal 0. Thus complete balance implies b M1=b M2
a M3=b(M1+M2).

Assuming that reciprocating piston 17 has mass M1 and is installed at point R, installing counter weight 30 at point G cancels the effect of mass M1. Further, installing counter weight 31 at point Z cancels the sum of mass M2 of counter weight 30 and mass M1 of reciprocating piston 17. Then the total sum of the inertial forces of the moving parts becomes 0. Thus the counter weight installations described above completely balance the moving parts.

In these installations point G and point R need not be symmetric about point Q, point Z need not be on the circumference of base circle 25, and the phase angle between point Z and point Q need not be $\pi$.

Figure 14:
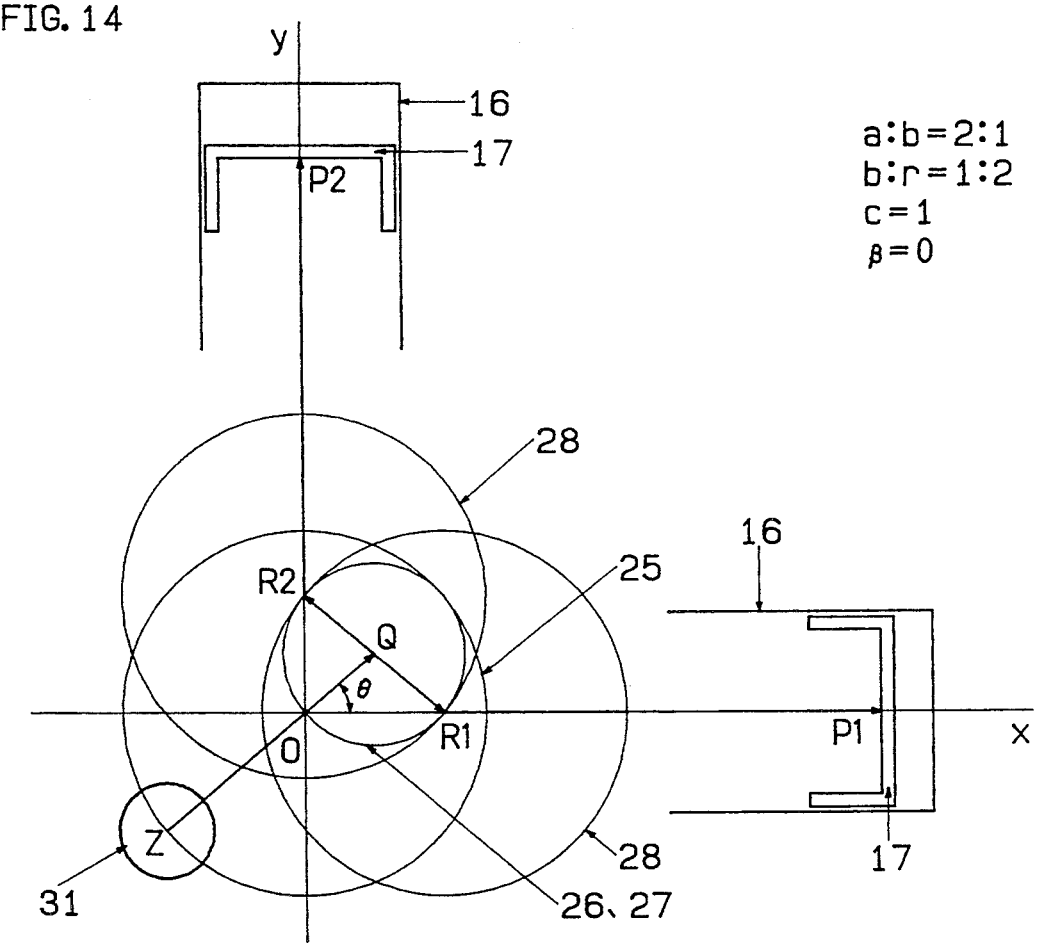

Referring to FIG. 14, we install reciprocating piston 17 of mass M1 at generating point P2. Since $\beta b=\pi$, the coordinates of the particle of reciprocating piston 17 can be expressed from equations (9) and (10) as $x2=0$
$y2=2b \sin \alpha t+dr$.

The total sum Ix can be expressed as $$Ix = -M1\, d(dx1/dt)/dt - M1\, d(dx2/dt)/dt - M3\, d(dx3/dt)/dt$$
$$= (2b\, M1 - a\, M3)\alpha\, \alpha \cos \alpha t$$

The total sum Iy can be expressed as $$Iy = -M1\, d(dy1/dt)/dt - M1\, d(dy2/dt)/dt - M3\, d(dy3/dt)/dt$$
$$= (2b\, M1 - a\, M3)\alpha\, \alpha \sin \alpha t$$

Once again, to get the moving parts into complete balance, the total sums Ix and Iy must equal 0. Thus complete balance implies 2b M1 = a M3.

Assuming that two reciprocating pistons 17 are installed at point Q, installing counter weight 31 at point Z cancels the sum of the mass of the two reciprocating pistons 17. Then the total sum of the inertial forces of the moving parts becomes 0. Thus the counter weight installations completely balance the moving parts.

A reciprocating motion is thereby changed to a simple rotating motion. Because of this change, the inertial forces of the reciprocating motion become 0, and the impediment from the reciprocating masses becomes 0.

Although the engine of the fourth embodiment has the form of a reciprocating engine, it is, mechanically speaking, essentially a rotary-piston engine.

Since counter weight 31 can be exchanged for two reciprocating pistons, we can now make, according to the present invention, a reciprocating engine that is, for example, a 90° V-type or a star-shaped four-cylinder reciprocating engine.

The above-mentioned embodiments are meant for illustration only and are not intended to define the limits of this invention. Further, the present invention also encompasses slightly altered structures that do not differ from the principle of this invention, one of which is the following.

In the above-described embodiments, the mechanism consisted of two gear units, crankshaft 4, eccentric shaft 7, and rotating piston 3, from whose operation came the locus described by equations (1) and (2). Here one of the two gear units consisted of fixed gear 5 and rolling gear 6; the other, of fixed gear 8 and rolling gear 9.

However, we can also obtain the locus described by equations (1) and (2) with a gear unit that consists of a fixed gear, a rolling gear, and at least one idle gear.

For example, since $\lambda=-a\Theta/b$, rolling gear 6 rotates in the opposite direction from crankshaft 4 at an angular velocity of a/b of its angular velocity of rotation. Then we can (not shown):

(a) Fix to crankshaft 4 the axis of rotation of a stacked idle gear, whose upper and lower gear are both external. We let both fixed gear 5 and rolling gear 6 be external gears. We now make a gear unit consisting of this stacked idle gear, fixed gear 5, and rolling gear 6.

(b) Fix to crankshaft 4 the axis of rotation of a stacked idle gear, whose upper and lower gear are both external. We let both fixed gear 5 and rolling gear 6 be internal gears. We now make a gear unit consisting of this stacked idle gear, fixed gear 5, and rolling gear 6.

(c) Fix to crankshaft 4 the axes of rotation of an even number of idle gears whose gears are external. We now make a gear unit consisting of the even number of idle gears, fixed gear 5, and rolling gear 6.

We can also replace, with one of the gear units described in (a)–(c) above, the gear unit consisting of fixed gear 8 and rolling gear 9. In this case, since $\tau=-e\lambda/f$, we can use one of these gear units so that rolling gear 9 rotate in a direction opposite to that of eccentric shaft 7 and at an angular velocity e/f of that of eccentric shaft 7. We must also fix the axes of rotation of these idle gears to eccentric shaft 7.

In other words, a quasi-composite trochoid as shown in FIG. 85 can be the contour of the normal section of the tubular cavity in the housing.

The engine of the present invention has the following advantages:

1. The rotary piston engine characterized by the composite trochoid in which the ratio between the radii of the hypotrochoid's base and rolling circles is 2:1, and the ratio between the radii of the peritrochoid's base and rolling circles is 2:3:

(a) There are no reciprocating parts. The only moving parts are those parts that rotate. Thus the moving parts can be in complete balance.

(b) Because this rotary-piston engine has no constrictions on the minor axis of the contour of the normal section of the tubular cavity in the housing, the movement of combustion gas is not impeded near top dead center.

(c) The engine has a higher compression ratio than the Wankel rotary-piston engine.

(d) Because the displacement of the working chamber changes slowly near top dead center, combustion is completed before expansion begins. Therefore the conditions for thermal efficiency, maximum expansion, and maximum pressure before the beginning of expansion, are fulfilled.

(e) In the automobile Diesel engines in present use, a great amount of fuel is injected into the working chamber in one instant during a very short combustion stroke. Because the time for combustion is very short, combustion continues even after the expansion stroke starts. Thus the expansion ratio decreases substantially, with a concomitant decrease in thermal efficiency. Further, the chance for a reaction between the fuel and the oxygen is also low. Consequently measures to prevent black smoke will be insufficient.

In the rotary-piston engine of the present invention, on the contrary, the displacement of the working chamber changes slowly near top dead center. Thus there is enough time for complete combustion. Because the shape of the working chamber is flat and the flat working chamber moves with almost unchanged displacement along the inside face of the rotor housing, in relation to the working chamber, the fuel injection valve moves along the chamber wall. As we use a fuel injection valve with high atomization and high distribution, we can inject sequences of small amounts of fuel from one end of the working chamber to the other. In this way we can spread the highly atomized fuel all over the working chamber. Thus the chance for a reaction between the fuel and the oxygen increases, and we can expect combustion to be completed before expansion begins. Consequently we can expect a high thermal efficiency, and conditions for preventing black smoke are good. There is no need for great efforts to make penetration and atomization compatible.

(f) Since the displacement of the working chamber changes slowly near top dead center, there is enough time for combustion. We can call this part of the operating cycle a combustion stroke. Further, the displacement of the working chamber changes slowly from the end of the exhaust stroke to the beginning of the intake stroke, a period we can call a scavenging stroke. Consequently we can make a six-stroke cycle rotary-piston engine with an intake stroke, a compression stroke, a combustion stroke, an expansion stroke, an exhaust stroke, and a scavenging stroke.

2. In the rotary-piston engine characterized by the composite trochoid in which the ratio between the radii of the hypotrochoid's base and rolling circles is 3:2, and the ratio between the radii of the peritrochoid's base and rolling circles is 1:2:

There are no reciprocating parts. The rotating parts are the only parts that move. Thus the moving parts can be in complete balance.

3. In the reciprocating engine characterized by installing a reciprocating piston on the generating point of a composite trochoid or a translated composite trochoid, putting a cylinder together with the reciprocating piston, and using a crank mechanism that exploits the reciprocating motion generated by the generating point of the composite trochoid or translated composite trochoid, the moving parts can be in complete balance, and the impediment from the reciprocating masses disappears. Since piston slap does not occur, we need no cross-head. Since the reciprocating piston is independent, the side thrust from the weight of the reciprocating piston disappears. For a huge ship engine, we can use a V-type reciprocating engine. As a result, the ship engine becomes smaller, and the center of gravity of the ship is thereby lowered, which improves the vessel's stability and seaworthiness.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A planetary-motion rotary-piston engine comprising:
    a housing containing a tubular cavity shaped as a right noncircular cylinder having an axis, in which a curve that determines a contour of a normal section of the tubular cavity is a composite trochoid composed of a hypotrochoid and a peritrochoid;
    said tubular cavity being bounded at each end by two side housings geometrically corresponding to two bases of said light noncircular cylinder;
    the composite trochoid having a family of curves;
    said family of curves having an inner envelope and an outer envelope with at least two points of osculation;
    a crankshaft, pierced through said side housings of said tubular cavity along said axis;
    an eccentric shaft, coaxially attached to a crank pin of said crankshaft, said eccentric shaft moving as a generating arm of said hypotrochoid and as an eccentric arm of said peritrochoid;
    a rotating piston, shaped as a right prism having two bases, which bases slide continuously on said side housings of said tubular cavity;
    a normal section of said rotating piston having at least two vertices corresponding to a like number of said points of osculation;
    each vertex of said normal section of said rotating piston being a generating point of said composite trochoid;
    a first gear unit comprising:
        a first fixed gear being an internal gear and coaxially fixed to a one of said side housings of said tubular cavity, said first fixed gear moving as a base circle of said hypotrochoid;
        a first rolling gear coaxially fixed to said eccentric shaft, said first rolling gear moving as a rolling circle of said hypotrochoid;
        said first fixed gear and said first rolling gear engaging each other;
    a second gear unit comprising:
        a second fixed gear coaxially fixed to said crank pin, said second fixed gear moving as a base circle of said peritrochoid;
        a second rolling gear coaxially fixed to said rotating piston, said second rolling gear moving as a rolling circle of said peritrochoid;
        said second fixed gear and said second rolling gear engaging each other;
    said generating point of said composite trochoid being defined by a pair of parametric equations, $x=(a-b)\cos\Theta+c(r-b)\cos(1-a/b)\Theta+dcr\cos\{(-1-a/b+a/r)\Theta+\beta\}$ and $y=(a-b)\sin\Theta+c(r-b)\sin(1-a/b)\Theta+dcr\sin\{(1-a/b+a/r)\Theta+\beta\}$, where $\Theta$ is an angular velocity of said crankshaft, $(1-a/b)\Theta$ is an angular velocity of said eccentric shaft, $(1-a/b+a/r)\Theta$ is an angular velocity of said rotating piston, $(a-b)$ is equal to a distance between an axis of said crankshaft and an axis of said crank pin, $c(r-b)$ is equal to a distance between said crank pin axis and an axis of said second rolling gear, $dcr$ is equal to a distance between said second rolling gear axis and a one of said vertices of said normal section of said piston, and $\beta$ is a constant and is equal to a phase angle of said generating point of said composite trochoid; and
    connecting ducts for gas exchange whose opening and closing are controlled by said rotating piston.

2. A planetary-motion rotary-piston engine according to claim 1 in which a ratio between radii of said base circle and said rolling circle of said hypotrochoid is 2:1, and a ratio between radii of said base circle and said rolling circle of said peritrochoid is 2:3.

3. A planetary-motion rotary-piston engine according to claim 1, in which a ratio between radii of said base circle and said rolling circle of said hypotrochoid is 3:2, and a ratio between radii of said base circle and said rolling circle of said peritrochoid is 1:2.

4. A planetary-motion rotary-piston engine according to claim 1, in which said curve determining said contour of said normal section of said tubular cavity is a translated composite trochoid, where said composite trochoid has been translated in parallel outwards a fixed distance along a line normal to said composite trochoid, and each of said vertices of said normal section of said rotating piston is formed as a circular arc whose center is said generating point of said composite trochoid and whose radius is equal to said fixed distance.

5. A planetary-motion rotary-piston engine according to claim 4 in which a ratio between radii of said base circle and said rolling circle of said hypotrochoid is 2:1, and a ratio between radii of said base circle and said rolling circle of said peritrochoid is 2:3.

6. A planetary-motion rotary-piston engine according to claim 4, in which a ratio between radii of said base circle and said rolling circle of said hypotrochoid is 3:2, and a ratio between radii of said base circle and said rolling circle of said peritrochoid is 1:2.

7. A planetary-motion rotary-piston engine, comprising:
   a housing containing a tubular cavity shaped as a right noncircular cylinder having an axis;
   said tubular cavity being bounded at each end by two side housings geometrically corresponding to two bases of said right noncircular cylinder;
   a rotating piston, shaped as a right prism having two bases, which bases slide continuously on said side housings of said tubular cavity, in which a curve that determines a contour of a normal section of said rotating piston is a composite trochoid composed of a first hypotrochoid and a first peritrochoid;
   said composite trochoid having a family of curves;
   said family of curves having an inner envelope and an outer envelope with at least two points of osculation;
   said outer envelope having a second hypotrochoid and a second peritrochoid whereby a geometric relationship between said second hypotrochoid and said second peritrochoid is identical to a geometric relationship between said first hypotrochoid and said first peritrochoid;
   a curve determining a contour of a normal section of said tubular cavity is said outer envelope of said family of curves;
   a crankshaft, pierced through said side housings of said tubular cavity along said axis;
   an eccentric shaft, coaxially attached to a crank pin of said crankshaft, said eccentric shaft moving as a generating arm of said second hypotrochoid and as an eccentric arm of said second peritrochoid;
   said normal section of said rotating piston having at least two vertices corresponding to a like number of said points of osculation;
   a first gear unit comprising:
   a first fixed gear being an internal gear and coaxially fixed to a one of said side housings of said tubular cavity, said first fixed gear moving as a base circle of said second hypotrochoid;
   a first rolling gear coaxially fixed to said eccentric shaft, said first rolling gear moving as a rolling circle of said second hypotrochoid;
   said first fixed gear and said first rolling gear engaging each other;
   a second gear unit comprising:
   a second fixed gear coaxially fixed to said crank pin, said second fixed gear moving as a base circle of said second peritrochoid;
   a second rolling gear coaxially fixed to said rotating piston, said second rolling gear moving as a rolling circle of said second peritrochoid;
   said second fixed gear and said second rolling gear engaging each other;
   said outer envelope of said family of curves being defined by a first pair of parametric equations, $x=(a-b)\cos\Theta+c(r-b)\cos(1-a/b)\Theta+v\cos\gamma-w\sin\gamma$ and $y=(a-b)\sin\Theta+c(r-b)\sin(1-a/b)\Theta+v\sin\gamma+w\cos\gamma$, where $\gamma=(1-a/b+a/r)\Theta+\beta e$, and $v$ and $w$ define a second pair of parametric equations expressing said composite trochoid, where $v=-c(r-b)\cos\omega-(a-b)\cos(1-r/b)\omega-ha\cos\{(1-r/b+r/a)\omega+\beta c\}$ and $w=-c(r-b)\sin\omega-(a-b)\sin(1-r/b)\omega-h a \sin\{(1-r/b+r/a)\omega+\beta c\}$, and where $\Theta$ is an angular velocity of said crankshaft, $(1-a/b)\Theta$ is an angular velocity of said eccentric shaft, $(1-a/b+a/r)\Theta$ is an angular velocity of said rotating piston, $(a-b)$ is equal to a distance between an axis of said crankshaft and an axis of said crank pin, $c(r-b)$ is equal to a distance between said crank pin axis and an axis of said second rolling gear, $\beta e$ is a constant and is equal to a phase angle of said rotating piston, $\omega$ is an angular velocity of an eccentric arm of said first hypotrochoid, $(1-r/b)\omega$ is an angular velocity of a generating arm of said first hypotrochoid and also an angular velocity of an eccentric arm of said first peritrochoid, $(1-r/b+r/a)\omega$ is an angular velocity of said composite trochoid, ha is a generating radius of said composite trochoid, and $\beta c$ is a constant and is equal to a phase angle of a generating point of said composite trochoid; and
   connecting ducts for gas exchange whose opening and closing are controlled by said rotating piston.

8. A planetary-motion rotary-piston engine according to claim 7 in which a ratio between radii of said base circle and said rolling circle of said hypotrochoid is 2:1, and a ratio between radii of said base circle and said rolling circle of said peritrochoid is 2:3.

9. A planetary-motion rotary-piston engine according to claim 7, in which a ratio between radii of said base circle and said rolling circle of said hypotrochoid is 3:2, and a ratio between radii of said base circle and said rolling circle of said peritrochoid is 1:2.

10. A planetary-motion reciprocating engine comprising:
   a reciprocating piston installed at a generating point of a composite trochoid composed of a hypotrochoid and a peritrochoid;
   said hypotrochoid having a ratio between radii of a base circle and a rolling circle of 2:1;
   said peritrochoid having a ratio between radii of a base circle and a rolling circle of 1:2;
   a radius of said rolling circle of said hypotrochoid being equal to a radius of said base circle of said peritrochoid;
   a crank mechanism effective for exploiting a reciprocating motion generated by said generating point of said composite trochoid, said crank mechanism comprising:
   a crankshaft moving as an eccentric arm of said hypotrochoid;
   an eccentric shaft coaxially attached to a crank pin of said crankshaft, said eccentric shaft moving as a generating arm of said hypotrochoid and as an eccentric arm of said peritrochoid;

a connecting member connected to said reciprocating piston, said connecting member moving as a generating arm of said peritrochoid;

a first gear unit comprising:

a first fixed gear being an internal gear fixed to a crankcase and coaxial with said crank shaft, said first fixed gear moving as said base circle of said hypotrochoid;

a first rolling gear coaxially fixed to said eccentric shaft, said first rolling gear moving as said rolling circle of said hypotrochoid;

said first fixed gear and said first rolling gear being engaged with each other;

a second gear unit comprising:

a second fixed gear coaxially fixed to said crank pin, said second fixed gear moving as said base circle of said peritrochoid;

a second rolling gear fixed to an end of said connecting member, said second rolling gear moving as said rolling circle of said peritrochoid;

said second fixed gear and said second rolling gear being engaged with each other; and a cylinder within which said reciprocating piston moves back and forth.

11. A planetary-motion reciprocating engine according to claim 10, in which said reciprocating piston is installed at a generating point of a translated composite trochoid, where said composite trochoid has been translated in parallel a fixed distance along a line normal to said composite trochoid.

12. A planetary-motion rotary-piston engine, comprising:

a housing containing a tubular cavity shaped as a right noncircular cylinder having an axis;

said tubular cavity being bounded at each end by two side housings geometrically corresponding to two bases of said right noncircular cylinder;

a rotating piston, shaped as a right prism having two bases, which bases slide continuously on said side housings of said tubular cavity;

at least two vertices of a normal section of said rotating piston;

each vertex of said normal section of said rotating piston having a shape of a circular arc whose center is a generating point of a composite trochoid composed of a hypotrochoid and a peritrochoid;

a normal section of said tubular cavity being defined by a curve that is an outer envelope of a family of curves determining a contour of said normal section of said rotating piston;

a crankshaft, pierced through said side housings of said tubular cavity along said axis;

an eccentric shaft, coaxially attached to a crank pin of said crankshaft, said eccentric shaft moving as a generating arm of said hypotrochoid and as an eccentric arm of said peritrochoid;

a first gear unit comprising:

a first fixed gear being an internal gear and coaxially fixed to a one of said side housings of said tubular cavity, said first fixed gear moving as a base circle of said hypotrochoid;

a first rolling gear coaxially fixed to said eccentric shaft, said first rolling gear moving as a rolling circle of said hypotrochoid;

said first fixed gear and said first rolling gear engaging each other;

a second gear unit comprising:

a second fixed gear coaxially fixed to said crank pin, said second fixed gear moving as a base circle of said peritrochoid;

a second rolling gear coaxially fixed to said rotating piston, said second rolling gear moving as a rolling circle of said peritrochoid;

said second fixed gear and said second rolling gear engaging each other;

said generating point of said composite trochoid being defined by a pair of parametric equations, $x=(a-b)\cos\Theta+c(r-b)\cos(1-a/b)\Theta+dcr\cos\{(-1-a/b+a/r)\Theta+\beta\}$ and $y=(a-b)\sin\Theta+c(r-b)\sin(1-a/b)\Theta+dcr\sin\{(1-a/b+a/r)\Theta+\beta\}$, where $\Theta$ is an angular velocity of said crankshaft, $(1-a/b)\Theta$ is an angular velocity of said eccentric shaft, $(1-a/b+a/r)\Theta$ is an angular velocity of said rotating piston, $(a-b)$ is equal to a distance between an axis of said crankshaft and an axis of said crank pin, $c(r-b)$ is equal to a distance between said crank pin axis and an axis of said second rolling gear, $dcr$ is equal to a generating radius of said composite trochoid, and $\beta$ is a constant and is equal to a phase angle of said generating point of said composite trochoid; and connecting ducts for gas exchange whose opening and closing are controlled by said rotating piston.

* * * * *

UNITED STATES PATENT AND TRADEMARK OFFICE
CERTIFICATE OF CORRECTION

PATENT NO. : 5,399,078
DATED : March 21, 1995
INVENTOR(S) : Yasuo Kuramasu

It is certified that error appears in the above-indentified patent and that said Letters Patent is hereby corrected as shown below:

Column 25, line 64, change "light" to --right--.

Column 27, line 4, change "are" to --arc--.

Signed and Sealed this

Twelfth Day of September, 1995

Attest:

BRUCE LEHMAN

*Attesting Officer*      *Commissioner of Patents and Trademarks*